US012666386B2

(12) United States Patent
Zhang et al.

(10) Patent No.: US 12,666,386 B2
(45) Date of Patent: Jun. 23, 2026

(54) SENSING SYSTEMS, METHODS, AND APPARATUS IN WIRELESS COMMUNICATION NETWORKS

(71) Applicant: HUAWEI TECHNOLOGIES CO., LTD., Shenzhen (CN)

(72) Inventors: Liqing Zhang, Kanata (CA); Wen Tong, Kanata (CA); Jianglei Ma, Kanata (CA); Peiying Zhu, Kanata (CA); Dageng Chen, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 18/333,622

(22) Filed: Jun. 13, 2023

(65) Prior Publication Data

US 2023/0328683 A1      Oct. 12, 2023

Related U.S. Application Data

(63) Continuation of application No. PCT/CN2020/138867, filed on Dec. 24, 2020.

(51) Int. Cl.
*H04W 64/00*          (2009.01)

(52) U.S. Cl.
CPC .................................. *H04W 64/00* (2013.01)

(58) Field of Classification Search
CPC ....... H04W 64/00; H04W 84/18; H04W 4/40; H04W 4/029

(Continued)

(56) References Cited

U.S. PATENT DOCUMENTS

2019/0191406 A1*   6/2019   Wei ........................ H04W 64/00
2020/0067843 A1     2/2020   Li et al.
(Continued)

FOREIGN PATENT DOCUMENTS

CN          108809584 A      11/2018
CN          110913473 A       3/2020
(Continued)

OTHER PUBLICATIONS

The international preliminary report on patentability dated Jul. 10, 2023 for EP 20966440 (Year: 2023).*
(Continued)

*Primary Examiner* — Juan A Torres
(74) *Attorney, Agent, or Firm* — Slater Matsil, LLP

(57)          ABSTRACT

A first sensing coordinator in a radio access network may communicate a first signal with a second sensing coordinator through an interface link. The first sensing coordinator may include a sensing protocol layer, and may communicate the first signal through the interface link using the sensing protocol. Similarly, a second sensing coordinator may communicate a first signal with a first sensing coordinator in a radio access network through an interface link, with the second sensing coordinator including a sensing protocol layer and communicating the first signal through the interface link using the sensing protocol. A sensing device or apparatus may access an interface link through a radio access network and communicate a first signal, including a sensing configuration or sensing data, with a sensing coordinator that has a sensing protocol layer. The communicating may involve communicating the first signal through the interface link using a sensing protocol.

20 Claims, 26 Drawing Sheets

(58) Field of Classification Search
USPC ....... 455/456.1, 422, 440; 340/988; 344/450
See application file for complete search history.

(56) References Cited

U.S. PATENT DOCUMENTS

| 2020/0267508 | A1 | 8/2020 | Fischer et al. | |
| 2020/0396564 | A1* | 12/2020 | Leonard | G01S 5/0054 |
| 2022/0225460 | A1* | 7/2022 | Shrestha | H04W 76/19 |

FOREIGN PATENT DOCUMENTS

| JP | 2008312191 | A | 12/2008 |
| WO | 2009014297 | A1 | 1/2009 |
| WO | 2010084801 | A1 | 7/2010 |
| WO | 2019027540 | A1 | 2/2019 |
| WO | 2019091647 | A1 | 5/2019 |

OTHER PUBLICATIONS

The international search report dated Jun. 30, 2022 for EP 20966440 (Year: 2022).*

Amended claims filed after receipt of (European) search report dated Jun. 22, 2023 for EP 20966440 (Year: 2023).*

Amendments received before examination dated Jun. 21, 2024 for EP 20966440 (Year: 2024).*

3rd Generation Partnership Project, "Technical Specification Group Radio Access Network, NR, Study on local NR positioning in NG-RAN (Release 16)", 3GPP TR 38.856 V1.0.0, Dec. 31, 2019, 18 pages.

Ericsson, "Running CR for the introduction of NR positioning", 3GPP TSG-RAN WG3 #107-e, R3-201470, Feb. 24-Mar. 6, 2020, 15 pages.

* cited by examiner

SENSING SYSTEMS, METHODS, AND APPARATUS IN WIRELESS COMMUNICATION NETWORKS

CROSS-REFERENCE TO RELATED APPLICATION

This application is a continuation of International Application No. PCT/CN2020/138867, filed on Dec. 24, 2020, which is hereby incorporated by reference in its entirety.

FIELD

This application relates generally to communications, and in particular to sensing in wireless communication networks.

BACKGROUND

Coordination of sensing related to positioning, in wireless communication systems that include a core network and one or more radio access networks, is typically based in the core network, and all signaling to request positioning and provide positioning information is routed through the core network. This type of architecture is specific to positioning, and can significantly limit availability of positioning functions for entities outside the core network.

SUMMARY

In general, sensing operations may include more features than positioning. Positioning can be one of the sensing features in the sensing services disclosed herein, but the present disclosure is not in any way limited to positioning. Sensing operations can provide real-time or non-real time sensing information for enhanced communication in a wireless network, as well as independent sensing services for networks other than the wireless network or other network operators.

Embodiments of the present disclosure provide sensing architectures, methods, and apparatus for coordinating sensing in wireless communication systems. Coordination of sensing may involve one or more devices or elements located in a radio access network, one or more devices or elements located in a core network, or both one or more devices or elements located in a radio access network and one or more devices or elements located in a core network.

Positioning is a very specific feature that relates to determining the physical location of a UE in a wireless network (e.g., in a cell). Position determination may be by the UE itself and/or by network devices such as base stations and may involve measuring reference signals and analyzing measured information such as signal delays between the UE and the network devices. For actual wireless communication and optimized control, positioning of a UE is only one measurement element among multiple possible measurement metrics. For example, a network may use information about surroundings of the UE, such as channel conditions, surrounding environment, etc., for better communication scheduling and control. In sensing operations, all related measurement information can be obtained for better communication.

According to an aspect of the present disclosure, a method involves communicating, by a first sensing coordinator in a radio access network, a first signal with a second sensing coordinator through an interface link. The first sensing coordinator comprises a sensing protocol layer, and communicating the first signal comprises communicating the first signal through the interface link using the sensing protocol.

An apparatus according to another aspect of the present disclosure includes at least one processor; and a non-transitory computer readable storage medium, coupled to the at least one processor, storing programming for execution by the at least one processor, the programming including instructions for communicating, by a first sensing coordinator in a radio access network, a first signal with a second sensing coordinator through an interface link. The first sensing coordinator comprises a sensing protocol layer, and communicating the first signal comprises communicating the first signal through the interface link using the sensing protocol.

A computer program product according to another aspect includes a non-transitory computer readable storage medium storing programming for execution by a processor. The programming includes instructions for communicating, by a first sensing coordinator in a radio access network, a first signal with a second sensing coordinator through an interface link. As in other aspects referenced above, the first sensing coordinator comprises a sensing protocol layer, and communicating the first signal comprises communicating the first signal through the interface link using the sensing protocol.

The present disclosure also encompasses a method that involves communicating, by a second sensing coordinator, a first signal with a first sensing coordinator in a radio access network through an interface link. The second sensing coordinator comprises a sensing protocol layer, and communicating the first signal comprises communicating the first signal through the interface link using the sensing protocol.

In an apparatus embodiment, an apparatus may include at least one processor; and a non-transitory computer readable storage medium, coupled to the at least one processor, storing programming for execution by the at least one processor, the programming including instructions for communicating, by a second sensing coordinator, a first signal with a first sensing coordinator in a radio access network through an interface link. The second sensing coordinator comprises a sensing protocol layer, and communicating the first signal comprises communicating the first signal through the interface link using the sensing protocol.

A computer program product according to another aspect includes a non-transitory computer readable storage medium storing programming for execution by a processor. The programming includes instructions for communicating, by a second sensing coordinator, a first signal with a first sensing coordinator in a radio access network through an interface link. Again, the second sensing coordinator comprises a sensing protocol layer, and communicating the first signal comprises communicating the first signal through the interface link using the sensing protocol.

According to yet another aspect of the present disclosure, a method involves accessing, by an apparatus through a radio access network, an interface link; and communicating, by the apparatus, a first signal with a sensing coordinator that has a sensing protocol layer, the communicating comprising communicating the first signal through the interface link using a sensing protocol, the first signal comprising a sensing configuration or sensing data.

In another apparatus embodiment in which an apparatus includes at least one processor; and a non-transitory computer readable storage medium, coupled to the at least one processor, storing programming for execution by the at least one processor, the programming may include instructions for accessing, by the apparatus through a radio access network, an interface link; and communicating, by the apparatus, a first signal with a sensing coordinator that has a sensing protocol layer. The communicating involves communicating the first signal through the interface link using a sensing protocol, and the first signal includes a sensing configuration or sensing data.

A computer program product according to another aspect includes a non-transitory computer readable storage medium storing programming for execution by a processor, and the programming includes instructions for accessing, by an apparatus through a radio access network, an interface link; and communicating, by the apparatus, a first signal with a sensing coordinator that has a sensing protocol layer. The communicating involves communicating the first signal through the interface link using a sensing protocol. The first signal includes a sensing configuration or sensing data, as in other embodiments referenced above.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and potential advantages thereof, reference is now made, by way of example, to the following descriptions taken in conjunction with the accompanying drawings, in which.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Figure 1:
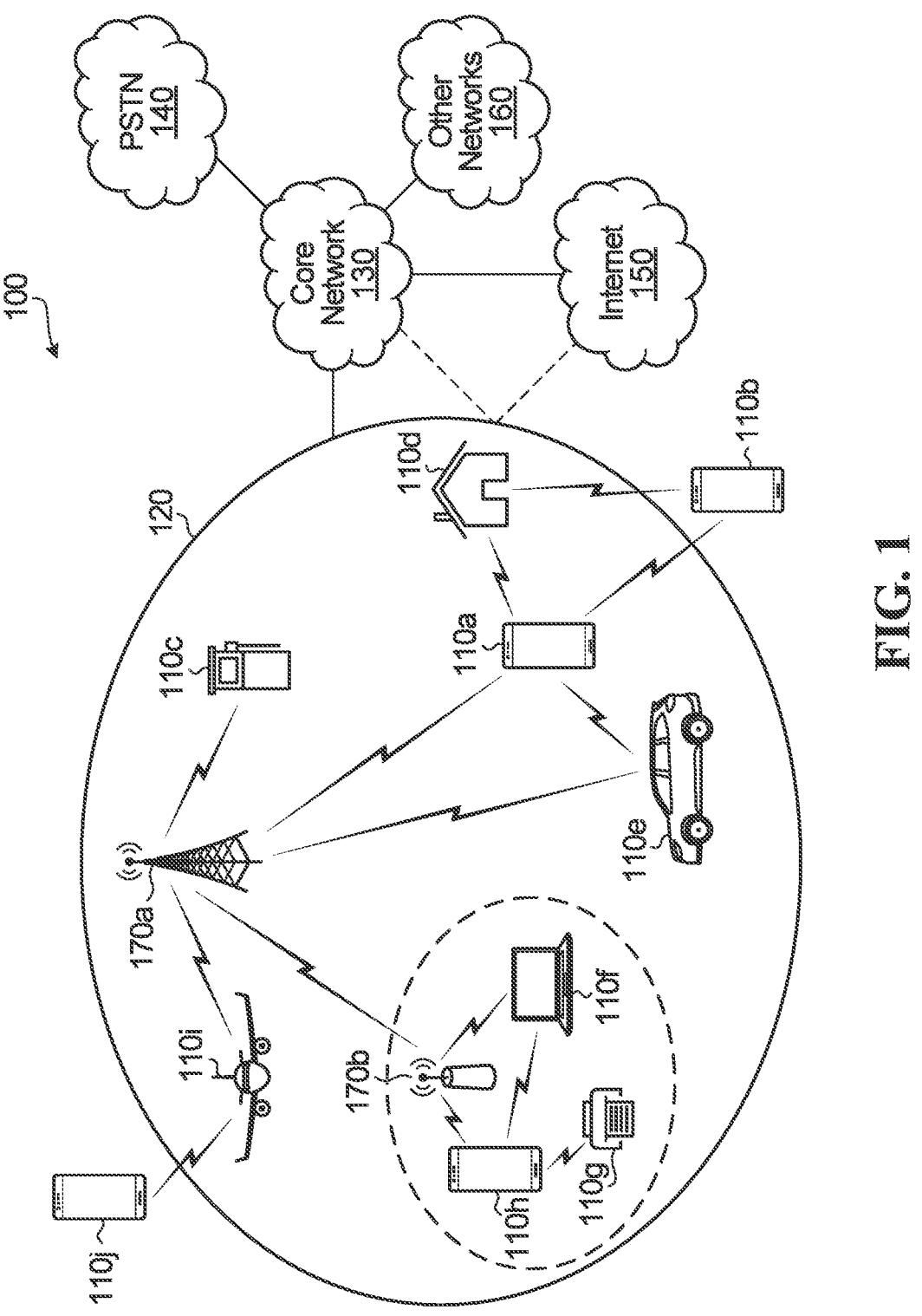
FIG. 1 is a block diagram that provides a simplified schematic illustration of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-110j (generically referred to as 110) may be interconnected to one another, and may also or instead be connected to one or more network nodes (170a, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
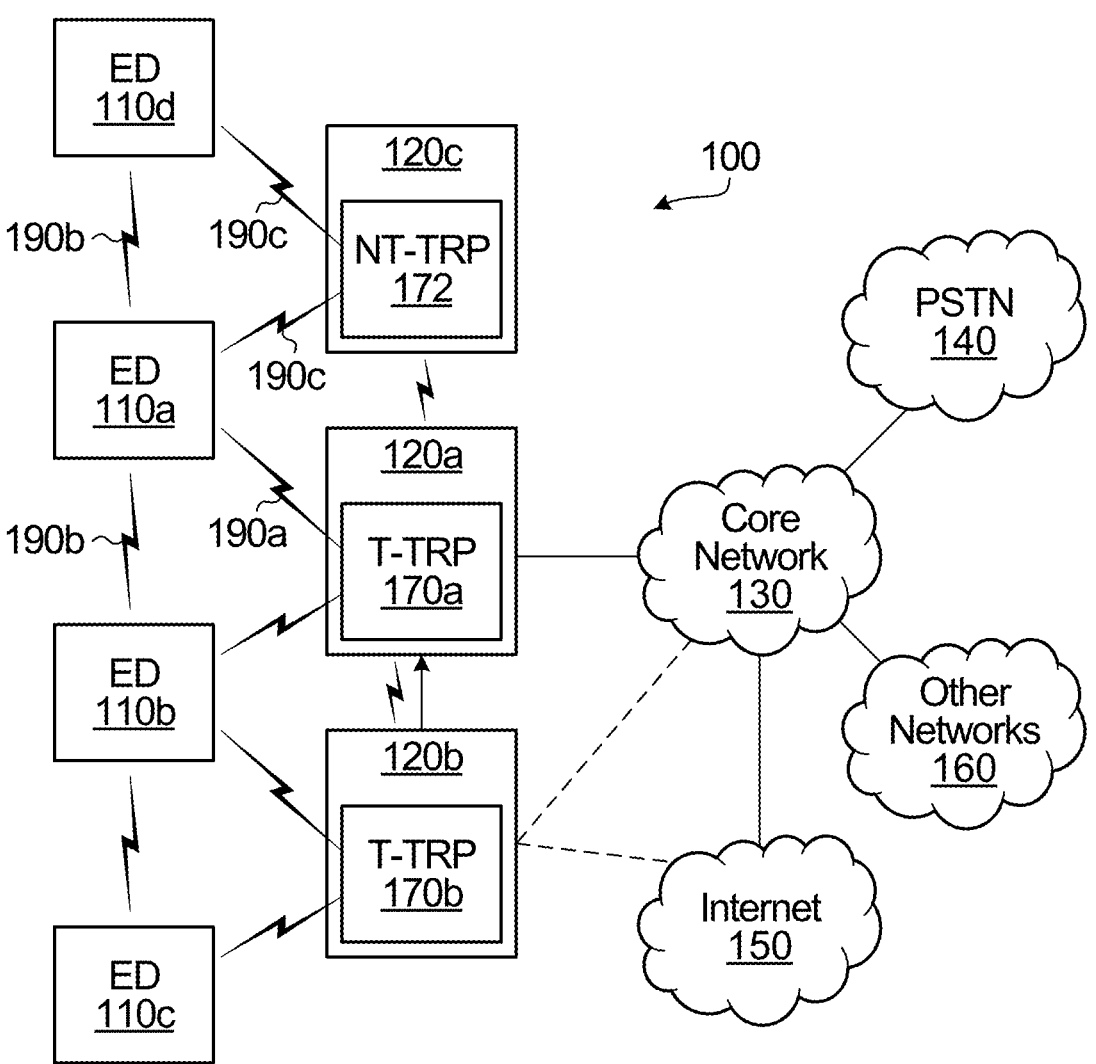
FIG. 2 is a block diagram illustrating another example communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such technologies.

Figure 3:
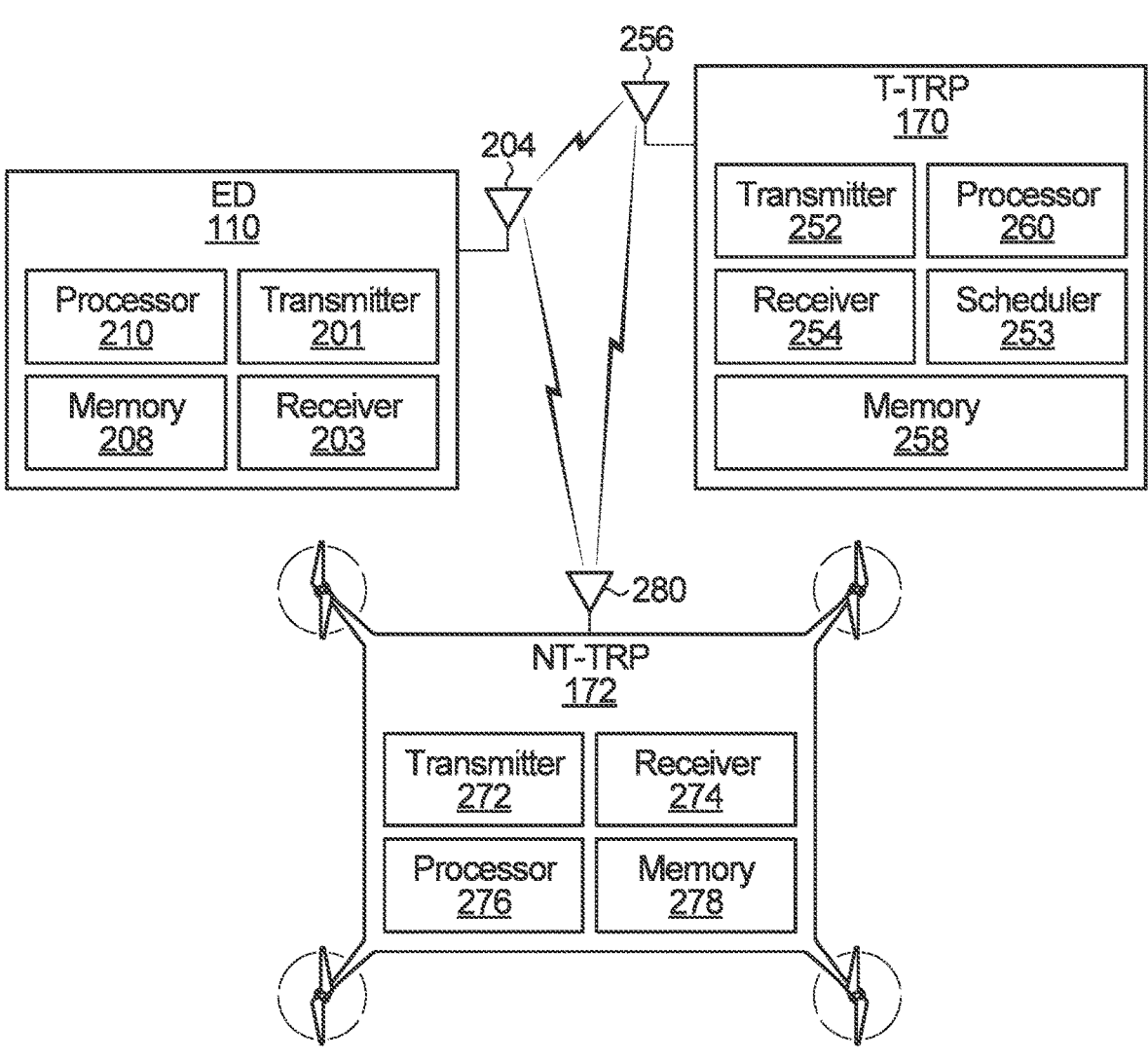
FIG. 3 is a block diagram illustrating example electronic devices and network devices.

FIG. 3 illustrates another example of an ED 110 and network devices, including a base station 170*a*, 170*b* (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
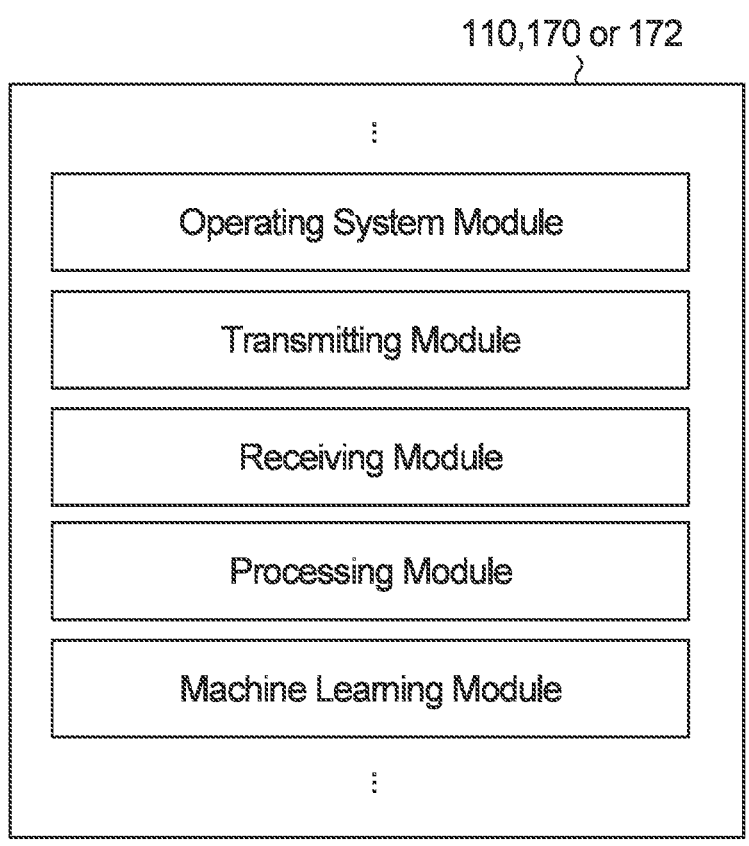
FIG. 4 is a block diagram illustrating units or modules in a device.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Going to the future wireless network, the number of the new devices could be increased exponentially with diverse functionalities. Also, a lot more new applications and use cases than 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent MCS, intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be standalone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data collecting, processing and usage operations are performed in a unified framework or a different framework.

Figure 5:
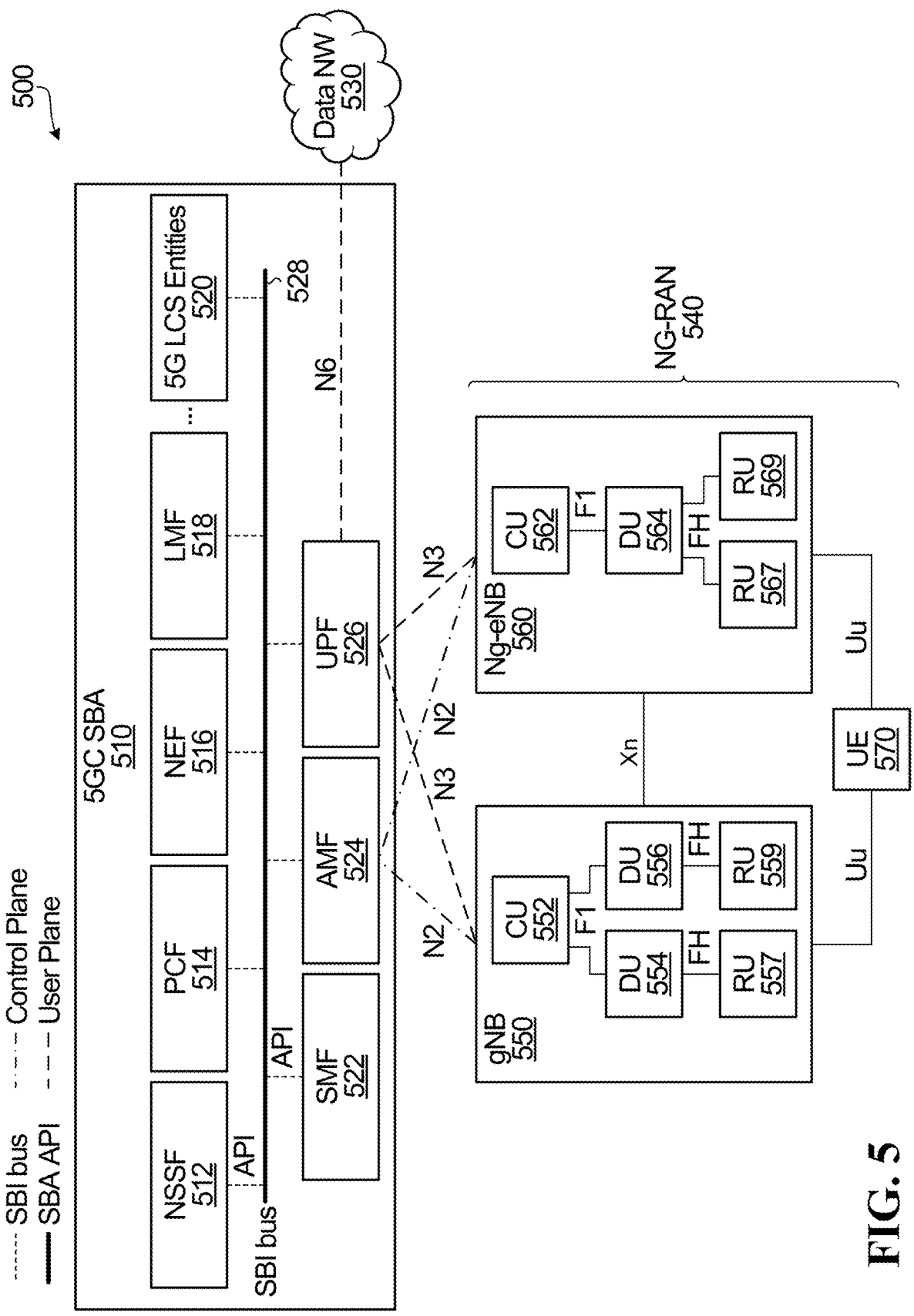
FIG. 5 is a block diagram of a long term evolution (LTE)/new radio (NR) positioning architecture.

Regarding positioning, FIG. 5 is a block diagram of an LTE/NR positioning architecture.

In the positioning architecture 500, a core network is shown at 510, a data network (NW) that may be external to the core network is shown at 530, and an NG-RAN (next generation radio access network) is shown at 540. The NG-RAN 540 includes a gNB 550 and an Ng-eNB 560, and a UE for which the NG-RAN provides access to the core network 510 is shown at 570.

The core network 510 is shown as a 5th generation core service-based architecture (5GC SBA), and includes various functions or elements that are coupled together by a service based interface (SBI) bus 528. These functions or elements include a network slice selection function (NSSF) 512, a policy control function (PCF) 514, a network exposure function (NEF) 516, a location management function (LMF) 518, 5G location service (LCS) entities 520, a session management function (SMF) 522, an access and mobility management function (AMF) 524, and a user plane function (UPF) 526. The AMF 524 and the UPF 526 communicate with other elements outside the core network 510 through interfaces which are shown as N2, N3, and N6 interfaces.

The gNB 550 and the Ng-eNB 560 both have a CU (centralized unit)/DU (distributed unit)/RU (or RRU, remote radio unit) architecture, each including one CU 552, 562 and two RUs 557/559, 567/569. The gNB 550 includes two DUs 554, 556, and the Ng-eNB 560 includes one DU 564. Interfaces through which the gNB 550 and the Ng-eNB 560 communicate with each other and with the UE 570 are shown as Xn and Uu interfaces, respectively.

Those skilled in the art will be familiar with the positioning architecture 500, the elements illustrated in FIG. 5, and their operation. The present disclosure relates primarily to sensing, and accordingly the LMF 518, the LCS entities 520, the AMF 524, and the UPF 526 and their operation related to positioning may be relevant.

For location services, the 5G LCS entities 520 may request positioning service from wireless network via the AMF 524, and the AMF 524 may then send the request to the LMF 518, where the associated RAN node(s) and the UE(s) may be determined for a positioning service and the associated positioning configurations are initiated by the LMF 518. Location services are those provided to clients, giving information. These services can be divided into: Value added services (such as route planning information), Legal and lawful interception services (such as those that might be used as evidence in legal proceedings), and Emergency services (these will provide location information for organizations such as police, fire and ambulance service). For example, to estimate the location of a UE, the network may configure the UE to send a uplink reference signal and more than one base station may measure the received signals in terms of directions of arrivals and delays, so the UE location can be estimated by the network. In a wireless network, except for the location of UE itself, more information is also required to support better communication, where the information may include surrounding information around the UE, e.g., channel conditions, surrounding environment, etc, which can be accomplished by the sensing operations.

Embodiments of the present disclosure relate to sensing, for future wireless communication networks such as $6^{th}$ generation networks. Either or both of integrated sensing and communication, and standalone sensing, may be supported. In the present disclosure, features disclosed in the context of any embodiment are not necessarily exclusive to that particular embodiment, and may also or instead be applied to other embodiments.

Future networks like 6G networks, may involve sensing environments through high-precision positioning, mapping and reconstruction, and gesture/activity recognition, and thus sensing will be a new 6G service with a variety of activities and operations through obtaining information about a surrounding environment. A 6G network includes terminals, devices and network infrastructures to lead to capabilities such as the following:

More and higher spectrum with larger bandwidth

Evolved antenna design with extremely large arrays and metasurface

Larger scale of collaboration between base stations and UEs

Advanced techniques for interference cancellation

Integrated advanced signal processing and artificial intelligence (AI).

Thus future networks may use or require new metrics (such as sensing accuracy and sensing resolution) to serve as the new KPIs, which are proposed based on different application scenarios. For example, latency can be as tight as approximately 1 cm to 10 cm, and sensing accuracy can be up to 1 mm in resolution. Furthermore, 6G networks may involve numerous use cases, such as unmanned aerial vehicles (UAVs), vehicles, IoT devices, to build a map of the environment and a virtual environment in cyber space, so 6G networks may use or need a new sensing system and framework to provide an efficient signal design and coordinate resource allocation in the time, frequency, and spatial domains without degrading the spectral efficiency and sensing performance. For example, a new sensing system can be an integrated sensing and communication (ISAC) to provide at least one of the following:

Sensing-assisted communication: to enable medium-aware communication due to more deterministic and predictable propagation channels. Sensing-assisted communication can provide the environmental knowledge gained through sensing for improving communication, such as environmental knowledge used to optimize the beamforming to the UE (medium-aware beamforming), environmental knowledge used to exploit all potential degrees of freedom (DoF) in the propagation channel (medium aware channel rank boosting), and medium awareness to reduce or mitigate inter-UE interference. Sensing benefits to communication can include throughput spectrum usage improvement and interference mitigation, for example.

Sensing-enabled communication: which can be referred as backscatter communication, to provide benefit in scenarios where devices with limited processing capabilities (most IoT devices in future systems) collect data. An illustrative example is media-based communication in which the communication medium is deliberately changed to convey information.

Communication-assisted sensing: to achieve more efficient and smarter sensing by connecting the sensing nodes. In this example, a sensing network connects users to realize on-demand sensing. For example, sensing can be performed based on a different node's request or delegated to another node to enable collaborative sensing in which multiple sensing nodes obtain environmental information. All these advanced features require a system design to perform the communication between the sensing nodes through DL, UL and SL channels with minimum overhead and maximum sensing efficiency.

Sensing-assisted positioning: also referred to as positioning, involves localizing UEs through the transmission or reception of signals to or from the UEs. A potential main advantage is simple operations to obtain accurate knowledge of UE locations, which involves obtaining many types of information including multi-path, imperfect time/frequency synchronization, limited users sampling/processing capabilities and limited dynamic-range of UEs.

The new sensing system and framework can be classified into radio frequency (RF) sensing and Non-RF sensing. For example, RF sensing involves sending a RF signal and learning the environment by receiving and processing the reflected signals. An example of non-RF sensing involves exploiting pictures and videos obtained from a surrounding environment (e.g., via camera).

Sensing is a feature of measuring surrounding environment information of a device related to the network, which may include, for example, any of: positioning, nearby objects, traffic, temperature, channel, etc. The sensing measurement is made by a sensing node, and the sensing node can be a node dedicated for sensing or a communication node with sensing capability. Sensing nodes may include, for example, any of: a radar station, a sensing device, a UE, a base station, a mobile access node such as a drone, a UAV, etc.

To make sensing operations happen, sensing activity is managed and controlled by sensing control devices or functions in the network. Two management and control functions for sensing are disclosed herein, and may support integrated sensing and communication and standalone sensing service.

These two new functions for sensing include a first function referenced herein as a sensing management function (SensMF) and a sensing agent function (SAF). SensMF may be implemented in a core network or a RAN, such as in a network device in a core network or a RAN, and SAF may be implemented in a RAN in which sensing is to be performed. More, fewer, or different functions may be used in implementing features disclosed herein, and accordingly SensMF and SAF are illustrative examples.

SensMF may be involved in various sensing-related features or functions, including any one or more of the following, for example:

managing and coordinating one or more RAN node(s) and/or one or more UE(s) for sensing activity;

communicating, via AMF or otherwise, for sensing procedures in a RAN, potentially including any one or more of: RAN configuration procedure for sensing, transfer of sensing associated information such as sensing measurement data, processed sensing measurement data, and/or sensing measurement data reports;

communicating, via UPF or otherwise, for sensing procedures in a RAN, potentially including transfer of sensing associated information such as any one or more of: sensing measurement data, processed sensing measurement data, and sensing measurement data reports;

otherwise handling sensing measurement data, such as processing sensing measurement data and/or generating sensing measurement data reports.

SAF may similarly be involved in various sensing-related features or functions, including any one or more of the following, for example:

splitting sensing control plane and sensing user plane (SAF-CP and SAF-UP);

storing or otherwise maintaining local measurement data and/or other local sensing information;

communicating sensing measurement data to SensMF;

processing sensing measurement data;

receiving sensing analysis reports from SensMF, for communication control in RAN and/or for other purposes;

managing, coordinating, or otherwise assisting in an overall sensing and/or control process;

interfacing with an AI module or function.

A SAF can be located or deployed in a dedicated device or a sensing node such as a base station, and can control a sensing node or a group of sensing nodes. The sensing node(s) can send sensing results to the SAF node, through backhaul, an Uu link, or a sidelink SL for example, or send the sensing results directly to SensMF.

In summary, basic sensing operations may at least involve one or more sensing nodes such as UE(s) and/or TRP(s) to physically perform sensing activities or procedures, and sensing management and control functions such as SensMF and SAF may help organize, manage, configure, and control the overall sensing activities.

In a RAN that includes at least one RAN node, for example, the (or each) RAN node can be a base station, TRP, drone, UAV, satellite station, etc. To make sensing operational in a RAN, one or more RAN nodes may include a SAF, but not every RAN node need necessarily include a SAF. One SAF in one RAN node may manage, control, and configure one or more other RAN nodes and/or other electric devices for sensing. Electric devices such as UEs and/or RAN node(s) that have sensing capability may be managed, controlled, and/or configured for sensing setup and measurements, for example. In general, a sensing coordinator may be implemented in a network device in a radio access network and be configured to control one or more other network devices in the radio access network.

In the present disclosure, a sensing coordinator may refer to any of SensMF, SAF, a sensing device, or a node or other device in which SensMF, SAF, sensing, or sensing-related features or functions are implemented.

Sensing may encompass positioning, but the present disclosure is not limited to any particular type of sensing. For example, sensing may involve sensing any of various parameters or characteristics. Illustrative examples include: location parameters, object size, one or more object dimensions including 3D dimensions, one or more mobility parameters such as either or both of speed and direction, temperature, healthcare information, and material type such as wood, bricks, metal, etc. Any one or more of these parameters or characteristics, or others, may be sensed.

Figures 6A, 6B, 6C:
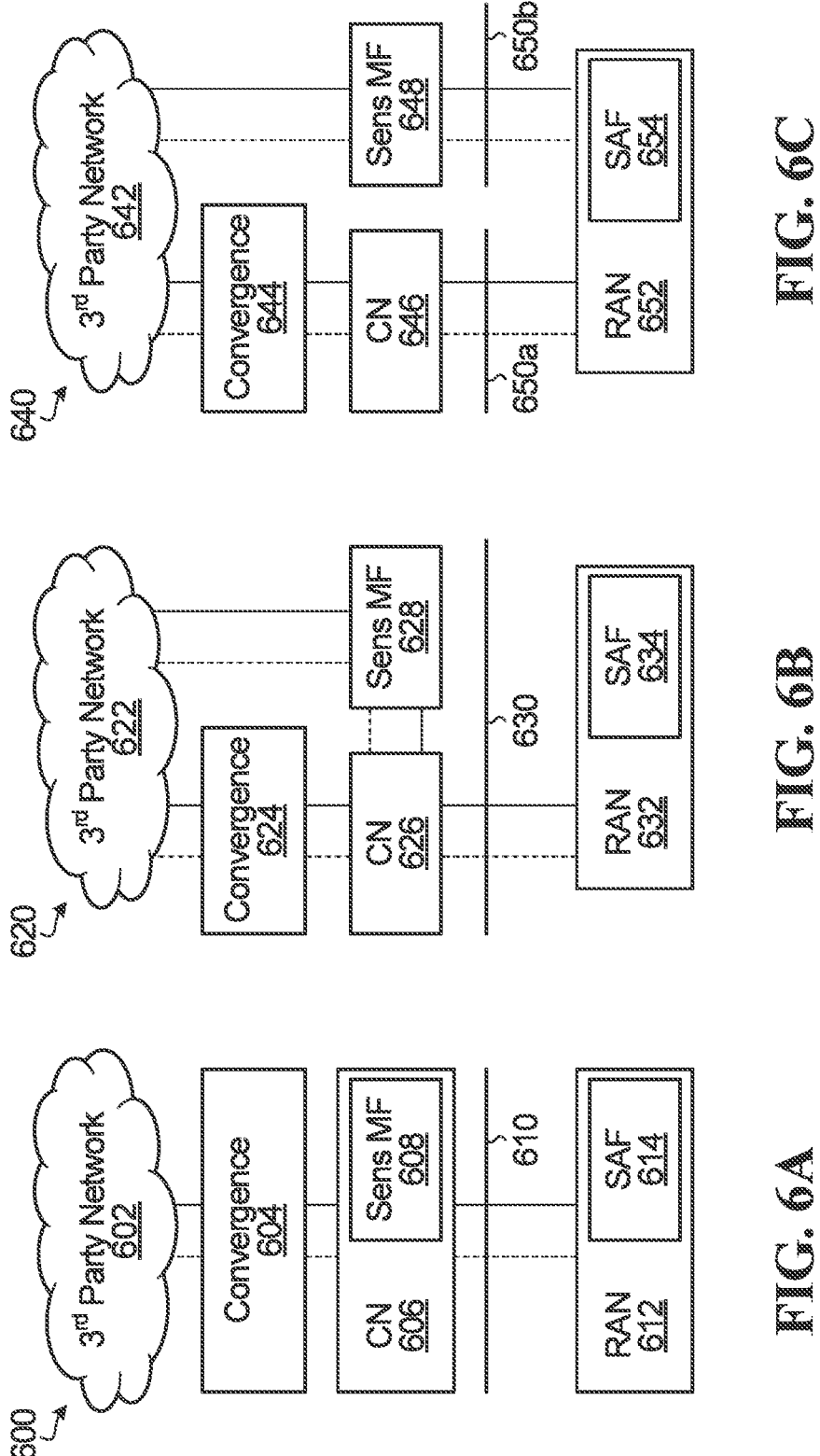
FIG. 6A is a block diagram illustrating a sensing architecture according to an embodiment in which a sensing coordinator is located in a core network.
FIG. 6B is a block diagram illustrating a sensing architecture according to another embodiment, in which a sensing coordinator is located outside a core network and communicates with a RAN through the core network.
FIG. 6C is a block diagram illustrating a sensing architecture according to a further embodiment, in which a sensing coordinator is located outside a core network and communicates directly with a RAN.

FIG. 6A is a block diagram illustrating a sensing architecture according to an embodiment in which a sensing coordinator is located in a core network. In the example architecture 600, a third-party network 602 interfaces with a core network 606 through a convergence element 604. The core network 606 includes a sensing coordinator, shown by way of example in FIG. 6A as SensMF 608. The core network 606 connects to a RAN 612 through an interface link and an interface that is shown at 610. The RAN 612 also includes a sensing coordinator, shown by way of example in FIG. 6A as SAF 614. A RAN is shown generally at 612 and a sensing coordinator in the RAN is similarly shown generally as SAF 614, to represent a RAN node of any type that includes the sensing coordinator.

The third-party network 602 is intended to represent any of various types of network that may interface or interact with a core network or the sensing management function directly. The third-party network 602 in this case may request a sensing services from the SensMF 608 via core network or directly. The Internet is an example of a third-party network 602; other examples of the third-party networks include automation and auto-driving industries, power monitoring networks, and other fixed networks, etc.

The convergence element 604 may be implemented in any of various ways, to provide a controlled and unified core network interface with other networks (e.g., a wireline network). For example, although the convergence element 604 is shown separately in FIG. 6A, one or more network devices in the core network 606 and one or more network devices in the third-party network 602 may implement respective modules or functions to support an interface between a core network and an third-party network outside the core network.

The core network 606 network may be or include, for example, an SBA or other core network. SensMF 608 in the core network 606 may be a core network function in an SBA in some embodiments, as disclosed by way of example elsewhere herein with reference to FIG. 12.

SensMF 608 in the core network 606 may connect with the RAN 612, including SAF 614, via backhaul for its control and user planes. A backhaul connection or link is therefore one example of an interface link between sensing coordinators such as SensMF 608 and SAF 614. A backhaul link, or other interface link, can be wired and/or wireless. In the case of a wireless link, an air interface protocol is used. Examples of an air interface link include: an LTE/NR Uu link; a sidelink; an air interface link of new radio vehicle-to-anything (NR v2x), long term evolution machine type communication (LTE-M), Power Class 5 (PC5), Institute of Electrical and Electronics Engineers (IEEE) 802.15.4, or 802.11, and an air interface according to a new protocol for sensing. Other examples are also provided elsewhere herein.

The RAN 612 is shown as a single block in FIG. 6A, but may include one or more network devices or RAN nodes, such as base stations. A network device in the RAN can be a terrestrial node or a mobile node. Examples of a mobile node include, among others, an integrated access backhaul (IAB) node, a drone-based node, an unmanned aerial vehicle (UAV)-based node, and a satellite-based node. The SAF 614 may be implemented in a network device in the RAN, and potentially multiple network devices may include a SAF. For example, a SAF in one network device or RAN node may be able to control multiple network devices or RAN nodes.

Other features as disclosed herein, such as those disclosed with references to FIGS. 2 to 5, may also or instead apply to the components illustrated in FIG. 6A.

Further variations from the specific architecture example shown in FIG. 6A are also possible. For example, SensMF 608 outside of the RAN 612 may connect to more than one SAF such as 614, which may be implemented in more than RAN node in the RAN 612 or in more than one RAN. Thus, one core network may interface with more than one RAN, or in other words one or more RANs such as 612 may provide access to a core network.

In several examples above, the sensing coordinators SensMF 608 and SAF 614 are described as being implemented as a core network service and in a network device, respectively. It should be appreciated, however, that sensing can be configured to be operational as a standalone features or service, or combined to be operational with communication operations in a communication network or system.

FIG. 6B is a block diagram illustrating a sensing architecture 620 according to another embodiment, in which a sensing coordinator in the form of SensMF 628 is located outside a core network 626 and communicates with a RAN 632 and another sensing coordinator in the form of SAF 634 through the core network. SensMF 628 is outside of the core network 626 and open to a third-party network 622, but connects with the RAN 632 including SAF 634, via backhaul for its control and user planes in some embodiments. SensMF 628 may be located at an edge cloud such as MEC, for example, for powerful computing capability. The example sensing architecture 620 also includes an interface 630 and a convergence element 624.

The example architecture 620 and most of the components thereof may be substantially similar to or the same as similarly labelled components in FIG. 6A. In the example architecture 620 shown in FIG. 6B, however, SensMF 628 is outside the core network 626. This may impact how SensMF 628 interacts with the third-party network 622 and the core network 626, and therefore the third-party network and the core network are shown in FIG. 6B with different reference numbers than in FIG. 6A. To the extent that this may also impact how other components interact with each other, the other components are also shown in FIG. 6B with different reference numbers than in FIG. 6A. One important difference from FIG. 6A is that FIG. 6B introduces a new interface between SensMF 628 and core network 626. For example, the new interface can be an application programming interface (API) of the type used for software functionality interface, or a newly designed interface for sensing via core network 626 to RAN 632 that includes SAF 634. It is expected that other components may be the same as the similarly labelled components in FIG. 6A.

FIG. 6C is a block diagram illustrating a sensing architecture 640 according to a further embodiment, in which a sensing coordinator, shown by way of example as SensMF 648, is located outside a core network 646 and communicates directly with a RAN 652 through an interface link and an interface 650b. For example, SensMF 648 may have direct connections with the RAN 652 including SAF 654 via backhaul for its control and user planes. SensMF 648, like SensMF 628 in FIG. 6B, may be located at an edge cloud such as MEC. The example sensing architecture 640 also includes a convergence element 644, and an interface 650a through which the core network 646 communicates with the RAN 652.

The example architecture 640 and most of the components thereof may be substantially similar to or the same as similarly labelled components in FIG. 6B. As in FIG. 6B, SensMF 648 is outside the core network 646, and this may impact how SensMF 648 interacts with the third-party network 642. In the example architecture 640 shown in FIG. 6C, however, SensMF 648 interacts directly with the RAN 652. This impacts how SensMF 648 interacts with at least the RAN 652, and therefore the RAN is shown in FIG. 6C with different reference numbers than in FIG. 6B. To the extent that this may also impact how other components interact with each other, the other components are also shown in FIG. 6C with different reference numbers than in FIGS. 6A and 6B. One important difference from FIG. 6B is that FIG. 6C introduces a new interface 650b between SensMF 648 and RAN 652 including SAF 654. For example, the new interface 650b can be a wireline based backhaul or wireless based backhaul, where backhaul protocols may reuse current protocols or newly defined protocols, especially for wireless backhaul design. It is expected that other components may be the same as the similarly labelled components in FIG. 6A and/or FIG. 6B.

Figures 7A, 7B, 7C:
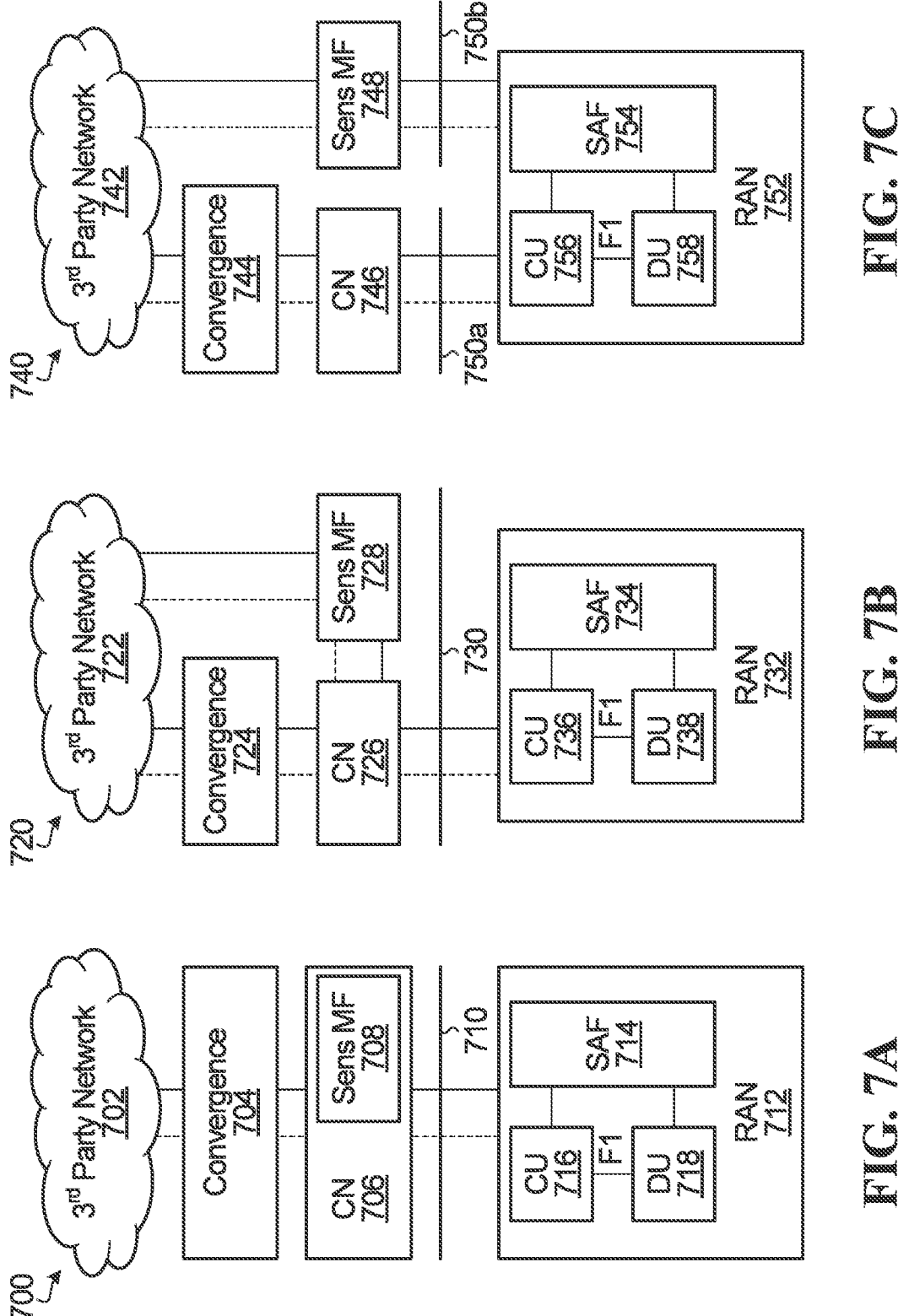
FIGS. 7A to 7C are block diagrams illustrating sensing architectures according to embodiments similar to those in FIGS. 6A to 6C, but with a central unit (CU)/distributed unit (DU) RAN architecture.

FIGS. 7A to 7C are block diagrams illustrating sensing architectures according to embodiments similar to those in FIGS. 6A to 6C, but with a CU/DU RAN architecture.

In FIG. 7A, as in FIG. 6A, a third-party network 702 interfaces with a core network 706 through a convergence element 704. The core network 706 includes a sensing coordinator, shown by way of example as SensMF 708. The core network 706 connects to a RAN 712 through an interface link and an interface that is shown at 710. The RAN 712 also includes a sensing coordinator, shown by way of example as SAF 714. The example architecture 700 in FIG. 7A and most of the components thereof may be substantially similar to or the same as similarly labelled components in FIG. 6A. In the example architecture 700 shown in FIG. 7A, however, there is RAN functional splitting or module splitting in the RAN 712, or in one or more RAN nodes in the RAN, into a CU 716 and a DU 718. For example, the CU 716 may include or support higher protocol layers such as PDCP and RRC for a control plane and PDCP and SDAP for a data plane, and the DU 718 may include lower layers such as RLC, MAC, and PHY. The SAF 714 is interactive with either or both of the CU 716 and the DU 718, as part of control and data modules in the RAN or one or more RAN nodes.

The CU/DU RAN architecture in FIG. 7A may impact how the core network 706 and the RAN 712, and thus SensMF 708 and SAF 714, interact with each other. These components are therefore shown in FIG. 7A with different reference numbers than in FIG. 6A. To the extent that this may also impact how other components interact with each other, the other components are also shown in FIG. 7A with different reference numbers than in FIG. 6A. For example, SAF 714 may interact with CU 716 and DU 718 via control plane and/or user plane. It is expected that at least these other components may be the same as the similarly labelled components in FIG. 6A.

FIG. 7B is substantially similar to FIG. 7A, and illustrates a sensing architecture 720 in which a sensing coordinator in the form of SensMF 728 is located outside a core network 726 and communicates with a RAN 732 and another sensing coordinator in the form of SAF 734 through the core network. SensMF 728 is outside of the core network 726, is open to a third-party network 722, and connects with the RAN 732 including SAF 734, via backhaul for its control and user planes in some embodiments. As in FIG. 7A, the RAN 732, or one or more nodes therein, has a CU/DU architecture with a CU 736 and a DU 738. The example sensing architecture 720 also includes an interface 730 and a convergence element 724.

The example architecture 720 and most of the components thereof may be substantially similar to or the same as similarly labelled components in FIG. 7A. In the example architecture 720 shown in FIG. 7B, however, SensMF 728 is outside the core network 726. This may impact how SensMF 728 interacts with the third-party network 722 and the core network 726, and therefore the third-party network and the core network are shown in FIG. 7B with different reference numbers than in FIG. 7A. To the extent that this may also impact how other components interact with each other, the other components are also shown in FIG. 7B with different reference numbers than in FIG. 7A. FIG. 7B also introduces an interface between SensMF 728 and core network 726, and examples of such an interface are provided at least above. It is expected that other components may be the same as the similarly labelled components in FIG. 7A.

FIG. 7C is substantially similar to FIG. 7B, and illustrates a sensing architecture 740 according to a further embodiment, in which a sensing coordinator, shown by way of example as SensMF 748, is located outside a core network 746 and communicates directly with a RAN 752 through an interface link and an interface 750*b*. For example, SensMF 748 may have direct connections with the RAN 752 including SAF 754 via backhaul for its control and user planes. As in FIG. 7A, the RAN 752, or one or more nodes therein, has a CU/DU architecture including a CU 756 and a DU 758. The example sensing architecture 740 also includes a convergence element 744, and an interface 750*a* through which the core network 746 communicates with the RAN 752.

The example architecture 740 and most of the components thereof may be substantially similar to or the same as similarly labelled components in FIG. 7B. As in FIG. 7B, SensMF 748 is outside the core network 746, and this may impact how SensMF 748 interacts with the third-party network 742. In the example architecture 740 shown in FIG. 7C, however, SensMF 748 interacts directly with the RAN 752. This impacts how SensMF 748 interacts with at least the RAN 752, and therefore the RAN is shown in FIG. 7C with different reference numbers than in FIG. 7B. To the extent that this may also impact how other components interact with each other, the other components are also shown in FIG. 7C with different reference numbers than in FIGS. 7A and 7B. FIG. 7C also introduces an interface 750*b* between SensMF 748 and RAN 752, and examples of such an interface are provided at least above. It is expected that other components may be the same as the similarly labelled components in FIG. 7A and/or FIG. 7B.

Figures 8A, 8B, 8C:
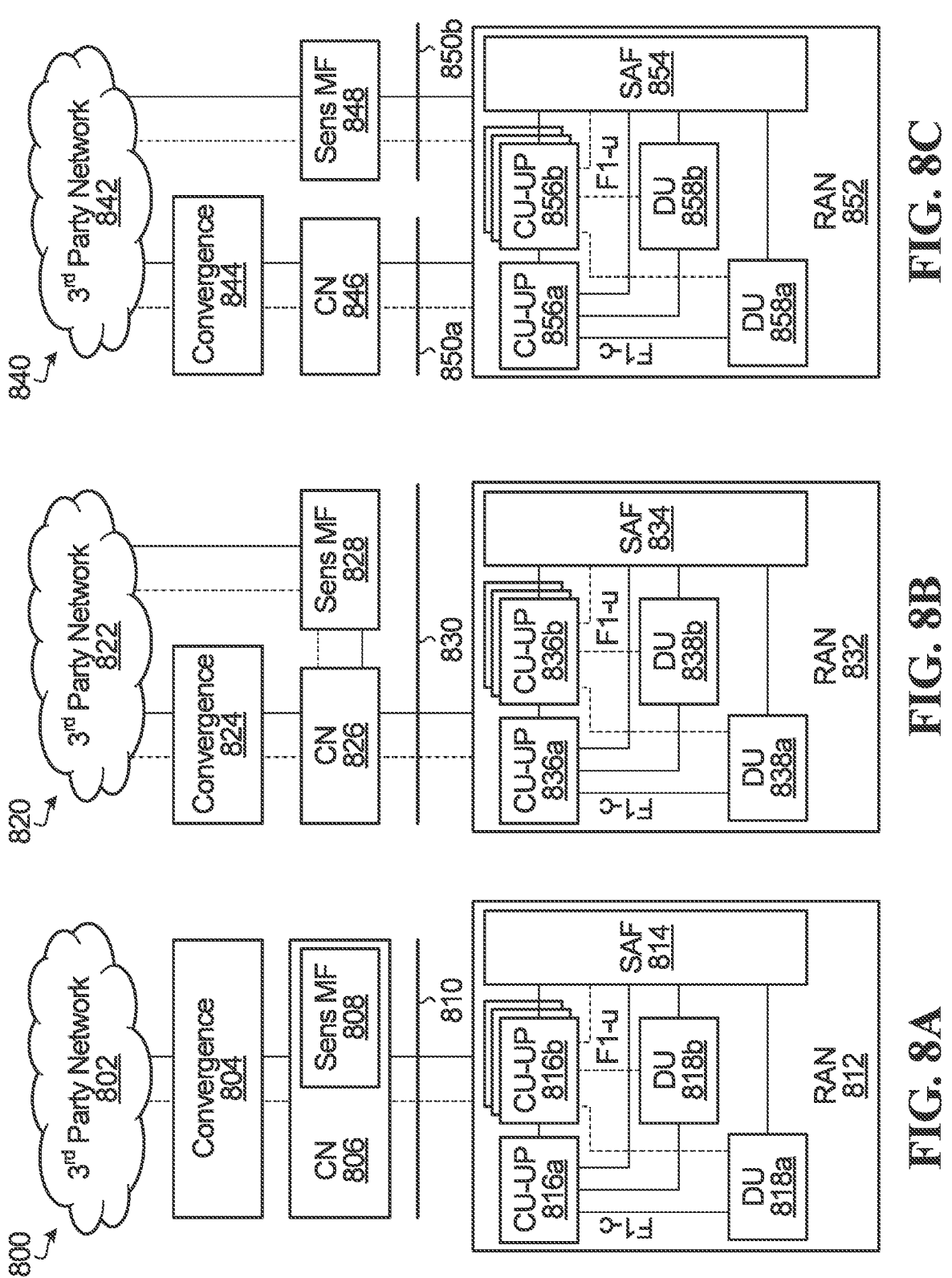
FIGS. 8A to 8C are block diagrams illustrating sensing architectures according to embodiments similar to those in FIGS. 7A to 7C, but with a CU control plane (CP)/user plane (UP) RAN architecture.

FIGS. 8A to 8C are block diagrams illustrating sensing architectures according to embodiments similar to those in FIGS. 7A to 7C, but with a CU control plane (CP)/user plane (UP) RAN architecture.

FIG. 8A, like FIG. 7A, includes a third-party network 802, a convergence element 804, a core network 806 that includes a sensing coordinator shown by way of example as SensMF 808, an interface 810, and a RAN 812 that includes a sensing coordinator shown by way of example as SAF 814. The example architecture 800 in FIG. 8A and most of the components thereof may be substantially similar to or the same as similarly labelled components in FIG. 7A. In the example architecture 800 shown in FIG. 8A, however, there is further functional splitting or module splitting in the RAN 812, or in one or more RAN nodes in the RAN. As shown, a CU is further split into control plane and user plane, CU-CP 816*a* and CU-UP 816*b*, and there are multiple DUs 818*a*, 818*b*. A CU-CP may include one or more CU-UPs, and multiple CU-UPs 816*b* are shown in FIG. 8A. In other embodiments, one RAN node may include one CU-CP and one CU-UP, or include only one CU-UP and no CU-CP. A RAN node with a CU-CP may have connections to and control more than one RAN node with CU-UP only. That is, one CU-CP may control one or more CU-UPs. A CU-CP and any CU-UPs may connect with a DU via interfaces F1-c and F1-u, respectively. These are shown by way of example in FIG. 8A.

SAF 814 may also connect with CU-CP(s) such as 816*a* and CU-UP(s) 816*b* via interfaces F1-c and F1-u, respectively, in some embodiments. Although not explicitly shown in FIG. 8A, SAF 814 can optionally be split into control plane and user plane elements.

The sensing architecture 800 in FIG. 8A differs from that of FIG. 7A in its CU-CP/CU-UP/multi-DU RAN architecture, which may impact how the core network 806 and the RAN 812, and thus SensMF 808 and SAF 814, interact with each other. Interactions between other components may also be different between FIGS. 8A and 7A. The architectures 700, 800 may otherwise be implemented in substantially similar ways.

Turning to FIG. 8B, like the sensing architecture 800 in FIG. 8A the sensing architecture 820 in FIG. 8B, includes a third-party network 822, a convergence element 824, a core network 826 that includes a sensing coordinator shown by way of example as SensMF 828, an interface 830, and a RAN 832 that includes a sensing coordinator shown by way of example as SAF 834. The RAN 832 also has the same type of architecture as in FIG. 8A, with a CU-CP 836*a*, multiple CU-UPs 836*b*, and multiple DUs 838*a*, 838*b*. The example architecture 820 in FIG. 8B and most of the components thereof may be substantially similar to or the same as similarly labelled components in FIG. 8A or FIG. 7B.

Relative to FIG. 7B, in the sensing architecture 820 shown in FIG. 8B the RAN 832 has a different architecture, with the RAN or one or more RAN nodes including a CU-CP 836*a*, multiple CU-CPs 836*b*, and multiple DUs 838*a*, 838*b*. This may impact how the core network 826 and the RAN 832, and thus SensMF 828 and SAF 834, interact with each other in FIG. 8B relative to FIG. 7B. Interactions between other components may also be different between FIGS. 8B and 7B. The architectures 720, 820 may otherwise be implemented in substantially similar ways.

Relative to FIG. 8A, the sensing architecture 820 in FIG. 8B is different in that a sensing coordinator in the form of SensMF 828 is located outside the core network 826 and communicates with the RAN 832 and another sensing coordinator in the form of SAF 834 through the core network. This may impact how SensMF 828 interacts with the third-party network 822 and the core network 826, and may also or instead impact how other components interact with each other. FIG. 8B also introduces an interface between SensMF 828 and core network 826, and examples of such an interface are provided at least above. The sensing architecture 820 may otherwise be implemented in a substantially similar way as the sensing architecture 800 in FIG. 8A.

In FIG. 8C, the sensing architecture 840 includes a third-party network 842, a convergence element 844, a core network 846 that includes a sensing coordinator shown by way of example as SensMF 848, an interface 850*a*, and a RAN 852 that includes a sensing coordinator shown by way of example as SAF 854. The RAN 852 has the same type of architecture as in FIG. 8B, with a CU-CP 856*a*, multiple CU-UPs 856*b*, and multiple DUs 858*a*, 858*b*. The example architecture 840 in FIG. 8C and most of the components thereof may be substantially similar to or the same as similarly labelled components in FIG. 8B or FIG. 7C.

Relative to FIG. 7C, in the sensing architecture 840 shown in FIG. 8C the RAN 852 has a different architecture, with the RAN or one or more RAN nodes including a CU-CP 856*a*, multiple CU-CPs 856*b*, and multiple DUs 858*a*, 858*b*. This may impact how the core network 846 and the RAN 852, and thus SensMF 848 and SAF 854, interact with each other in FIG. 8C relative to FIG. 7C. Interactions between other components may also be different between FIGS. 8C and 7C. The architectures 740, 840 may otherwise be implemented in substantially similar ways.

In comparison with FIG. 8B, the sensing architecture 840 in FIG. 8C is different in that SensMF 848 interacts directly with the RAN 852. This impacts how SensMF 848 interacts with at least the RAN 852, and may impact how other components interact with each other. FIG. 8C also introduces an interface 850*b* between SensMF 848 and RAN 852, and examples of such an interface are provided at least above. Otherwise, implementation of the sensing architecture 840 may be substantially similar to implementation of the sensing architecture 820 in FIG. 8B.

Figures 9A, 9B, 9C:
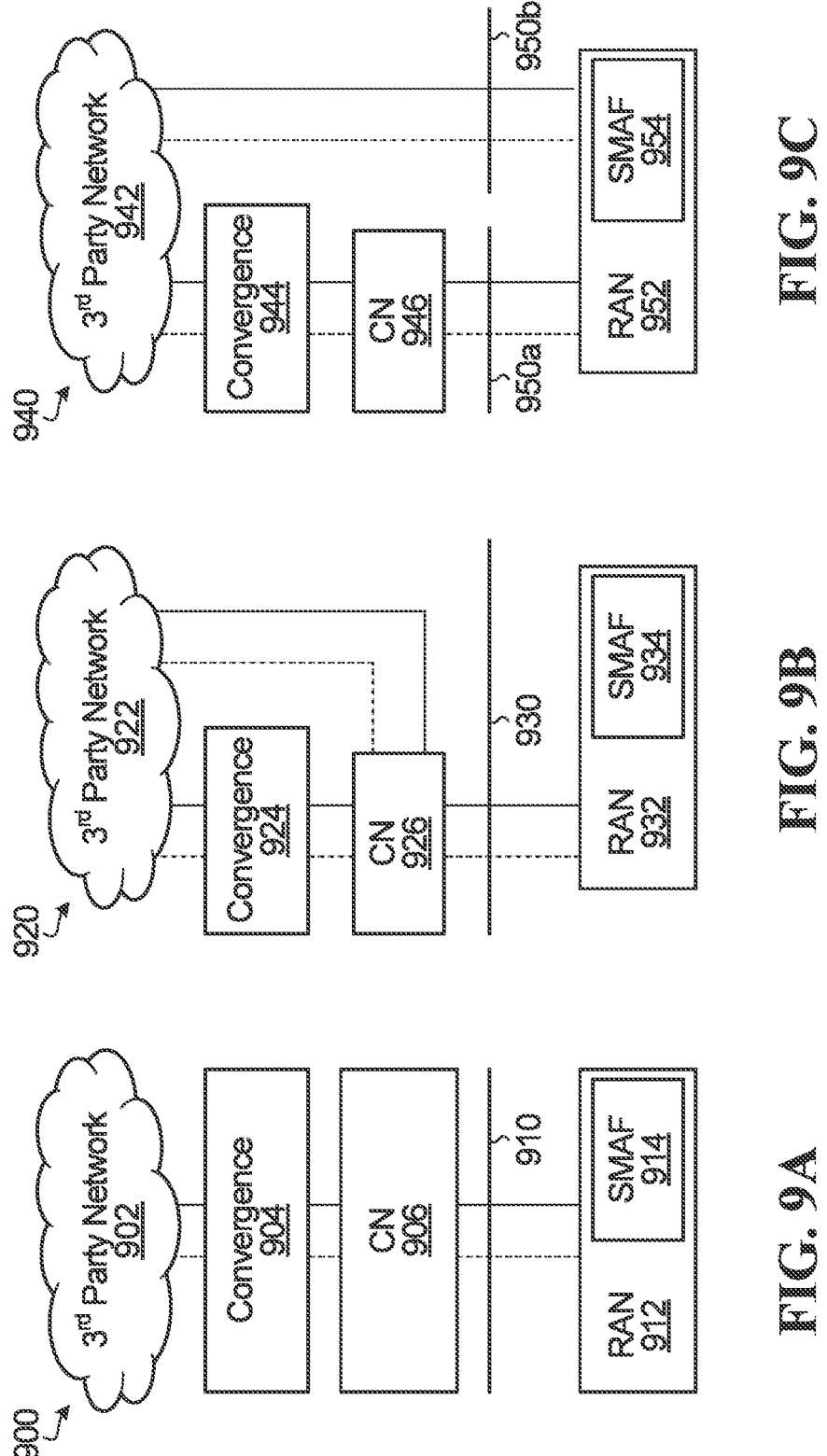
FIGS. 9A to 9C are block diagrams illustrating sensing architectures according to embodiments similar to those in FIGS. 6A to 6C, but with sensing coordination concentrated in a RAN.

FIGS. 9A to 9C are block diagrams illustrating sensing architectures according to embodiments similar to those in FIGS. 6A to 6C, but with sensing coordination concentrated in a RAN (or RAN node). Sensing coordination concentrated in a RAN refers to SensMF and SAF both being located in a RAN. SensMF and one SAF may be integrated or combined together in a RAN node or other network device in a RAN for example, or implemented separately. For ease of reference, RAN-based SensMF and SAF are referred to herein primarily as "SMAF" (SensMF+SAF), where the SMAF may be involved in various sensing-related features or functions that are provided by individual SensMF and SAF, and the SMAF may have associated interface change due to the combination of the two functions (SensMF and SAF) together into one functional module or component. For example, a third party may directly interface with a RAN node to connect to the SMAF. Like SAF deployment scenarios, a SMAF can be located or deployed in a dedicated device or a sensing node such as a base station, and can control a sensing node or a group of sensing nodes. The sensing node(s) can send sensing results to the SMAF node, through backhaul, an Uu link, or a sidelink SL for example. A potential benefit of the SMAF is to reduce the communication latency as no delay is incurred due to communication between separate SensMF and SAF, which can be especially important for control procedure and/or other applications with time-sensitive requirements.

SMAF may be involved in various sensing-related features or functions, including any one or more of the following, for example:

managing and coordinating one or more RAN node(s) and/or one or more sensing node(s) for sensing activity;

communicating, for sensing procedures in a RAN node, potentially including any one or more of: RAN configuration procedure for sensing, transfer of sensing associated information such as sensing measurement data, processed sensing measurement data, and/or sensing measurement data reports;

communicating, for sensing procedures in a RAN node, potentially including transfer of sensing associated information such as any one or more of: sensing measurement data, processed sensing measurement data, and sensing measurement data reports;

otherwise handling sensing measurement data, such as processing sensing measurement data and/or generating sensing measurement data reports.

SMAF may also be involved in various sensing-related features or functions, including any one or more of the following, for example:

splitting sensing control plane and sensing user plane (SMAF-CP and SMAF-UP);

storing or otherwise maintaining local measurement data and/or other local sensing information;

communicating sensing measurement data;

processing sensing measurement data;

receiving sensing analysis reports, for communication control in RAN and/or for other purposes;

managing, coordinating, or otherwise assisting in an overall sensing and/or control process;

interfacing with an Artificial Intelligence (AI) module or function.

References to SMAF are not intended to indicate or imply a necessarily combined implementation of SensMF and SAF or to preclude implementation of SensMF and SAF separately.

FIG. 9A, like FIG. 6A, includes a third-party network 902, a convergence element 904, a core network 906, an interface 910, and a RAN 912. The example architecture 900 in FIG. 9A and most of the components thereof may be substantially similar to or the same as similarly labelled components in FIG. 6A. In the example architecture 900 shown in FIG. 9A, however, SensMF and SAF are both located in the RAN 912, as indicated by SMAF at 914.

Electric devices in the core network 906 and/or the third-party network 902 access the RAN 912 and SMAF 914 through an interface link to obtain SMAF service. In the case of the third-party network 902, such access is via the convergence element 904. SMAF 914 may be implemented in a RAN node, for example, and other SAF implementation options disclosed herein may also apply to SMAF implementation. For example, the core network 906 may provide access to more than one SMAF, which may be implemented in one RAN node or in multiple RAN nodes in same or different RANs. Protocols between control and data functions in the core network 906 and SMAF 914 may be used for control configuration and data communication.

The sensing architecture 900 in FIG. 9A differs from that of FIG. 6A in that sensing coordination is concentrated in the RAN 912, which may impact how the core network 906 and the RAN interact with each other; for example, to get a sensing service from SMAF in FIG. 9A, RAN node 912 may not need to have an explicit signaling going out rather than employing internal connection interface within the RAN node 912, and the core network 906 may interface directly with RAN node 912 where SMAF 914 is located. Interactions between other components may also be different between FIGS. 9A and 6A. The architectures 600, 900 may otherwise be implemented in substantially similar ways.

Turning to FIG. 9B, like the sensing architecture 900 in FIG. 9A the sensing architecture 920 in FIG. 9B includes a third-party network 922, a convergence element 924, a core network 926, an interface 930, and a RAN 932 that includes SMAF 934. The example architecture 920 in FIG. 9B and most of the components thereof may be substantially similar to or the same as similarly labelled components in FIG. 9A or FIG. 6B.

Relative to FIG. 6B, the sensing architecture 920 shown in FIG. 9B is different in that there is no SensMF at the core network side of the interface 930, and the third-party network 922 can connect to SMAF 934 via the convergence element 924 and the core network 926, or more directly through the core network to obtain SMAF service. This may impact how the third-party network 922 and the core network 926 interact with each other, and thus how the third-party network interacts with the RAN 932 and a RAN-based sensing coordinator (SMAF 934) in FIG. 9B relative to FIG. 6B. For example, to get a sensing service from SMAF in FIG. 9B, RAN node 932 may not need to have an explicit signaling going out rather than employing internal connection interface within the RAN node 932, and the core network 926 may interface directly with RAN node 932 where SMAF 934 is located. Interactions between other components may also be different between FIGS. 9B and 6B. The architectures 620, 920 may otherwise be implemented in substantially similar ways.

Relative to FIG. 9A, the sensing architecture 920 in FIG. 9B is different in that the third-party network 922 may communicate with the RAN 932 through the core network 926 and not necessarily also through convergence element 924. Communications between the third-party network 922 and the RAN 932 may involve a new interface. Examples of a new core network interface to a SensMF are provided at least above, and these examples may also apply to a new core network interface to a third-party network. This may impact how the third-party network 922 and the core network 926 interact with each other, and thus how the third-party network and the RAN 932 and SMAF 934 interact with each other in FIG. 9B relative to FIG. 9A. This may also or instead impact how other components interact with each other. The sensing architecture 920 may otherwise be implemented in a substantially similar way as the sensing architecture 900 in FIG. 9A.

In FIG. 9C, the sensing architecture 940 includes a third-party network 942, a convergence element 944, a core network 946, an interface 950a, and a RAN 952 that includes SMAF 954. The sensing architecture 940 in FIG. 9C and most of the components thereof may be substantially similar to or the same as similarly labelled components in FIG. 9B or FIG. 6C.

In the sensing architecture 940, the third-party network 942 can directly obtain SMAF service by connecting to SMAF 954 in the RAN 952. As in other embodiments, protocols between control and data functions in the third-party network 942 and SMAF 954 may be used for control configuration and data communication. FIG. 9C introduces an interface 950b between the third-party network 942 and RAN 952. Examples of a new interface between a RAN and a SensMF are provided at least above, and these examples may also apply to a new interface to a third-party network.

Relative to FIG. 6C, the sensing architecture 940 shown in FIG. 9C is different in that there is no SensMF at the core network side of the interface 950, and the third-party network 952 can connect to SMAF 954 via the convergence element 944 and the core network 946, or directly. This may impact how the third-party network 942 and the core network 946 interact with each other, and thus how the third-party network interacts with the RAN 952 and a RAN-based sensing coordinator (SMAF 954) in FIG. 9C relative to FIG. 6C. For example, to get a sensing service from SMAF in FIG. 9C, RAN node 952 may not need to have an explicit signaling going out rather than employing internal connection interface within the RAN node 952, and the core network 946 may interface directly with RAN node 952 where SMAF 954 is located. Interactions between other components may also be different between FIGS. 9C and 6C. The architectures 640, 940 may otherwise be implemented in substantially similar ways.

In comparison with FIG. 9B, the sensing architecture 940 in FIG. 9C is different in that the third-party network 942 can interact directly with the RAN 952 and SMAF 954 through the interface 950b. This may also impact how other components interact with each other. Otherwise, implementation of the sensing architecture 940 may be substantially similar to implementation of the sensing architecture 920 in FIG. 9B.

Figures 10A, 10B, 10C:
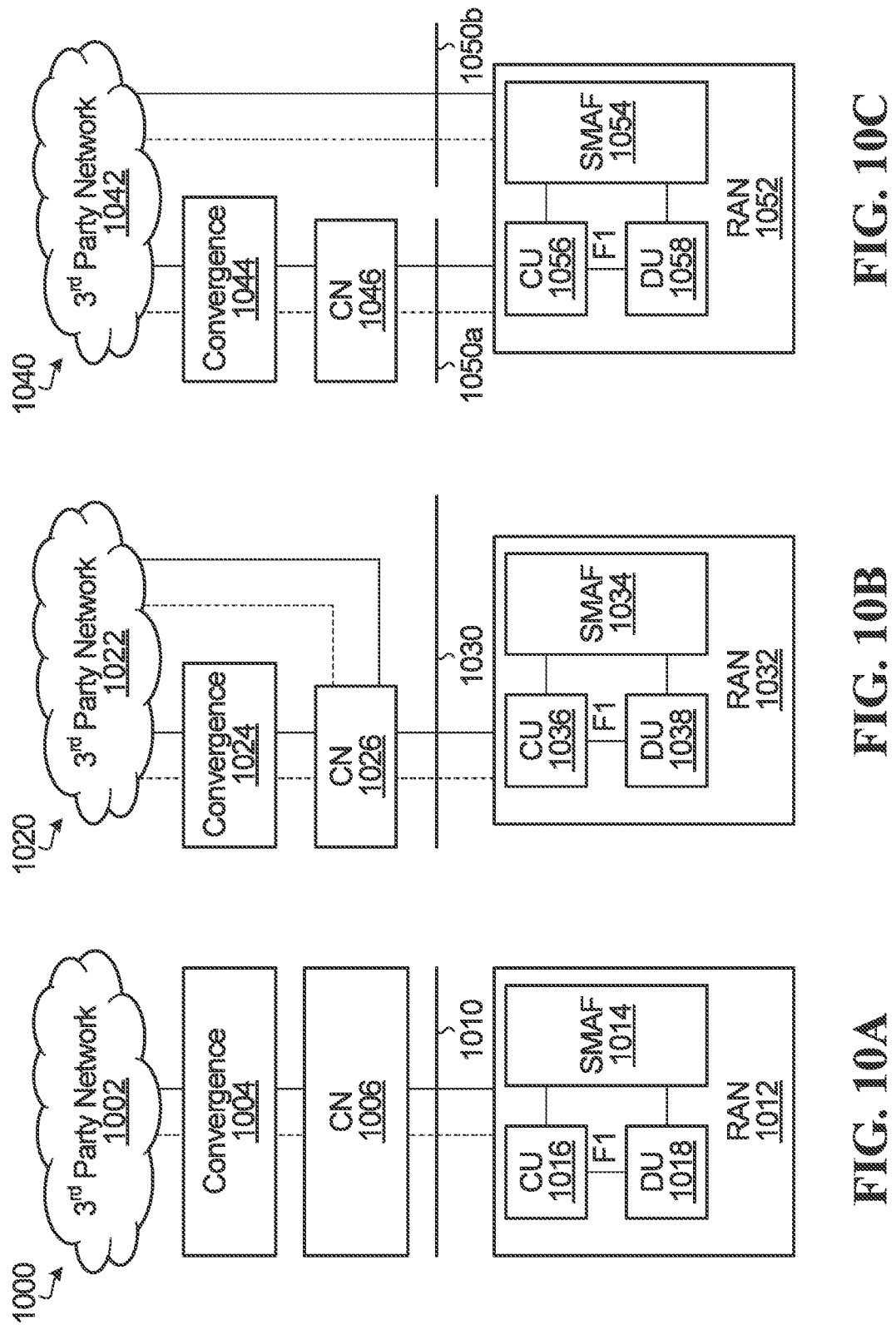
FIGS. 10A to 10C are block diagrams illustrating sensing architectures according to embodiments similar to those in FIGS. 7A to 7C, but with sensing coordination concentrated in a RAN.

FIGS. 10A to 10C are block diagrams illustrating sensing architectures according to embodiments similar to those in FIGS. 7A to 7C, but with sensing coordination concentrated in a RAN.

In FIG. 10A, as in FIG. 7A, a third-party network 1002 interfaces with a core network 1006 through a convergence element 1004, the core network 1006 connects to a RAN 1012 through an interface link and an interface that is shown at 1010, and the RAN includes or one or more RAN nodes in the RAN include a CU 1016 and a DU 1018. The sensing architecture 1000 in FIG. 10A differs from the sensing architecture 700 in FIG. 7A in that there is no SensMF in the core network 1006 in FIG. 10A, and the RAN 1012 or one or more nodes in the RAN includes SMAF 1014. SMAF 1014 is interactive with either or both of the CU 1016 and the DU 1018, as part of control and data modules in the RAN or one or more RAN nodes.

In the sensing architecture 1000 in FIG. 10A, sensing coordination is concentrated in the RAN 1012, which may impact how the core network 1006 and the RAN interact with each other. Interactions between other components may also be different between FIGS. 10A and 7A. The architectures 700, 1000 may otherwise be implemented in substantially similar ways.

FIG. 10B is substantially similar to FIG. 10A, and illustrates a sensing architecture 1020 that includes a third-party network 1022, a convergence element 1024, a core network 1026, an interface 1030, and a RAN 1032 that includes SMAF 1034 and has a CU/DU architecture including a CU 1036 and a DU 1038.

Relative to FIG. 7B, the sensing architecture 1020 shown in FIG. 10B is different in that there is no SensMF at the core network side of the interface 1030, and the third-party network 1022 can connect to SMAF 1034 via the convergence element 1024 and the core network 1026, or more directly through the core network to obtain SMAF service. This may impact how the third-party network 1022 and the core network 1026 interact with each other, and thus how the third-party network interacts with the RAN 1032 and a RAN-based sensing coordinator (SMAF 1034) in FIG. 10B relative to FIG. 7B. Communications between the third-party network 1002 and the RAN 1012 may involve a new interface, examples of which are provided at least above. Interactions between other components may also be different between FIGS. 10B and 7B. The architectures 720, 1020 may otherwise be implemented in substantially similar ways.

Relative to FIG. 10A, the sensing architecture 1020 in FIG. 10B is different in that the third-party network 1022 may communicate with the RAN 1032 through the core network 1026 and not necessarily also through the convergence element 1024. This may impact how the third-party network 1022 and the core network 1026 interact with each other, and thus how the third-party network and the RAN 1032 and SMAF 1034 interact with each other in FIG. 10B relative to FIG. 10A. Again, communications between the third-party network 1022 and the RAN 1032 may involve a new interface, examples of which are provided at least above. This may also or instead impact how other components interact with each other. The sensing architecture 1020 may otherwise be implemented in a substantially similar way as the sensing architecture 1000 in FIG. 10A.

In FIG. 10C, the sensing architecture 1040 includes a third-party network 1042, a convergence element 1044, a core network 1046, an interface 1050a, and a RAN 1052 that includes SMAF 1054 and has a CU/DU architecture including a CU 1056 and a DU 1058. The sensing architecture 1040 and most of the components thereof may be substantially similar to or the same as similarly labelled components in FIG. 10B or FIG. 7C.

In the sensing architecture 1040, the third-party network 1042 can directly obtain SMAF service by connecting to SMAF 1054 in the RAN 1052. As in other embodiments, protocols between control and data functions in the third-party network 1042 and SMAF 1054 may be used for control configuration and data communication. Communications between the third-party network 1042 and the RAN 1052 may involve a new interface, examples of which are provided at least above.

Relative to FIG. 7C, the sensing architecture 1040 shown in FIG. 10C is different in that there is no SensMF at the core network side of the interface 1050, and the third-party network 1052 can connect to SMAF 1054 via the convergence element 1044 and the core network 1046, or directly through the interface 1050b, examples of which are provided at least above. This may impact how the third-party network 1042 and the core network 1046 interact with each other, and thus how the third-party network interacts with the RAN 1052 and a RAN-based sensing coordinator (SMAF 1054) in FIG. 10C relative to FIG. 7C. Interactions between other components may also be different between FIGS. 10C and 7C. The architectures 740, 1040 may otherwise be implemented in substantially similar ways.

In comparison with FIG. 10B, the sensing architecture 1040 in FIG. 10C is different in that the third-party network 1042 can interact directly with the RAN 1052 and SMAF 1054, through the interface 1050b. This may also impact how other components interact with each other. Otherwise, implementation of the sensing architecture 1040 may be substantially similar to implementation of the sensing architecture 1020 in FIG. 10B.

Figures 11A, 11B, 11C:
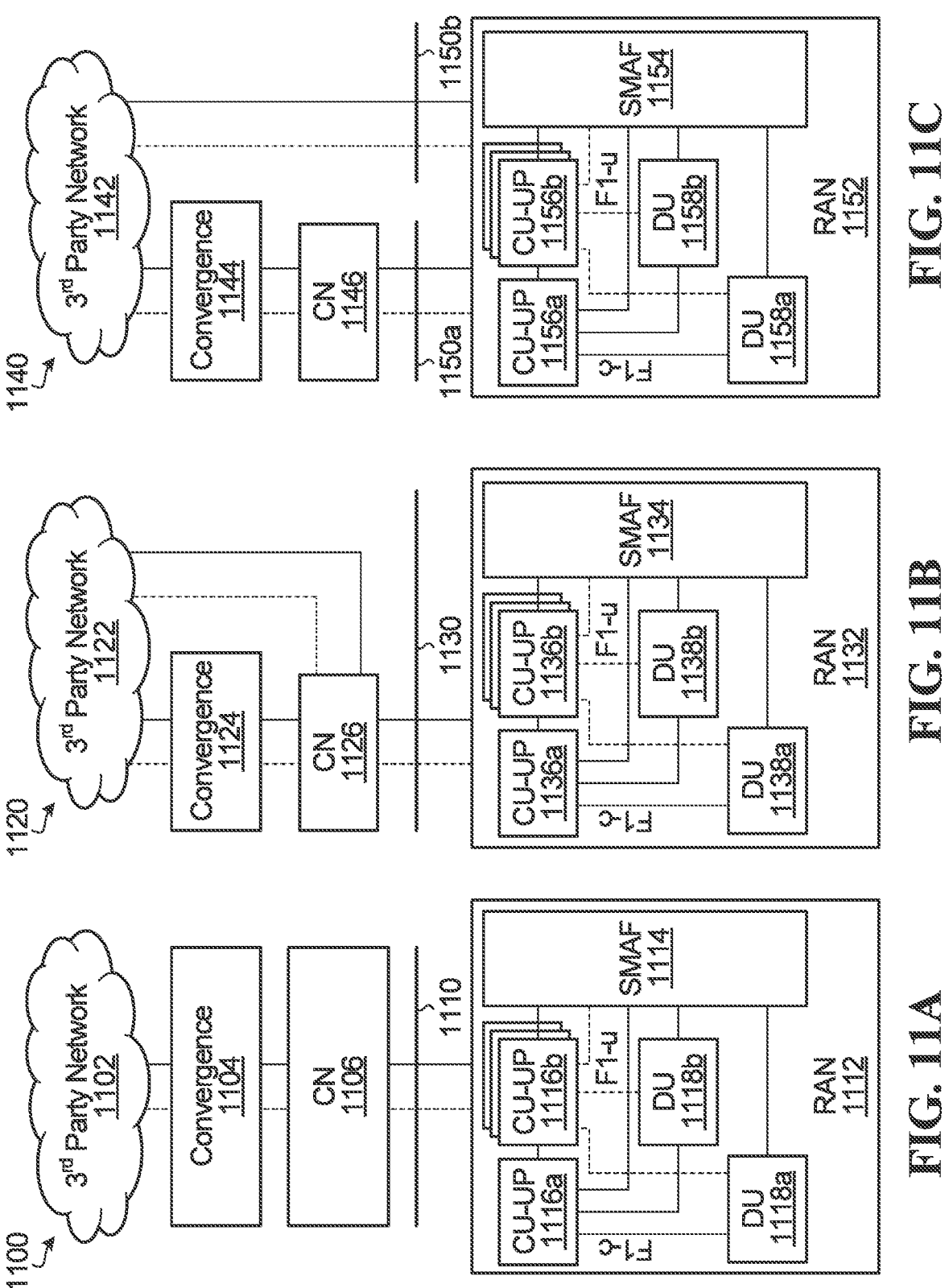
FIGS. 11A to 11C are block diagrams illustrating sensing architectures according to embodiments similar to those in FIGS. 8A to 8C, but with sensing coordination concentrated in a RAN.

FIGS. 11A to 11C are block diagrams illustrating sensing architectures according to embodiments similar to those in FIGS. 8A to 8C, but with sensing coordination concentrated in a RAN.

FIG. 11A, like FIG. 8A, includes a third-party network 1102, a convergence element 1104, a core network 1106, an interface 1110, and a RAN 1112. The sensing architecture 1100 in FIG. 11A and most of the components thereof may be substantially similar to or the same as similarly labelled components in FIG. 8A. In the example architecture 1100 shown in FIG. 11A, however, sensing coordination is concentrated in the RAN 1112, which includes SMAF 1114, and there is further functional splitting or module splitting in the RAN 1112. The RAN 1112, or one or more RAN nodes in the RAN, includes a CU-CP 1116a and multiple CU-UPs 1116b, and there are also multiple DUs 1118a, 1118b.

Features disclosed elsewhere herein regarding CU-CP/CU-UP/DU architectures may also or instead apply to the architecture 1100.

The sensing architecture 1100 in FIG. 11A differs from the sensing architecture 800 in FIG. 8A in that there is no SensMF in the core network 1106 in FIG. 11A, the RAN 1112 or one or more nodes in the RAN includes SMAF 1114, and the RAN 1112 has a CU-CP/CU-UP/multi-DU architecture. SMAF 1114 is interactive with the CU-CP 1116a, one or more of the CU-UPs 1116b, and/or one or more of the DUs 1118a, 1118b, as part of control and data modules in the RAN or one or more RAN nodes.

In the sensing architecture 1100 in FIG. 11A, sensing coordination is concentrated in the RAN 1112, which may impact how the core network 1106 and the RAN interact with each other. Interactions between other components may also be different between FIGS. 11A and 8A. The architectures 800, 1100 may otherwise be implemented in substantially similar ways.

FIG. 11B is substantially similar to FIG. 11A, and illustrates a sensing architecture 1120 that includes a third-party network 1122, a convergence element 1124, a core network 1126, an interface 1130, and a RAN 1132 that includes SMAF 1134 and has a CU-CP/CU-UP/multi-DU architecture including a CU-CP 1136a, CU-UPs 1136b, and DUs 1138a, 1138b.

Relative to FIG. 8B, the sensing architecture 1120 shown in FIG. 11B is different in that there is no SensMF at the core network side of the interface 1130, and the third-party network 1122 can connect to SMAF 1134 via the convergence element 1124 and the core network 1126, or more directly through the core network to obtain SMAF service. This may impact how the third-party network 1122 and the core network 1126 interact with each other, and thus how the third-party network interacts with the RAN 1132 and a RAN-based sensing coordinator (SMAF 1134) in FIG. 11B relative to FIG. 8B. Communications between the third-party network 1122 and the RAN 1132 may involve a new interface, examples of which are provided at least above. Interactions between other components may also be different between FIGS. 11B and 8B. The architectures 820, 1120 may otherwise be implemented in substantially similar ways.

Relative to FIG. 11A, the sensing architecture 1120 in FIG. 11B is different in that the third-party network 1122 may communicate with the RAN 1132 through the core network 1126 and a new interface, and not necessarily also through the convergence element 1124. This may impact how the third-party network 1122 and the core network 1126 interact with each other, and thus how the third-party network and the RAN 1132 and SMAF 1134 interact with each other in FIG. 11B relative to FIG. 11A. This may also or instead impact how other components interact with each other. The sensing architecture 1120 may otherwise be implemented in a substantially similar way as the sensing architecture 1100 in FIG. 11A.

In FIG. 11C, the sensing architecture 1140 includes a third-party network 1142, a convergence element 1144, a core network 1146, an interface 1150a, and a RAN 1152 that includes SMAF 1154 and has a CU-CP/CU-UP/multi-DU architecture including a CU-CP 1156a, CU-UPs 1156b, and DUs 1158a, 1158b. The sensing architecture 1140 and most of the components thereof may be substantially similar to or the same as similarly labelled components in FIG. 11B or FIG. 8C.

In the sensing architecture 1140, the third-party network 1142 can directly obtain SMAF service by connecting to SMAF 1154 in the RAN 1152 through an interface 1150*b*, examples of which are provided at least above. As in other embodiments, protocols between control and data functions in the third-party network 1142 and SMAF 1154 may be used for control configuration and data communication.

Relative to FIG. 8C, the sensing architecture 1140 shown in FIG. 11C is different in that there is no SensMF at the core network side of the interface 1150, and the third-party network 1152 can connect to SMAF 1154 via the convergence element 1144 and the core network 1146, or directly through the interface 1150*b*. This may impact how the third-party network 1142 and the core network 1146 interact with each other, and thus how the third-party network interacts with the RAN 1152 and a RAN-based sensing coordinator (SMAF 1154) in FIG. 11C relative to FIG. 8C. Interactions between other components may also be different between FIGS. 11C and 8C. The architectures 840, 1140 may otherwise be implemented in substantially similar ways.

In comparison with FIG. 11B, the sensing architecture 1140 in FIG. 11C is different in that the third-party network can interact directly with the RAN 1152 and SMAF 1154. This may also impact how other components interact with each other. Otherwise, implementation of the sensing architecture 1140 may be substantially similar to implementation of the sensing architecture 1120 in FIG. 11B.

Figure 12:
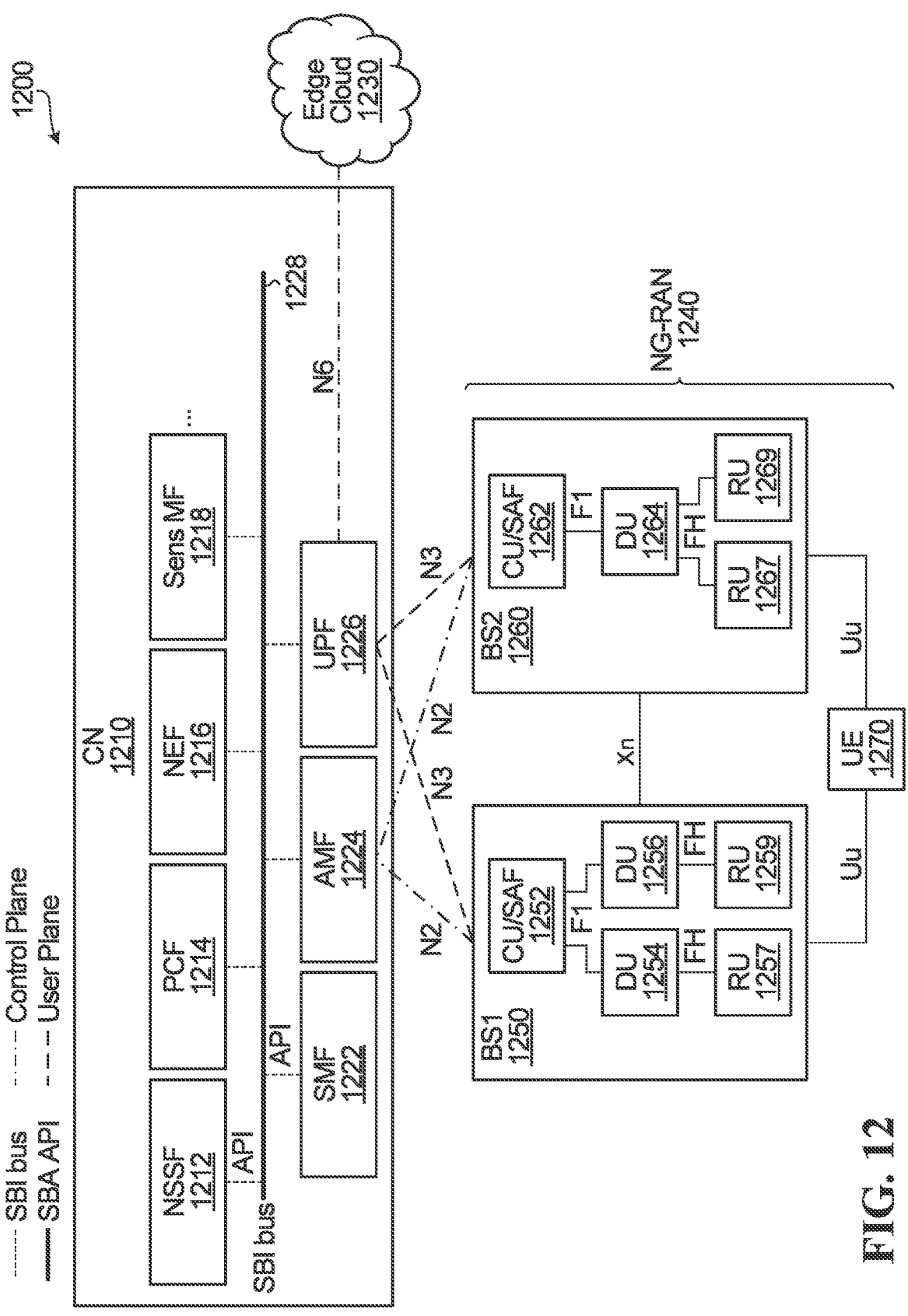
FIG. 12 is a block diagram of a sensing architecture according to a further embodiment.

FIG. 12 is a block diagram of a sensing architecture 1200 according to a further embodiment. The sensing architecture 1200 illustrates an example in which a sensing coordinator (SensMF) is located in a core network, and another sensing coordinator (SAF) is located in a RAN, in one or more RAN nodes for example. Other examples of this type of architecture are also shown in FIGS. 6A, 7A, and 8A.

In FIG. 12, a core network is shown at 1210, an external network that is outside the core network is shown by way of example as an edge cloud at 1230, and an NG-RAN is shown at 1240. The NG-RAN 1240 includes base stations (BSs) 1250, 1260, and a UE for which the NG-RAN provides access to the core network 1210 is shown at 1270.

The core network 1210 may be an SBA network, for example, and in the embodiment shown the core network includes various functions or elements that are coupled together by an SBI bus 1228. These functions or elements include NSSF 1212, PCF 1214, NEF 1216, SensMF 1218, SMF 1222, AMF 1224, and UPF 1226. The AMF 1224 and the UPF 1226 communicate with other elements outside the core network 1210 through interfaces which are shown as N2, N3, and N6 interfaces.

BS1 and BS2 both have a CU/DU/RU architecture, each including one CU/SAF 1252, 1262 including SAF, and two RUs 1257/1259, 1267/1269. BS1 includes two DUs 1254, 1256, and BS2 includes one DU 1264. Although SAF is shown in combination with a CU in FIG. 12, a SAF need not necessarily be integrated into or otherwise combined with a CU. Interfaces through which BS1 and BS2 communicate with each other and with the UE 1270 are shown as Xn and Uu interfaces, respectively, and an F1 CU/DU interface is also shown as an example.

The architecture representation in FIG. 12 is similar to that of FIG. 5. In FIG. 12, however, SensMF 1218 is part of the core network 1210 instead of LMF 118 and LCS entities 120 in FIG. 5, and the BSs 1250, 1260 in FIG. 12 include SAF 1252, 1254.

Sensing operation in an architecture as shown in FIG. 12 will be described by way of example with reference to the signal flow diagrams in FIGS. 13 and 14. These examples may also apply, to at least some extent, to other embodiments such as those shown in FIGS. 6A, 7A, and 8A.

Figure 13:
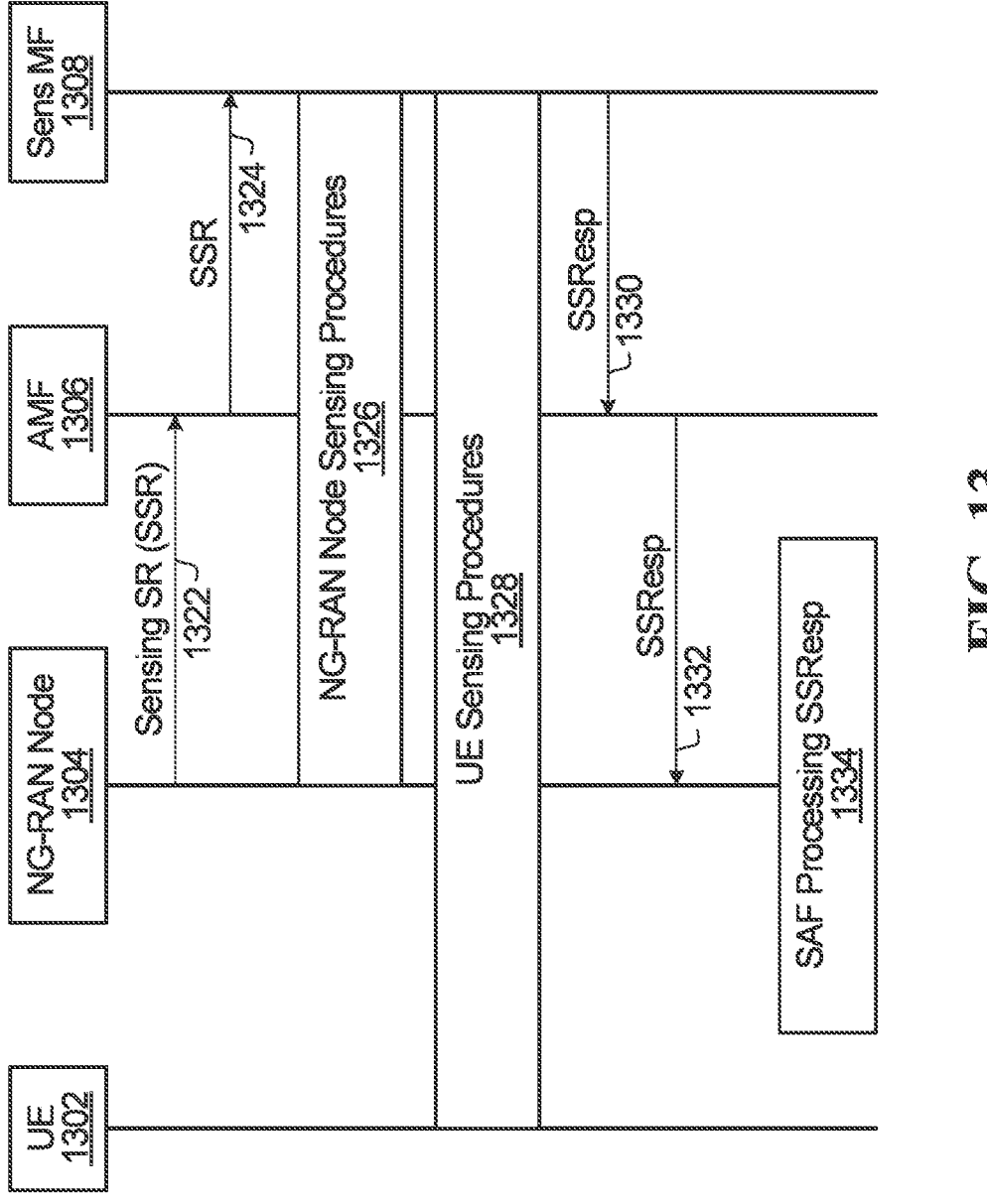
FIG. 13 is a signal flow diagram illustrating an example method that may be applicable to architectures of the type shown in FIG. 12.

FIG. 13 is a signal flow diagram illustrating an example method that may be applicable to architectures of the type shown in FIG. 12. Although described herein in the context of the sensing architecture shown in FIG. 12, methods consistent with FIG. 13 or parts thereof may also or instead be applied in different sensing architectures. Similarly, other methods herein may be applied in sensing architectures other than those in the context of which such methods are described.

The method illustrated by FIG. 13 involves a UE 1302, an NG-RAN node 1304, AMF 1306, and SensMF 1308. These components may be as shown at 1270, 1250/1260, 1224, and 1218, respectively, in FIG. 12, for example.

At 1322, a sensing service request (SSR) is transmitted by SAF at the NG-RAN node 1304 to AMF 1306 and received by AMF 1306. The SSR is more related to communication control and thus the SSR message context may include sensing request information more related to the communication. For example, an SSR may include information that is indicative of sensing requirements, such as any one or more of positioning, mobility, Doppler, moving direction, beamforming direction or angle, etc., of specific UEs and/or other devices or of UEs and/or other devices in certain areas. The SSR may also include sensing configuration parameters such as which sensing nodes, sensing service period, sensing operation mode, sensing reporting period, joint sensing with other sensors or individual sensing, etc.

In some embodiments, an SSR can request a measurement of vehicle and street traffic via some sensing nodes (e.g., sensing devices and TRPs), and be timed to be transmitted during the night or when there is little data communication in the wireless network for example. As a result, the SensMF and SAF may configure appropriate devices, TRPs and base stations to accomplish the requested service. Information indicative of measurements that are to be taken, and/or or other sensing parameters or requirements, may take any of various forms. The present disclosure is not restricted to any particular way of indicating sensing parameters or requirements. Implicit and explicit signaling are possible. An SSR may explicitly specify a measurement that is to be taken, for example, or such a measurement may be implicit in an SSR that specifies a particular sensing device that is to take a measurement.

An SSR can be triggered periodically or upon demand. Demand-based triggering of an SSR may be related to or in terms of conditions that are configured based on an application and its sensing data requirements for example. In an embodiment, when RAN operation is initialized, an administration and maintenance (OAM) module may configure one or more RAN nodes for sensing request periodicity or to define an event to trigger a sensing request or process. Such configuration may be semi-static in some embodiments.

In FIG. 13, the SSR is transmitted by AMF 1306 to SensMF 1308 and received by SensMF 1308 at 1324. Although shown as a two-step of two-part process in FIG. 13, this transfer of the SSR from SAF at the NG-RAN node 1304 to SensMF 1308 is an example of communicating, by a first sensing coordinator (SAF at NG-RAN node 1304) in a radio access network that provides access to a core network in a wireless communication system, a first signal (SSR) with a second sensing coordinator (SensMF 1308) by or through an interface link, which in this example is through AMF 1306.

1326 and 1328 in FIG. 13 illustrate interactions between SensMF 1308 and each of the NG-RAN node 1304 and the UE 1302, respectively. Although not shown in FIG. 13, before 1328 or when UE 1302 is initially entering the wireless communication system during initial access for example, the UE may report its sensing capability, including such capabilities as any one or more of sensing features that are supported and operational sensing modes that are supported, to SAF at the NG-RAN node 1304 and/or to SensMF 1308.

At 1326, SensMF 1308 manages and controls one or more NG-RAN nodes for a sensing procedure. For example, based on a sensing capability and sensing requirements, the SensMF 1308 may configure associated RAN node(s) for sensing activities, which may include sensing data or measurement result delivery to the SensMF for sensing analysis. At 1328, SensMF 1308 manages and controls one or more UEs for a sensing procedure. For example, a UE sensing capability (e.g., as reported by the UE during initial access to the network) and sensing requirements, the SensMF 1308 and RAN node(s) may configure associated UE node(s) for sensing activities, which may include sensing data or measurement result delivery to the SensMF for sensing analysis. Communications between sensing devices and a SensMF and/or SAF, such as at 1326 and 1328, are examples of communicating signals between sensing coordinators.

SensMF 1308 receives sensing measurement data transmitted from the UE 1302 (and possibly one or more other UEs or sensing devices) and/or the NG-RAN node 1304 (and possibly one or more other nodes) during the sensing procedures 1326, 1328. FIG. 13 includes both NG-RAN node sensing procedures 1326 and UE sensing procedures 1328 solely for illustrative purposes. Sensing may include either or both of NG-RAN node sensing procedures and UE sensing procedures.

A sensing service response (SSResp) is transmitted by SensMF 1308 and received by AMF 1306 at 1330, and is transmitted by AMF 1306 and received by NG-RAN node 1304 at 1332. This is another example of communicating a signal between sensing coordinators.

An SSResp 1330, 1332 may include any of various types of processed sensing-related information by SensMF 1308 after it receives all sensing or measurement information from associated sensing nodes/sensing devices in 1326 and/or 1328, where the sensing or measurement information is based on sensing requirements of the communication related SSR 1322, 1324. SensMF 1308 may, for example, use received raw measurement data to estimate sensing information that was requested. Requested sensing information may include, for example, specific device sensing information such as positioning, Doppler, moving direction, beamforming direction/angle, and/or mobility. Requested sensing information may also or instead include sensing information for a group of UE or other devices in certain areas. Otherwise handling sensing measurement data, such as processing sensing measurement data and/or generating sensing measurement data reports.

In general, SensMF 1308 may receive at least sensing measurement data from one or more sensing devices as shown by way of example at 1326, 1328, generate a response or report based on the received sensing measurement data, and transmit the response to or toward a requestor. A response or report may include one or more of: received raw measurement data, processed data, and/or another form of sensing measurement data report.

SAF processing of a sensing response or report such as SSResp at 1334 may include, for example, making use of sensing information for optimized control and/or communication. As an example, a sensing report may provide vehicle traffic information that can help auto-driving or a driver to avoid the high traffic congestion areas by taking alternative routes where the sensing report shows light traffic.

Figure 14:
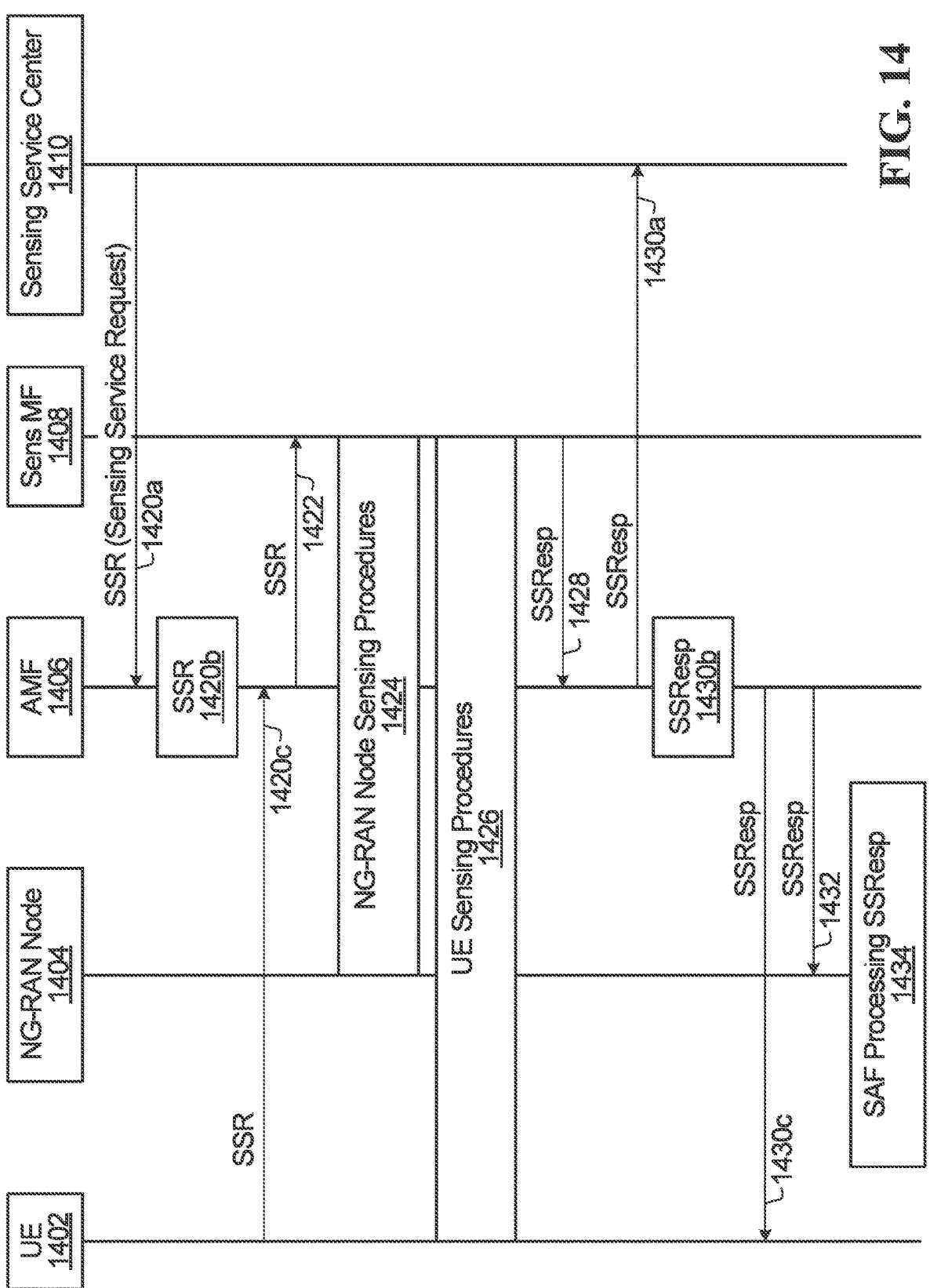
FIG. 14 is a signal flow diagram illustrating another example method that may be applicable to architectures of the type shown in FIG. 12.

FIG. 14 is a signal flow diagram illustrating another example method that may be applicable to architectures of the type shown in FIG. 12. The operating scenario in FIG. 14 is similar to that of FIG. 13, including a UE 1402, NG-RAN node 1404, AMF 1406, and SensMF 1408. A sensing service center 1410, which may be part of a core network or in an external network such as the edge cloud 1230 in FIG. 12, for example, is also shown in FIG. 14 as an example of another entity that might use a sensing service.

The general signal flow in FIG. 14 is similar to that in FIG. 13, including an SSR transmitted by AMF 1406 and received by SensMF 1408 at 1422, sensing procedures at 1424, 1426, either or both of which may be performed, and an SSResp transmitted by SensMF 1408 and received by AMF 1406 at 1428. FIG. 14 additionally illustrates other potential sources of SSRs and/or destinations of SSResps.

In particular, an SSR may be transmitted by the sensing service center 1410 and received by AMF 1406 as shown at 1420*a*, self-triggered or originated by AMF 1406 as shown at 1420*b*, or transmitted by the UE 1402 and received by AMF 1406 as shown at 1420*c*, where 1420*b* and 1420*c* can be sensing requests more related to communication and control. As the SSR 1420*a* is from the sensing service center 1410, the SSR message context may include sensing request context more related to standalone sensing service. For example, an SSR may include information that is indicative of sensing requirements, such as any one or more of positioning, vehicle traffic loading and congestion conditions, environment temperature, humidity, etc. of specific UEs and/or other devices or of UEs and/or other devices in certain areas. The SSR may also include sensing configuration parameters such as which sensing nodes, sensing service period, sensing operation mode, sensing reporting period, joint sensing with other sensors or individual sensing, etc. Any or all of these options, and potentially others such as SAF/RAN node SSRs as in FIG. 13, may be supported. Regardless of their origin, SSRs are transmitted by AMF 1406 to SensMF 1408 in the example shown in FIG. 14.

An SSResp 1428 in FIG. 14 may include any of various types of processed sensing-related information by SensMF 1408 after it receives (in one or more RAN nodes) all sensing or measurement information from associated sensing nodes/sensing devices in 1424 and/or 1426, where the sensing or measurement information is based on sensing requirements of SSR 1420*a*, 1420*b*, or/and 1420*c*. SensMF 1408 may, for example, use received raw measurement data to estimate sensing information that was requested. Requested sensing information may include, for example, specific device sensing information such as positioning, vehicle traffic loading and congestion conditions, environment temperature, humidity, Doppler, moving direction, beamforming direction/angle, traffic loading, and/or mobility. The SSResp 1428 may include individual sensing response(s) of SSResp 1430*a*, 1430*b* or/and 1430*c* (not shown in FIG. 14), where SSResp 1430*a*, 1430*b* and 1430*c* are outcomes as a result of the sensing service requests SSR 1420*a*, 1420*b*, and 1420*c*, respectively.

Regarding any SSResp among SSResp 1430*a*, 1430*b* and 1430*c*, options illustrated in FIG. 14 include AMF 1406 transmitting an SSResp and the sensing service center 1410 receiving the SSResp at 1430*a*, AMF 1406 receiving an SSResp and processing or potentially routing the SSResp internally in the core network as shown at 1430*b*, AMF 1406 transmitting the SSResp and the UE 1402 receiving the SSResp as shown at 1420*c*, and AMF 1406 transmitting the SSResp and NG-RAN node 1404 receiving the SSResp as shown at 1432. The option at 1432 is illustrative of an embodiment in which an SSResp may be transmitted to a SAF, or more generally to another entity, that did not originate or transmit the SSR. For example, the SAF may update its local sensing information from the sensing analysis report from SensMF 1408 for more accurate sensing information as well as better communication control in one or more RAN node(s).

Any or all of these options, and potentially others, may be supported. In the example shown, an SSResp is always transmitted to and received by AMF 1406 by SensMF 1408.

As in FIG. 13, SAF processing of a sensing response or report such as SSResp is shown in FIG. 14 at 1434.

Figure 15:
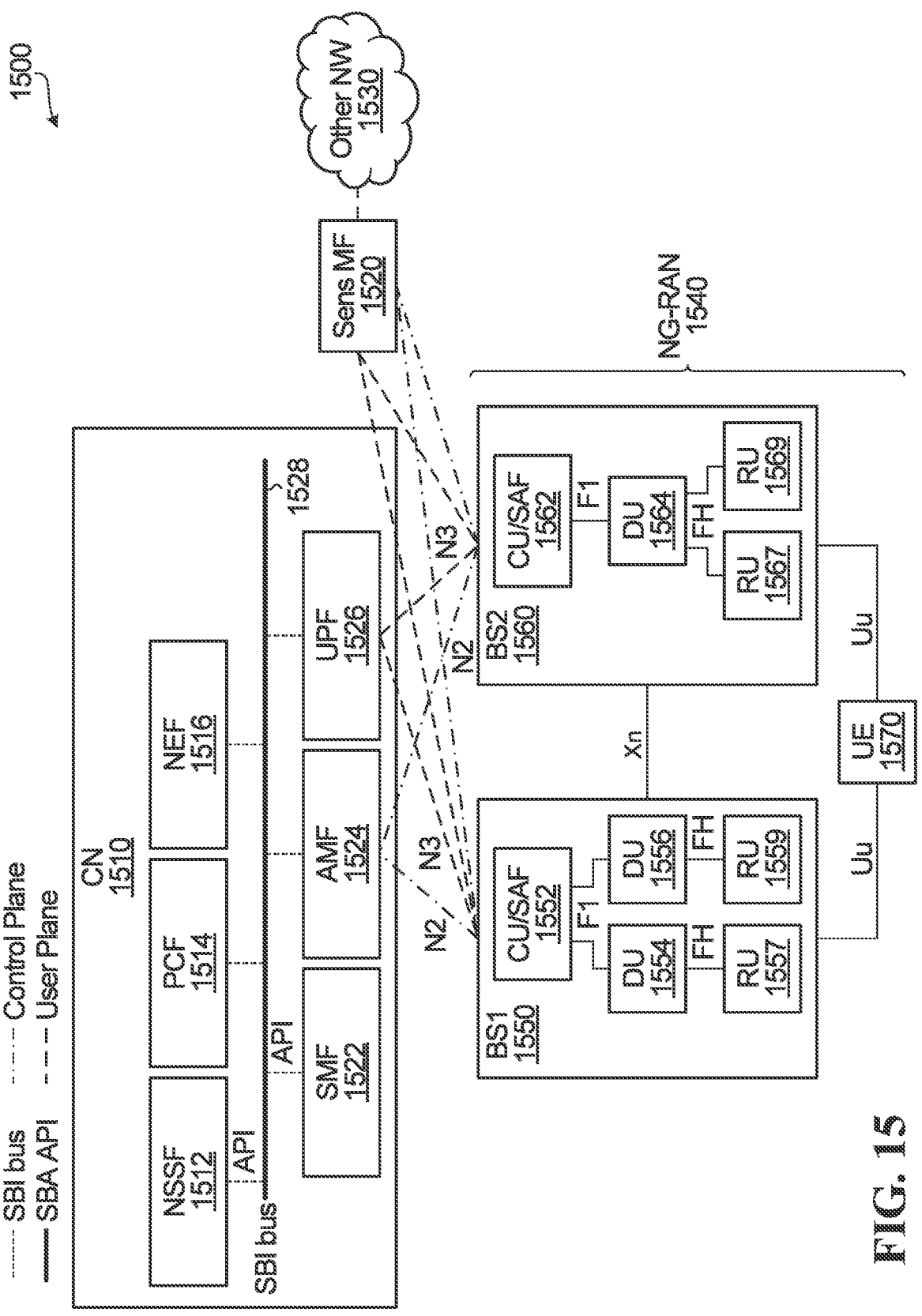
FIG. 15 is a block diagram of a sensing architecture according to yet another embodiment.

FIG. 15 is a block diagram of a sensing architecture 1500 according to yet another embodiment. With reference to FIG. 15, a core network is shown at 1510, an external network that is outside the core network is shown at 1530, and an NG-RAN is shown at 1540. SensMF 1520 may or may not connect to the core network 1510. The NG-RAN 1540 includes BS1 1550 and BS2 1560, and a UE for which the NG-RAN provides access to the core network 1510 is shown at 1570.

BS1 and BS2 both have a CU/DU/RU architecture, each including one CU/SAF 1552, 1562 including SAF, and two RUs 1557/1559, 1567/1569. BS1 includes two DUs 1554, 1556, and BS2 includes one DU 1564. Interfaces through which BS1 and BS2 communicate with each other and with the UE 1570 are shown as Xn and Uu interfaces, respectively, and an F1 CU/DU interface is also shown as an example.

The sensing architecture 1500 is substantially similar to the sensing architecture 1200 in FIG. 12, but with a sensing coordinator (SensMF 1520) located outside the core network 1510. SensMF 1520 may communicate with the NG-RAN 1540 and one or more SAFs in one or more RAN nodes such as BS1 and/or BS2, for example, through the core network 1510 or directly. Other examples of this type of architecture, with core network or direct communication between SensMF and SAF, are also shown in FIGS. 6B, 6C, 7B, 7C, 8B, and 8C.

Figure 16:
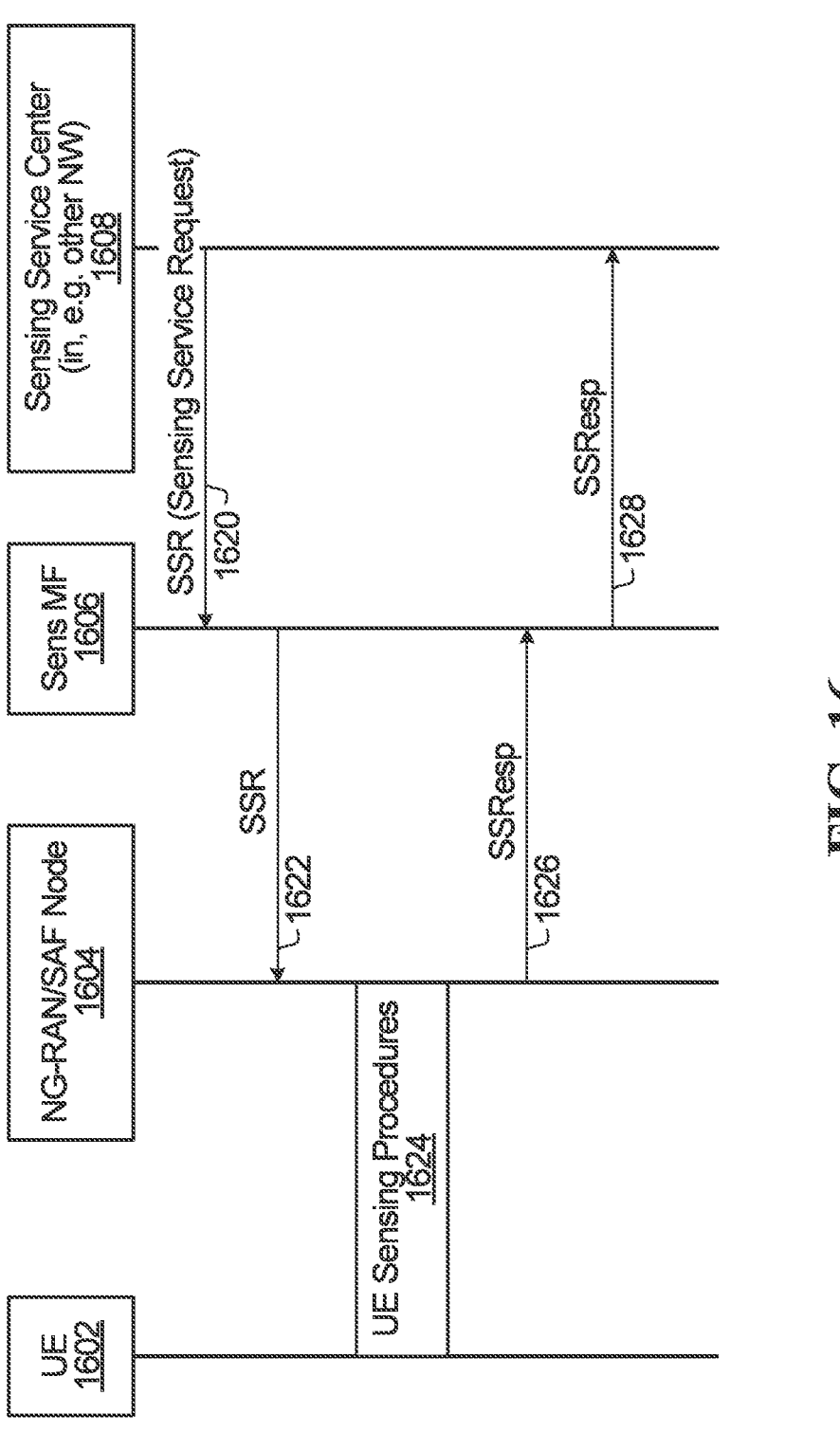
FIG. 16 is a signal flow diagram illustrating an example method that may be applicable to architectures of the type shown in FIG. 15.

FIG. 16 is a signal flow diagram illustrating an example method that may be applicable to architectures of the type shown in FIG. 15. The example shown in FIG. 16 relates to an operating scenario including a UE 1602, NG-RAN node 1604, SensMF 1606, and sensing service center 1608 which, as indicated, may be located in the other network 1530 in FIG. 15. SAF is located at the NG-RAN node 1604 in FIG. 16.

An SSR is transmitted by sensing service center 1608 and received by SensMF 1606 at 1620, and is transmitted by SensMF 1606 and received by NG-RAN node 1604 at 1622. UE sensing procedures are shown at 1624, and in this example an SSResp is generated and transmitted by SAF at the NG-RAN node 1604. The SSResp is transmitted by the NG-RAN node 1604 and received by SensMF 1608 at 1626, and at 1628 SensMF then transmits the SSResp, which is received by the sensing service center 1608. In this example, 1622 and 1626 are both illustrative of communicating a signal between sensing coordinators (SensMF and SAF), one of which (the SAF at the NG-RAN node 1604) is in a RAN.

Figure 17:
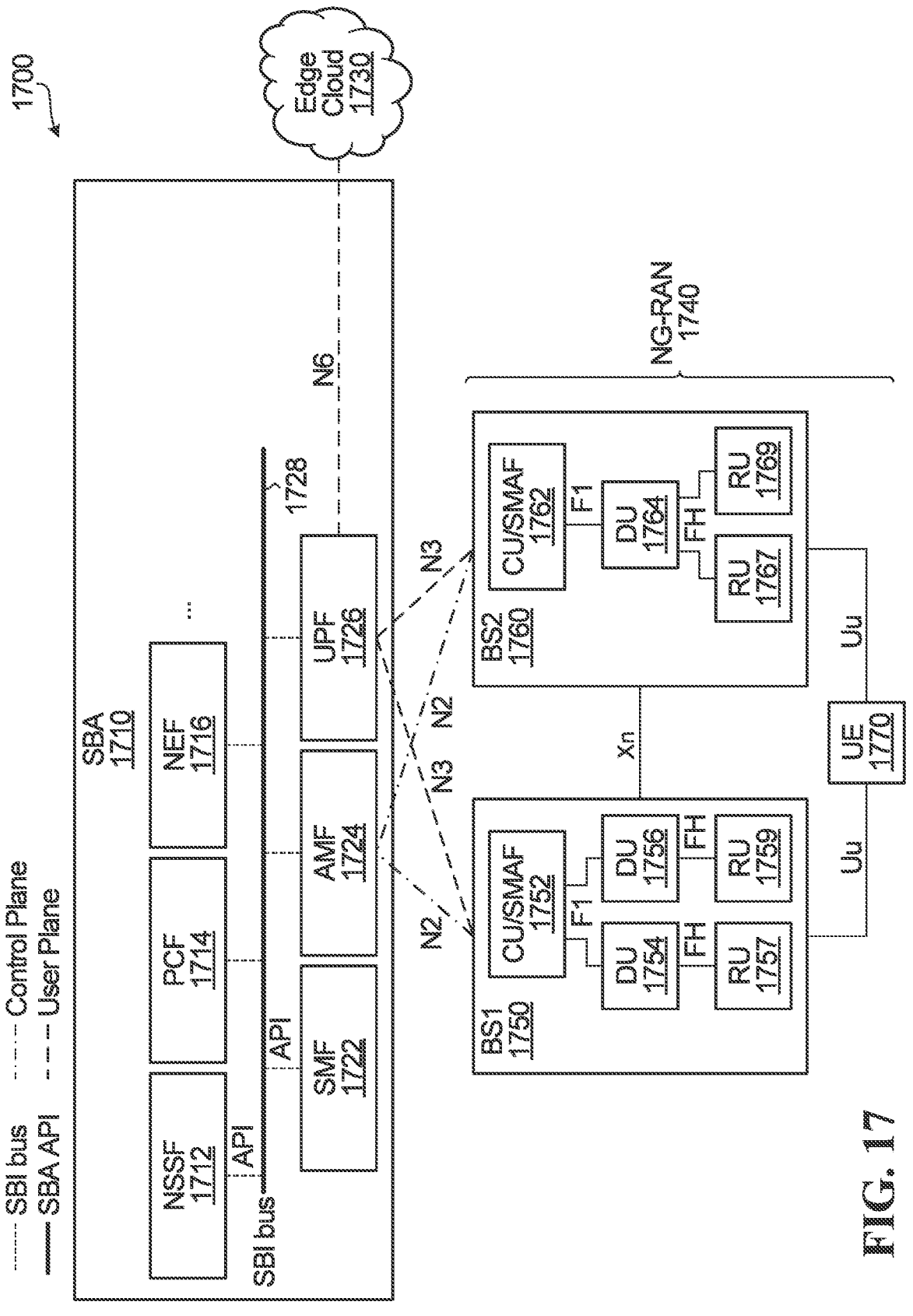
FIG. 17 is a block diagram of a sensing architecture according to a further embodiment.

FIG. 17 is a block diagram of a sensing architecture according to a further embodiment. A core network 1710 is shown by way of example as an SBA network, an external network 1730 that is outside the core network is shown by way of example as an edge cloud, and an NG-RAN is shown at 1740. The NG-RAN 1740 includes BS1 1750 and BS2 1760, and a UE for which the NG-RAN provides access to the core network 1710 is shown at 1770.

BS1 and BS2 both have a CU/DU/RU architecture, each including one CU/SMAF 1752, 1762 including SMAF, and two RUs 1757/1759, 1767/1769. BS1 includes two DUs 1754, 1756, and BS2 includes one DU 1764. Although SMAF is shown in combination with a CU in FIG. 17, a SMAF need not necessarily be integrated into or otherwise combined with a CU. Interfaces through which BS1 and BS2 communicate with each other and with the UE 1770 are shown as Xn and Uu interfaces, respectively, and an F1 CU/DU interface is also shown as an example.

The sensing architecture 1700 is substantially similar to the sensing architecture 1200 in FIG. 12, but without SensMF outside the NG-RAN 1740. The NG-RAN 1740 includes one or more SMAFs, one of which is implemented in each of the BSs 1750, 1760 in the example shown. Other examples of this type of architecture, with sensing coordination concentrated in a RAN and communication with one or more SMAFs through a core network, are also shown in FIGS. 9A, 10A, and 11A.

Figure 18:
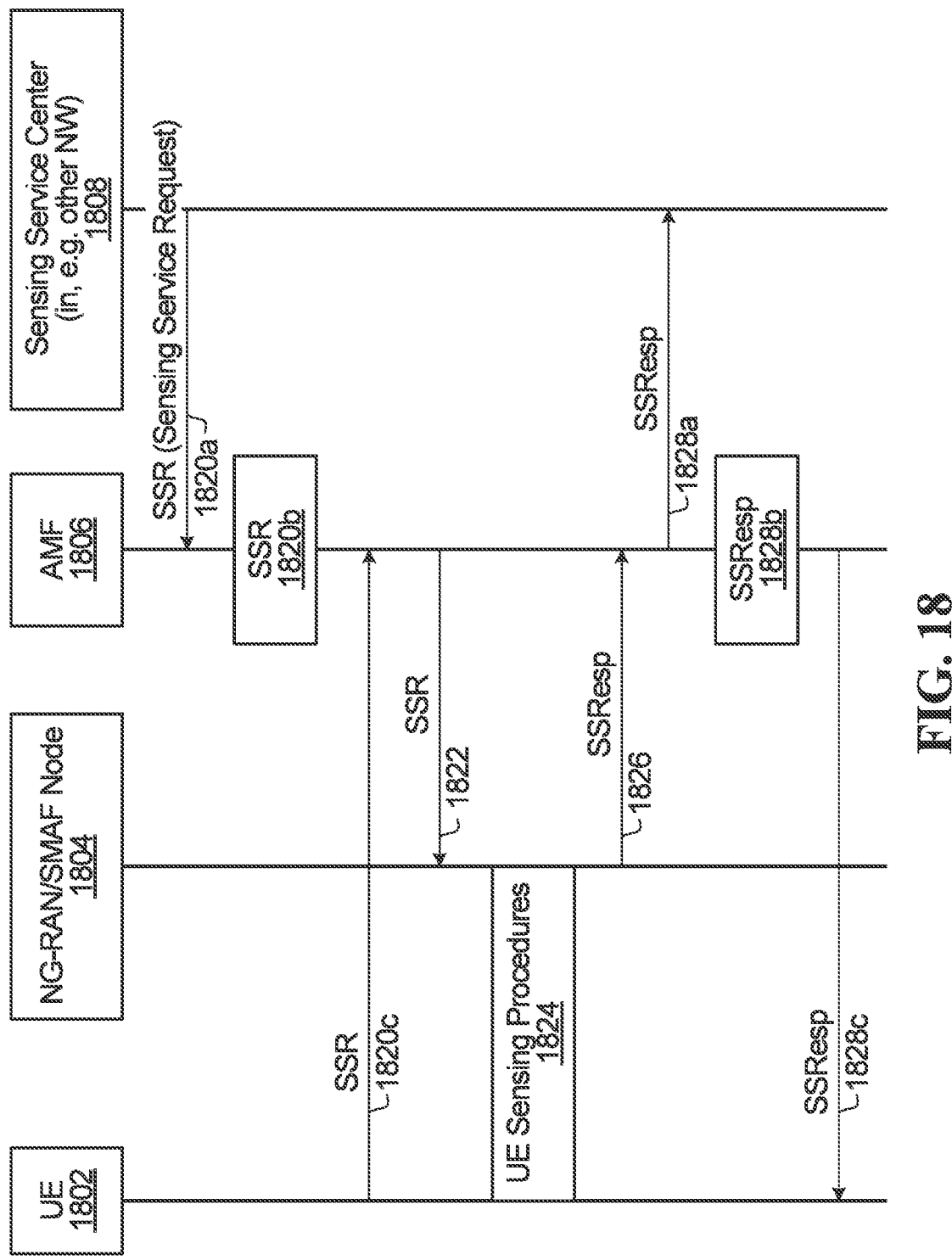
FIG. 18 is a signal flow diagram illustrating an example method that may be applicable to architectures of the type shown in FIG. 17.

FIG. 18 is a signal flow diagram illustrating an example method that may be applicable to architectures of the type shown in FIG. 17. The example shown in FIG. 18 relates to an operating scenario including a UE 1802, NG-RAN node 1804, SensMF 1806, and sensing service center 1808 which, as indicated, may be located in another network, such as the edge cloud 1730 in FIG. 17. SAF is located at the NG-RAN node 1804 in FIG. 18.

The general signal flow in FIG. 18 is similar to that in other signal flow diagrams, including an SSR transmitted by AMF 1806 and received by a sensing coordinator (SMAF in the NG-RAN node 1804) at 1822, UE sensing procedures at 1824, an SSResp transmitted by a sensing coordinator (SMAF in the NG-RAN node 1804) and received by AMF 1806 at 1826. Potential sources of SSRs in FIG. 18 include the sensing service center 1808 as a source transmitting an SSR that is received by AMF 1806 as shown at 1820*a*, AMF 1806 as a source self-originating or self-triggering an SSR as shown at 1820*b*, or the UE 1802 as a source transmitting an SSR that is received by AMF 1806 as shown at 1820*c*. An SSR is transmitted by AMF 1806 to the NG-RAN node 1804 in the example shown in FIG. 18, whether that SSR originates with AMF 1806 itself or from another entity. Potential destinations of SSResps in FIG. 18 include the sensing service center 1808 receiving an SSResp that is transmitted by AMF 1806 as shown at 1828*a*, AMF 1806 receiving an SSResp transmitted by and processing or potentially routing the SSResp internally in the core network as shown at 1828*b*, and the UE 1802 receiving an SSResp transmitted by AMF 1806 as shown at 1820*c*. Any or all of these options, and potentially others, may be supported. In the example shown, an SSR and an SSResp are communicated between at least SMAF at the NG-RAN node 1804 and AMF 1806.

Although not shown in FIG. 18, there may be other SMAF processing, instead of or in addition to processing to generate an SSResp for example, at the NG-RAN node 1804.

Figure 19:
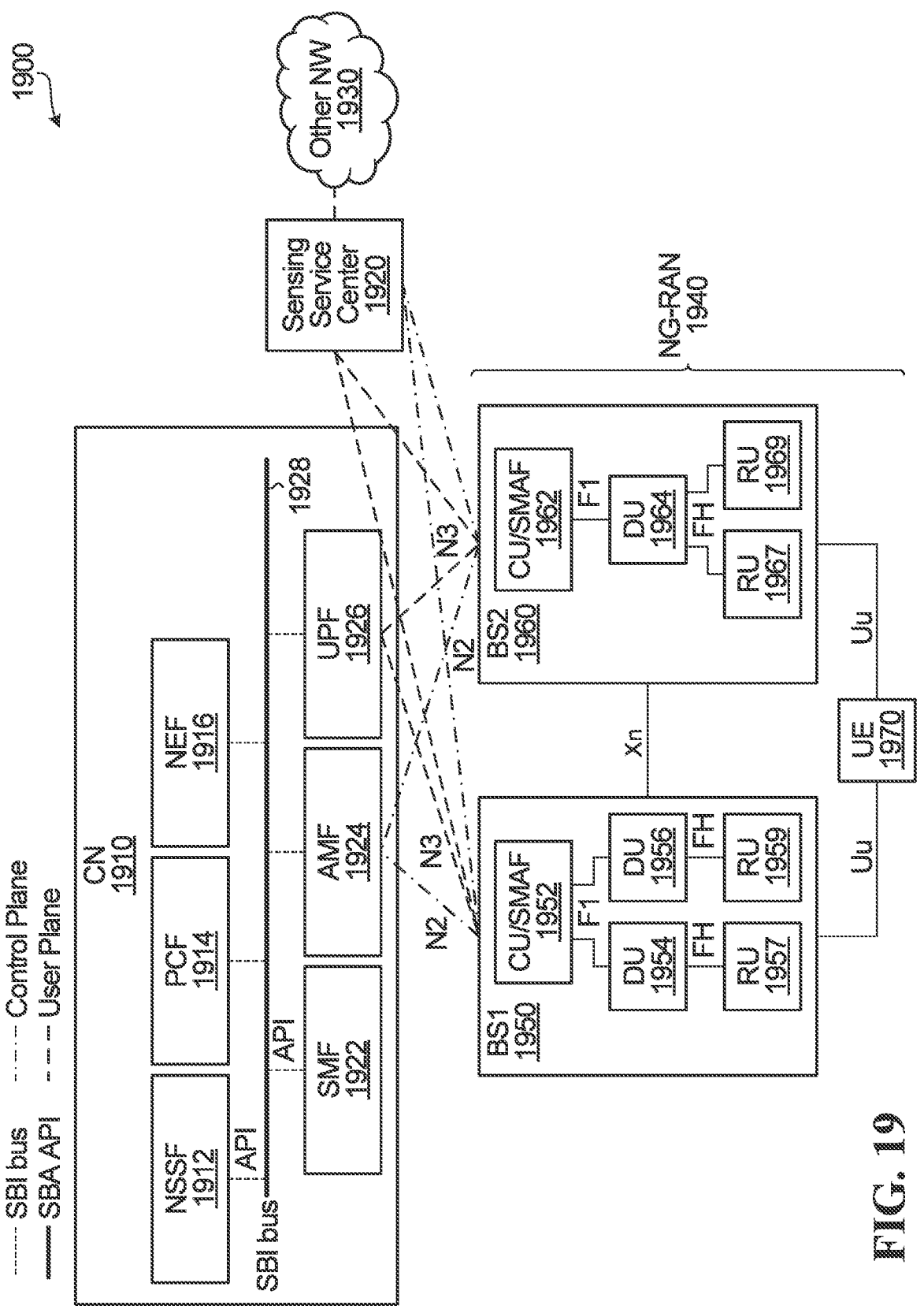
FIG. 19 is a block diagram of a sensing architecture according to another embodiment.

FIG. 19 is a block diagram of a sensing architecture according to another embodiment. A core network is shown at 1910, an external network that is outside the core network is shown at 1930, and an NG-RAN is shown at 1940. A sensing service center 1920 may or may not connect to the core network 1910. The NG-RAN 1940 includes BS1 1950 and BS2 1960, and a UE for which the NG-RAN provides access to the core network 1910 is shown at 1970.

BS1 and BS2 both have a CU/DU/RU architecture, each including one CU/SMAF 1952, 1962 including SMAF, and two RUs 1957/1959, 1967/1969. BS1 includes two DUs 1954, 1956, and BS2 includes one DU 1964. Interfaces through which BS1 and BS2 communicate with each other and with the UE 1970 are shown as Xn and Uu interfaces, respectively, and an F1 CU/DU interface is also shown as an example.

The sensing architecture 1900 is substantially similar to the sensing architecture 1500 in FIG. 15, but without SensMF outside the NG-RAN 1940. The NG-RAN 1940 includes one or more SMAFs, one of which is implemented in each of the BSs 1950, 1960 in the example shown. Other examples of this type of architecture, with sensing coordination concentrated in a RAN and communication with one or more SMAFs through a core network or directly, are also shown in FIGS. 9B, 9C, 10B, 10C, 11B, and 11C.

Figure 20:
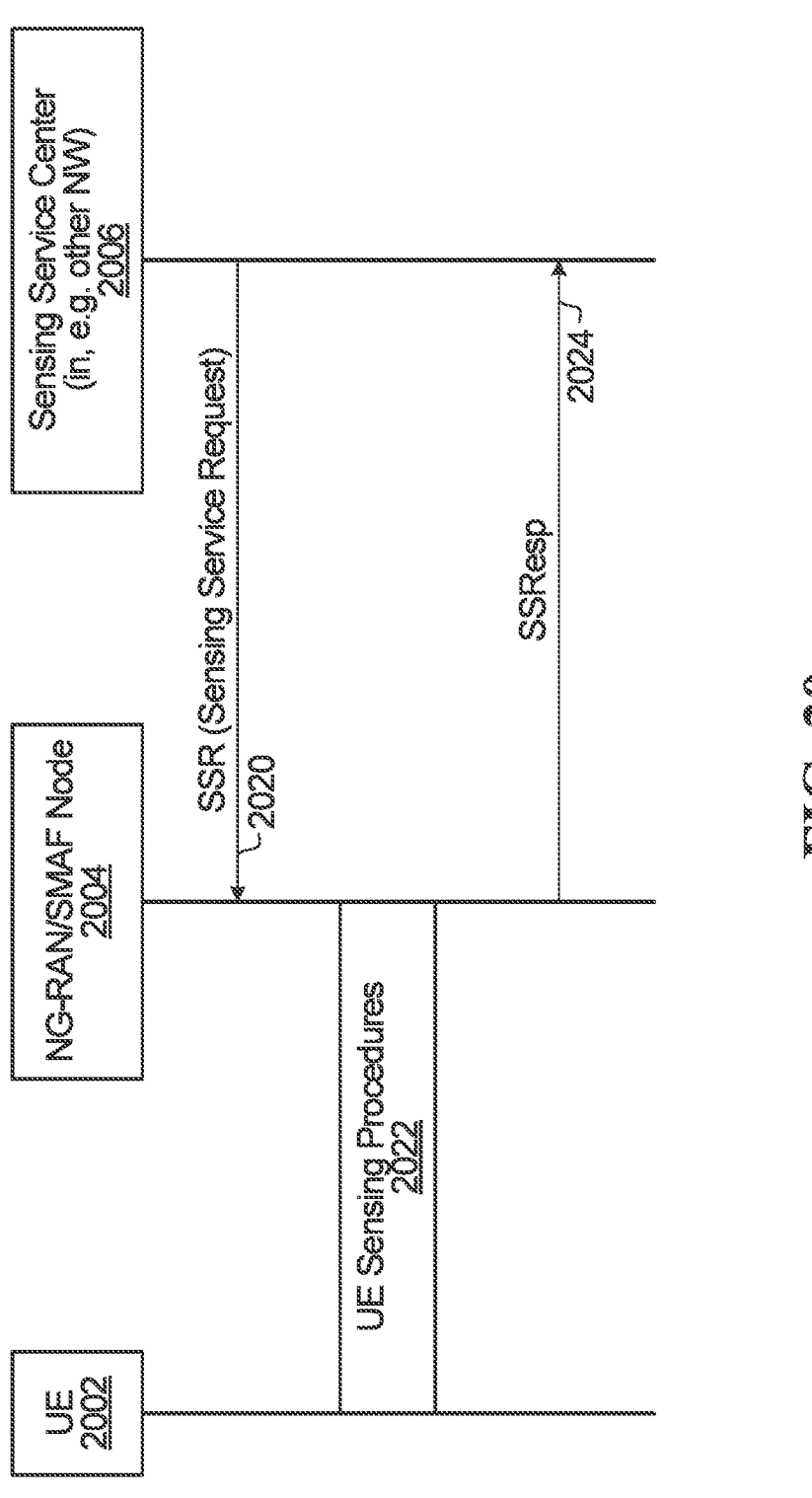
FIG. 20 is a signal flow diagram illustrating an example method that may be applicable to architectures of the type shown in FIG. 19.

FIG. 20 is a signal flow diagram illustrating an example method that may be applicable to architectures of the type shown in FIG. 19. The example shown in FIG. relates to an operating scenario including a UE 2002, NG-RAN node 2004, and sensing service center 2006 which, as indicated, may be located in another network, such as the network 1930 in FIG. 19. SMAF is located at the NG-RAN node 2004 in FIG. 20.

The general signal flow in FIG. 20 is similar to that in other signal flow diagrams. An SSR is transmitted, by the sensing service center 2006 in this example, and is received by a sensing coordinator (SMAF in the NG-RAN node 2004) at 2020, UE sensing procedures are performed at 2022, and an SSResp transmitted by a sensing coordinator (SMAF in the NG-RAN node 2004) and received by the sensing service center 2006 at 2024. This is similar to, for example, FIG. 16 except that there is no SensMF in FIG. 20, and to FIG. 18 except that there is no AMF in FIG. 20.

Although not shown in FIG. 20, there may be other SMAF processing, instead of or in addition to processing to generate an SSResp for example, at the NG-RAN node 2004.

Figure 21:
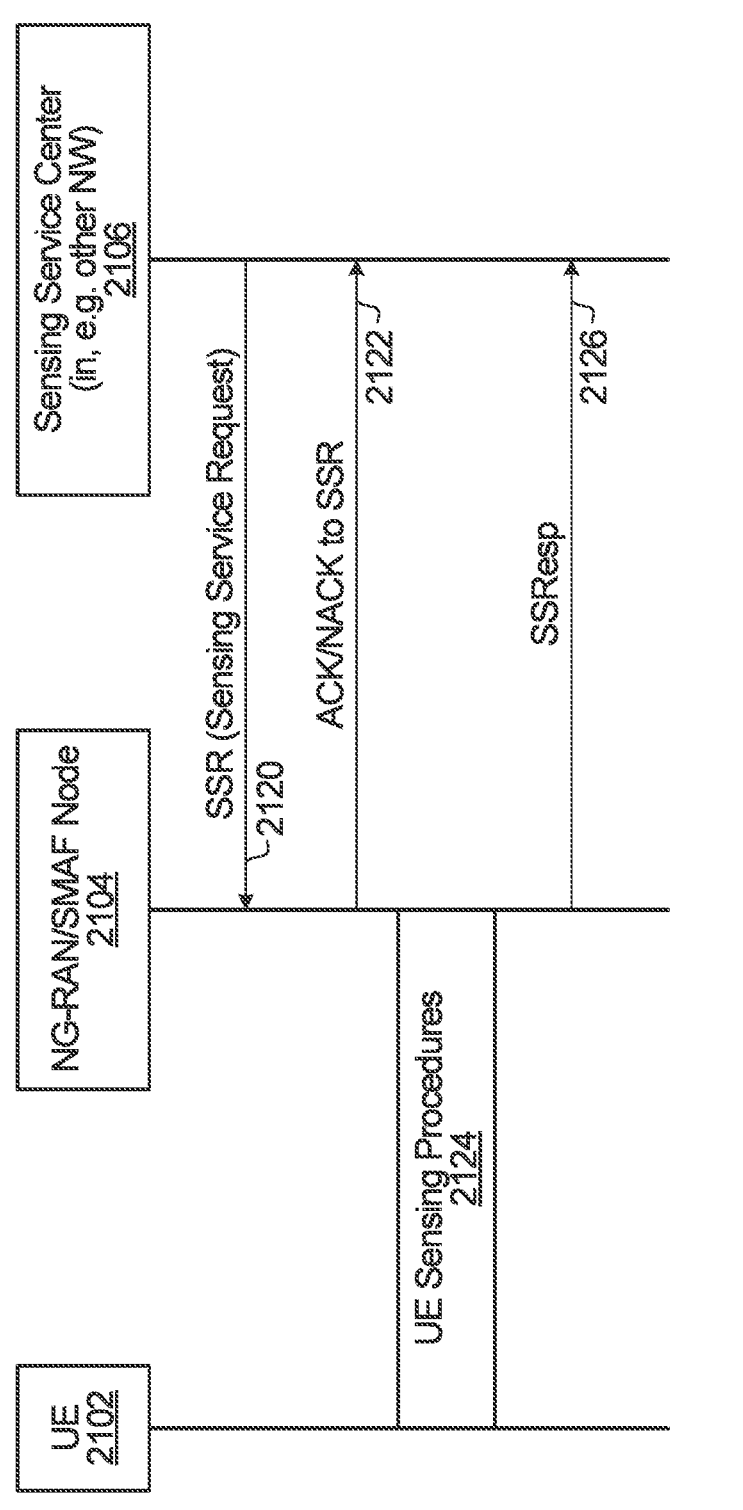
FIG. 21 is a signal flow diagram illustrating another example method that may be applicable to architectures of the type shown in FIG. 19.

Other procedures or features may also or instead be provided. FIG. 21 is a signal flow diagram illustrating another example method that may be applicable to architectures of the type shown in FIG. 19, and includes an example of an additional feature that may be provided in some embodiments. In particular, within the same operating scenario including a UE 2102, NG-RAN node 2104, and sensing service center 2106 and an SSR/UE sensing procedures/SSResp process at 2120, 2124, 2126 as in FIG. 20, FIG. 21 also includes an acknowledgement/negative acknowledgement (ACK/NACK) to the SSR, transmitted by a sensing coordinator (SMAF at the NG-RAN node 2104) to a requestor (the sensing service center 2106) at 2122. A NACK for the SSR may be sent at 2122, for example, if a sensing service is unavailable or the SSR cannot be processed for another reason.

Although ACK/NACK signaling is illustrated in FIG. 21, other types of signaling may also or instead be used in other embodiments to confirm to a requestor whether a sensing service request has been received and/or is being processed. It should also be appreciated that confirmation signaling such as ACK/NACK is not in any way restricted to embodiments that involve SMAF and/or a sensing service center, and may be implemented in conjunction with other embodiments disclosed herein.

Figure 22:
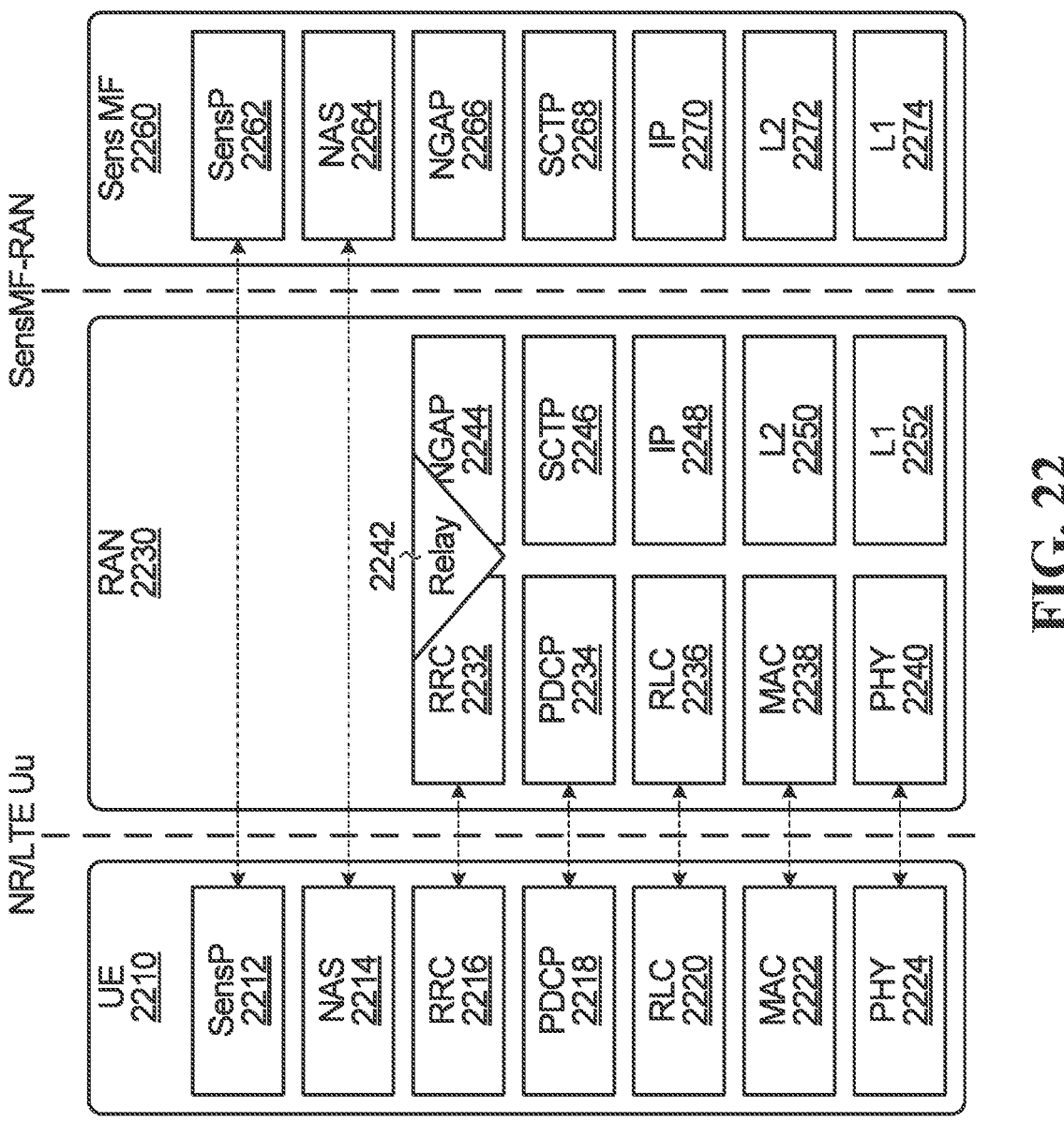
FIG. 22 is a block diagram illustrating example protocol stacks according to an embodiment.

FIG. 22 is a block diagram illustrating example protocol stacks according to an embodiment. Example protocol stacks at a UE, RAN, and SensMF are shown at 2210, 2230, 2260, respectively, for an example that is based on an uu air interface between the UE and the RAN. FIG. 22, and other block diagrams illustrating protocol stacks, are examples only. Other embodiments may include similar or different protocol layers, arranged in similar or different ways.

A sensing protocol or SensProtocol (SensP) layer 2212, 2262, shown in the example UE and SensMF protocol stacks 2210, 2260, is a higher protocol layer between a SensMF and a UE to support transfer of control information and/or sensing information transfer over an air interface, which is or at least includes an uu interface in the example shown.

Non-access stratum (NAS) layer 2214, 2264, also shown in the example UE and SensMF protocol stacks 2210, 2260, is another higher protocol layer, and forms a highest stratum of a control plane between a UE and a core network at the radio interface in the example shown. NAS protocols may be responsible for such features as any one or more of: supporting mobility of the UE and session management procedures to establish and maintain IP connectivity between the UE and the core network in the example shown. NAS security is an additional function of the NAS layer that may be provided in some embodiments to support one or more services to the NAS protocols, such as integrity protection and/or ciphering of NAS signaling messages for example.

A radio resource control (RRC) layer 2216, 2232, shown in the UE and RAN protocol stacks at 2210, 2230, is responsible for such features as any of: broadcast of system information related to the NAS layer; broadcast of system information related to an access stratum (AS); paging; establishment, maintenance and release of an RRC connection between the UE and a base station or other network device; security functions; etc.

A packet data convergence protocol (PDCP) layer 2218, 2234 is also shown in the example UE and RAN protocol stacks 2210, 2230, and is responsible for such features as any of: sequence numbering; header compression and decompression; transfer of user data; reordering and duplicate detection, if order delivery to layers above PDCP is required; PDCP protocol data unit (PDU) routing in the case of split bearers; ciphering and deciphering; duplication of PDCP PDUs; etc.

A radio link control (RLC) layer 2220, 2236 is shown in the example UE and RAN protocol stacks 2210, 2230, and is responsible for such features as any of: transfer of upper layer PDUs; sequence numbering independent of sequence numbering in PDCP; automatic repeat request (ARQ) segmentation and re-segmentation; reassembly of service data units (SDUs); etc.

A media access control (MAC) layer 2222, 2238, also shown in the example UE and RAN protocol stacks 2210, 2230, is responsible for such features as any of: mapping between logical channels and transport channels; multiplexing of MAC SDUs from one logical channel or different logical channels onto transport blocks (TBs) to be delivered to a physical layer on transport channels; demultiplexing of MAC SDUs from one logical channel or different logical channels from TBs delivered from a physical layer on transport channels; scheduling information reporting; and dynamic scheduling for downlink and uplink data transmissions for one or more UEs.

The physical (PHY) layer 2224, 2240 may provide or support such features as any of: channel encoding and decoding; bit interleaving; modulation; signal processing; etc. A PHY Layer handles all information from MAC layer transport channels over an air interface and may also handle such procedures as link adaptation through adaptive modulation and coding (AMC) for example, power control, cell search for either or both of initial synchronization and handover purposes, and/or other measurements, jointly working with a MAC layer.

The relay 2242 represents the information relaying over different protocol stacks by a protocol conversion from one interface to another, where the protocol conversion is between an air interface (between UE 2210 and RAN 2230) and wireline interface (between RAN 2230 and SensMF 2260).

The NG (next generation) application protocol (NGAP) layer 2244, 2266 in the RAN and SensMF example protocol stacks 2230, 2260 provides a way of exchanging control plane messages associated with the UE over the interface between the RAN and SensMF, where the UE association with the RAN at NGAP layer 2244 is by UE NGAP ID unique in the RAN, and the UE association with SensMF at NGAP layer 2266 is by UE NGAP ID unique in the SensMF, and two UE NGAP IDs may be coupled in the RAN and SensMF upon session setup.

The RAN and SensMF example protocol stacks 2230, 2260 also include a stream control transmission protocol (SCTP) layer 2246, 2268, which may provide features similar to those of the PDCP layer 2218, 2234 but for a wired SensMF-RAN interface.

Similarly, the internet protocol (IP) layer 2248, 2270, layer 2 (L2) 2250, 2272, and layer 1 (L1) 2252, 2274 protocol layers in the example shown may provide features similar to those RLC, MAC, and PHY layers in the NR/LTE Uu air interface, but for a wired SensMF-RAN interface in the example shown.

FIG. 22 shows an example of protocol layering for SensMF/UE interaction. In this example, SensP is used on top of a current air interface (uu) protocol. In other embodiments SensP may be used with a newly designed air interface for sensing in lower layers. SensP is intended to represent a higher layer protocol to carry sensing data, optionally with encryption, according a sensing format defined for data transmission between UE and a sensing module or coordinator such as SensMF.

Figure 23:
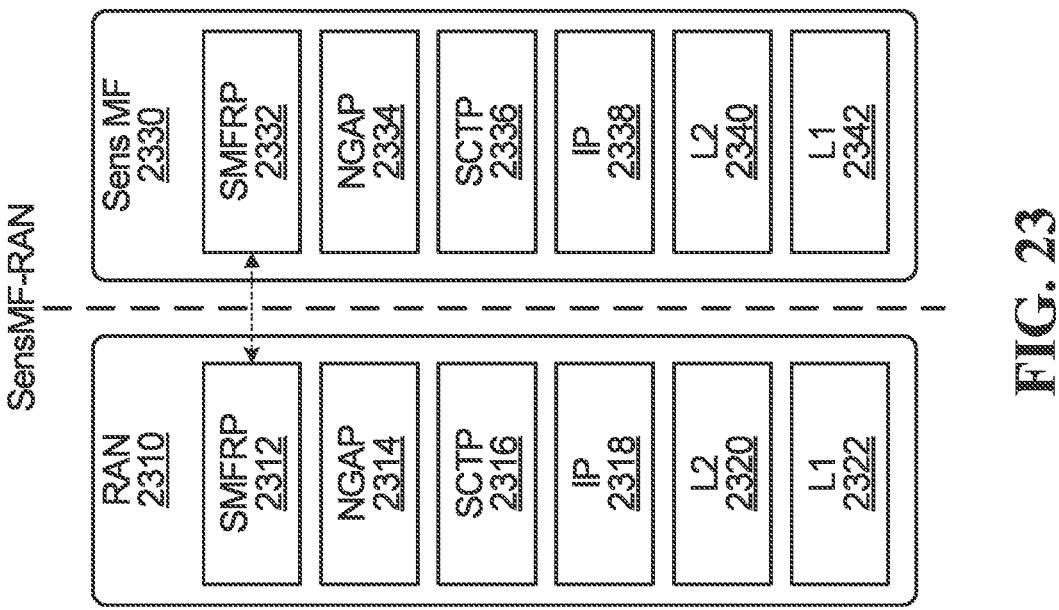
FIG. 23 is a block diagram illustrating example protocol stacks according to another embodiment.

FIG. 23 is a block diagram illustrating example protocol stacks according to another embodiment. Example protocol stacks at a RAN and SensMF are shown at 2310 and 2330, respectively. FIG. 23 relates to RAN/SensMF interaction, and may be applied to any of various types of interface between UEs and the RAN.

A SensMFRAN protocol (SMFRP) layer 2312, 2332, represents a higher protocol layer between SensMF and a RAN node, to support transfer of control information and sensing information over an interface between SensMF and a RAN node, which is a wireline connection interface in this example. The other illustrated protocol layers include NGAP layer 2314, 2334, SCTP layer 2316, 2336, IP layer 2318, 2338, L2 2320, 2340, and L1 2312, 2342, which are described by way of example at least above.

FIG. 23 shows an example of protocol layering for SensMF/RAN node interaction. SMFRP can be used on top of a wireline connection interface as in the example shown, on top of a current air interface (uu) protocol, or with a newly designed air interface for sensing in lower layers. SensP is another higher layer protocol to carry sensing data, optionally with encryption, and with a sensing format defined for data transmission between sensing coordinators, which may include a UE as shown in FIG. 22, a RAN node with a SAF or SMAF, and/or a sensing coordinator such as SensMF implemented in a core network or a third-party network.

Figure 24:
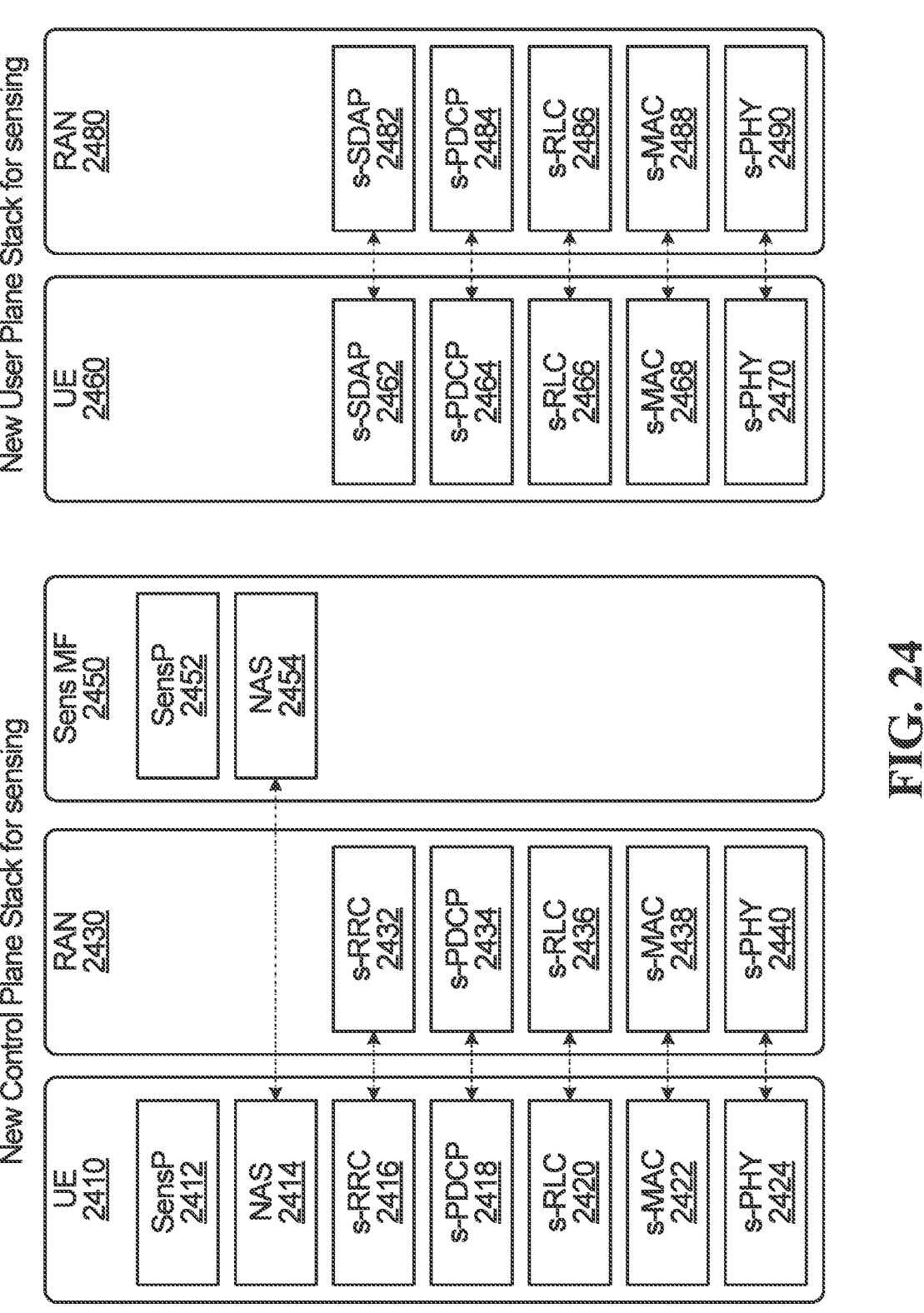
FIG. 24 is a block diagram illustrating example protocol stacks according to a further embodiment.

FIG. 24 is a block diagram illustrating example protocol stacks according to a further embodiment, and includes example protocol stacks for a new control plane for sensing and a new user plan for sensing. Example control plane protocol stacks at a UE, RAN, and SensMF are shown at 2410, 2430, 2450, respectively, and example user plane protocol for a UE and RAN are shown at 2460 and 2480, respectively.

The example in FIG. 22 is based on an uu air interface between the UE and the RAN, and in the example sensing connectivity protocol stacks in FIG. 24 the UE/RAN air interfaces are newly designed or modified sensing-specific interfaces, as indicated by the "s-" labels for the protocol layers. In general, an air interface for sensing can be between a RAN and a UE, and/or include wireless backhaul between SensMF and RAN.

The SensP layers 2412, 2452 and the NAS layers 2414, 2454 are described by way of example at least above.

The s-RRC layers 2416, 2432 may reuse 4G or 5G air interface RRC protocol, or use a newly defined or modified RRC layer for sensing. For example, system information broadcasting for s-RRC may include a sensing configuration for a device during initial access to the network, sensing capability information support, etc.

The s-PDCP layers 2418, 2434 may similarly reuse 4G or 5G air interface PDCP protocol, or use a newly defined or modified PDCP layer for sensing, for example, to provide PDCP routing and relaying over one or more relay nodes, etc.

The s-RLC layers 2420, 2436 may reuse 4G or 5G air interface RLC protocol, or use a newly defined or modified RLC layer for sensing, for example, with no SDU segmentation.

The s-MAC layers 2422, 2438 may reuse 4G or 5G air interface MAC protocol, or use a newly defined or modified MAC layer for sensing, for example, using one or more new MAC control elements, one or more new logical channel identifier(s), different scheduling, etc.

Similarly, the s-PHY layers 2424, 2440 may reuse 4G or 5G air interface PHY protocol, or use a newly defined or modified PHY layer for sensing, for example, using one or more of: a different waveform, different encoding, different decoding, a different modulation and coding scheme (MCS), etc.

In the example new user plane for sensing, the following layers are described by way of example at least above: s-PDCP 2464, 2484, s-RLC 2466, 2486, s-MAC 2468, 2488, s-PHY layer 2470, 2490. A service data adaptation protocol (SDAP) layer is responsible for, for example, mapping between a quality-of-service (QoS) flow and a data radio bearer and marking QoS flow identifier (QFI) in both downlink and uplink packets, and a single protocol entity of SDAP is configured for each individual PDU session except for dual connectivity where two entities can be configured. The s-SDAP layers 2462, 2482 may reuse 4G or 5G air interface SDAP protocol, or use a newly defined or modified SDAP layer for sensing, for example, to define QoS flow IDs for sensing packets differently from downlink and uplink data bearers or in a special identity or identities for sensing, etc.

Figure 25:
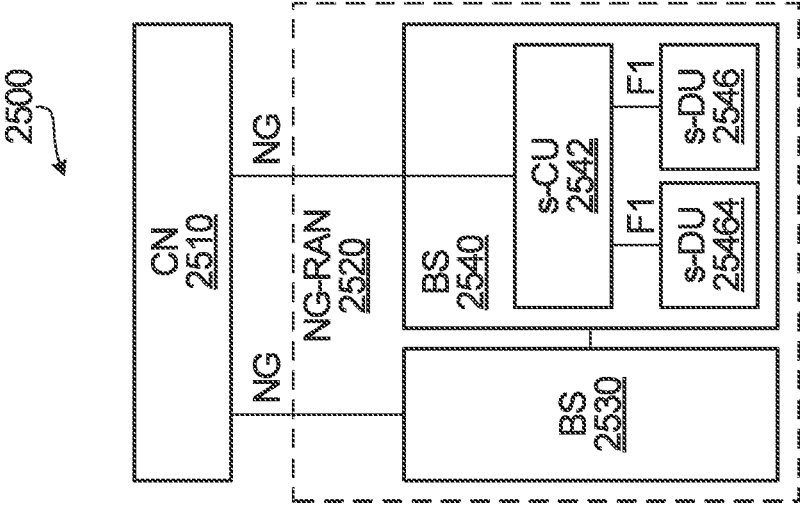
FIG. 25 is a block diagram illustrating an example interface between a core network and a RAN.

FIG. 25 is a block diagram illustrating an example interface between a core network and a RAN. The example 2500 illustrates an "NG" interface between a core network 2510 and a RAN 2520, in which two BSs 2530, 2540 are shown as example RAN nodes. The BS 2540 has a sensing-specific CU/DU architecture including an s-CU 2542 and two s-DUs 2544, 2546. The BS 2530 may have the same or similar structure in some embodiments.

Figure 26:
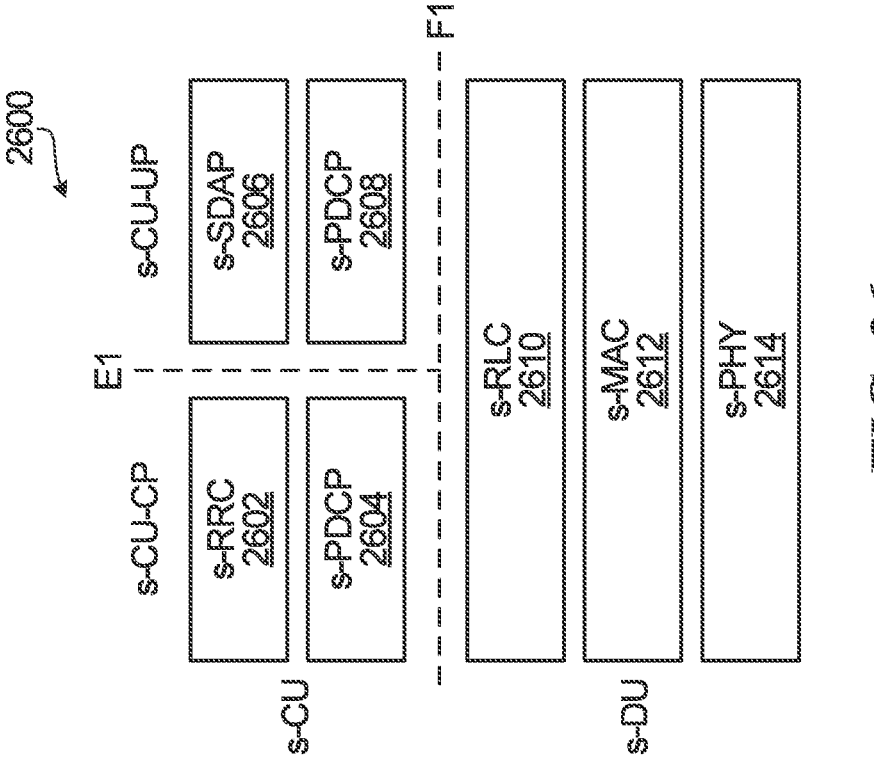
FIG. 26 is a block diagram illustrating another example of protocol stacks according to an embodiment.

FIG. 26 is a block diagram illustrating another example of protocol stacks according to an embodiment, for a CP/UP split at a RAN node. RAN features that are based on protocol stacks may be divided into a CU and a DU, and such splitting can be applied anywhere from PHY to PDCP layers in some embodiments.

In the example 2600, an s-CU-CP protocol stack includes an s-RRC layer 2602 and an s-PDCP layer 2604, an s-CU-UP protocol stack includes an s-SDAP layer 2606 and an s-PDCP layer 2608, and an s-DU protocol stack includes an s-RLC layer 2610, an s-MAC layer 2612, and an s-PHY layer 2614. These protocol layers are described by way of example at least above. E1 and F1 interfaces are also shown as examples in FIG. 26. s-CU and s-DU in FIG. 26 indicate legacy CU and DU with SAF or SMAF, or/and a sensing node with sensing capability.

The example in FIG. 26 illustrates CU/DU splitting at the RLC layer, with the s-CU including s-RRC and s-PDCP layers 2602, 2604 (for the control plane), and s-SDAP and s-PDCP layers 2606, 2608 (for the user plane), and the s-DU including s-RLC, s-MAC, and s-PHY layers 2610, 2612, 2614. Not every RAN node necessarily includes a CU-CP (or s-CU-CP), but at least one RAN node may include one CU-UP (or s-CU-CP) and at least one DU (or s-DU). One CU-CP (or s-CU-CP) may be able to connect to and control multiple RAN nodes with CU-UPs (or s-CU-CPs) and DUs (or s-DUs).

Figure 27:
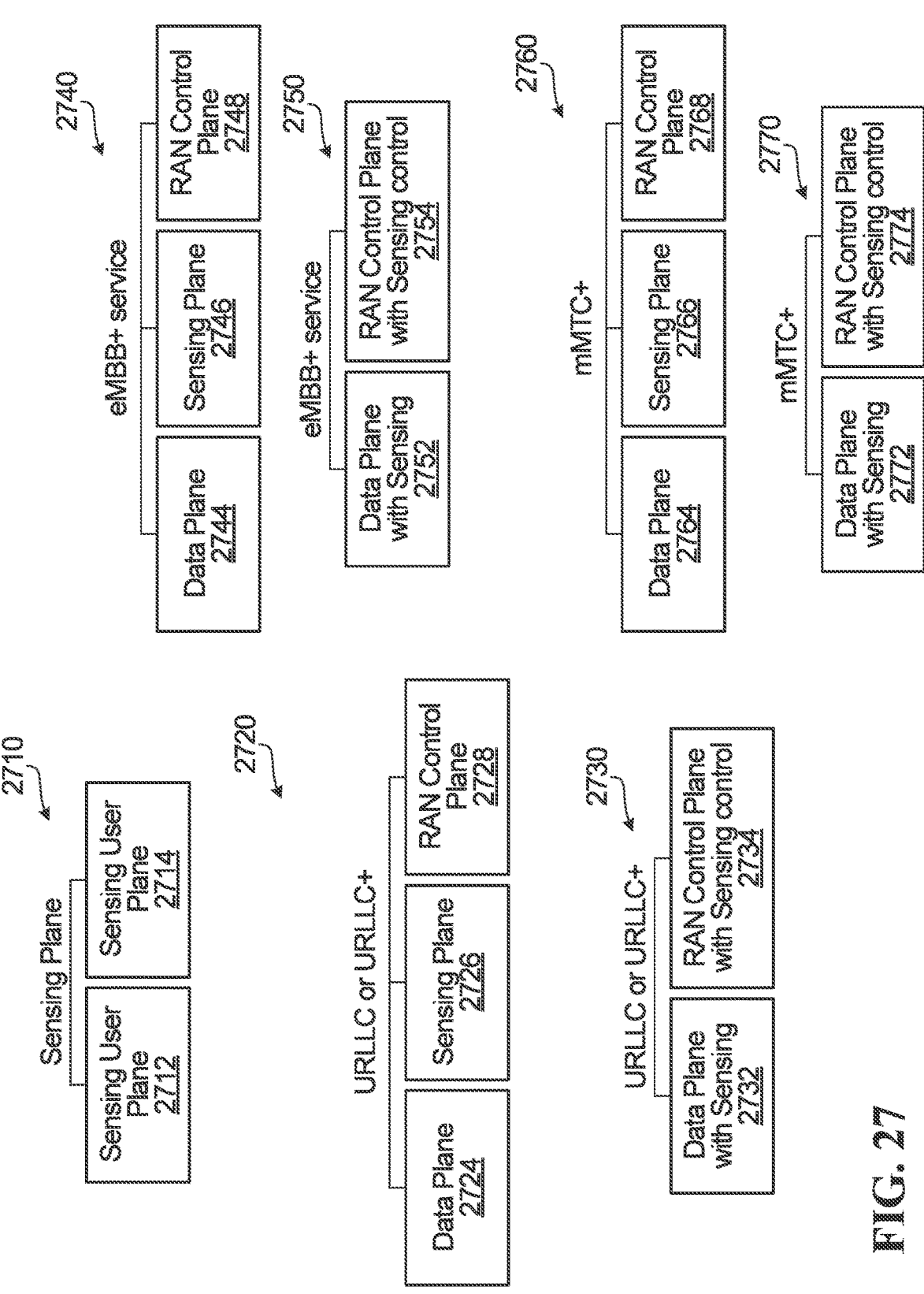
FIG. 27 includes block diagrams illustrating example sensing applications.

FIG. 27 includes block diagrams illustrating example sensing applications.

A service such as ultra-reliable low latency communications (URLLC) or URLLC+, or an application, may configure such parameters as time and frequency resources and/or transmission parameters associated with or coupled with the service or application for a UE. In this scenario, the service configuration may be related to or coupled with a sensing configuration on a sensing plane as shown by way of example at 2710 including control plane 2714 and user plane 2712, and work jointly to achieve application requirements or enhance performance, such as increasing reliability. As such, configuration parameters such as RRC configuration parameters for a service may include one or more sensing parameters, such as a sensing activity configuration associated with the service.

Use cases or services of URLLC or URLLC+, shown by way of example at 2720 and 2730, may have different coupling configurations with a sensing plane. Non-integrated data (or user), sensing, and control planes are shown at 2724, 2726, and 2728, and integrated data (or user) and control planes with integrated sensing are shown at 2732 and 2734. Similarly, enhanced mobile broadband (eMBB)+ service 2740 and eMBB+ service 2750 may have different configurations with sensing planes, including non-integrated data, sensing, and control planes 2744, 2746 and 2748, or integrated data and control planes 2752 and 2754 with integrated sensing. Another example application is massive machine type communications (mMTC)+ service 2760 and mMTC+ service 2770, which may have different configurations with sensing planes, including non-integrated data, sensing, and control planes 2764, 2766 and 2768, or integrated data and control planes 2772 and 2774 with integrated sensing.

For example, in an industrial internet of things (IoT) application in a factory or in auto-driving industry, high reliability and extremely low latency are required. For example, an auto-driving network can take advantage of online or real-time sensing information on, e.g., road traffic loading, environment condition, in a network (e.g., a city) for safer and effective car auto-driving. Consider an example in which a sensing architecture in the network is as shown in FIG. 15 (or any of FIG. 6A, 6B or 6C) is used, with the sensing configuration procedure shown in FIG. 16, (for any of FIG. 6A, 6B or 6C, focusing here only on the interaction between SensMF and RAN/SAF message exchange, whereas its complete connection path between SensMF to RAN/SAF has been provided above when describing each individual figure and architecture).

The auto-driving network may request a sensing service in certain time periods or all the time from a wireless network with sensing functionality, and the sensing service request is via its sensing service center 1608 of the auto-driving network (which can be an office in the auto-driving network) to the SensMF 1606 associated with the wireless network including RAN/SAF 1604. To get the online or real time sensing information on city traffic and road conditions, the sensing service center 1608 may send the sensing service request (SSR) message 1620 to the SensMF 1606 with specific sensing requirements, which in an embodiment may include a request on sensing vehicle traffic across the network by a set of specific sensing nodes in some specific locations (e.g., key traffic roads). The SSR 1620 can be transmitted through an interface link.

The SensMF 1606 may coordinate one or more RAN node(s) and/or one or more UE(s) based on the SSR 1620. For example, SensMF 1606 determines one or more RAN node(s) to perform online or real time sensing measurement based on the capability and service provided by the RAN nodes, and configures them to perform online or real time sensing measurement through communicating configuration procedure with the one or more RAN node(s). After configuring or coordinating one or more RAN node(s) and/or one or more UE(s), the SensMF 1606 sends the SSR 1622 to NG RAN/SAF 104. For example, the SensMF 1606 may figure out some more details in terms of sensing KPIs such as measured vehicle mobility, direction, and how often of the sensing reporting for each individual sensing node in the sensing areas of interest, then the SSR 1622 may be sent to associated RAN node(s) with SAF(s) (directly in FIG. 6C architecture or indirectly via core network in FIG. 6A or FIG. 6B architecture) in order to configure the associated sensing nodes for the sensing operation and the task.

For example, the SSR 1622 may include one of more of sensing task, sensing parameters, sensing resources, or other sensing configuration for the online or real time sensing measurement. Note that one SensMF 1606 may deal with more than RAN node with SAF, thus more than one the SSR 1622 may be sent accordingly. Each of these sensing nodes may be configured to measure the KPIs in its individual vicinity; and the configuration interface may be, for example, an air interface where the configuration signaling can be RRC message that may include SensMF configured sensing info over a sensing specific protocol between SensMF and the sensing node. For example, the sensing protocol can be any one shown in FIGS. 23 and 24.

RAN node/SAF 1604 perform sensing measure procedure with one or more UE 1602. For example, the RAN node can determine one or more UE(s) to perform online or real time sensing measurement based on the UE's capability, mobility, location, or service, and receive sensing measurement information or data from the associated UE(s). The RAN node can send or share the sensing measurement information or data to SAF, SAF can analyze and process the sensing measurement information or data, and forward the sensing measurement information or data to SensMF 1606, or sensing analysis reports to SensMF 1606 based on the requirement between SAF and SensMF 1606. In another option, each sensing node may send the measurement (e.g., KPIs) information back in configured time slots (e.g., duration and reporting periodically) to its associated RAN node and SAF 1604.

In one RAN node/SAF 1604, part or all the sensing information (e.g., measured KPIs) from all the associated sensing nodes may be collected (and optionally processed for, e.g., RAN node local usage with SAF such as local communication control) as SSResp 1626 and then sent to the SensMF 1606. For example, SSResp 1626 can be any one sensing measurement information, data or analysis report, where sensing measurement information, data or analysis report from each sensing node may be transferred to the SensMF by applying a sensing specific protocol via a sensing related information transferring path of either a control plane or user plane.

The SensMF 1606 may process the SSResp 1626 from all sensing nodes in associated sensing RAN node(s), e.g., putting together, number averaging and smoothing, interpolation, other analyzing methodology, etc. and come up with a city map with real-time vehicle traffic and road conditions for some city areas or streets of interest as RRSesp 1628 to send to the sensing service center of the auto-driving network for online traffic information. Such an online and real-time sensing task may lead to the safer and effective car auto-driving operations.

The above embodiments with sensing functionality may apply to other use cases or service cases as well.

URLLC solution may be better to include a sensing feature in some scenarios. For example, with URLLC+, sensing information such as sudden movement, environment change, network traffic congestion varying, etc., may also be of paramount importance, for such purposes as to optimize data transmission control, to avoid incidental events on-the-fly, and/or for collision control due to urgent situations.

These features, or others, may also or instead be applicable to other applications or services that are to work with sensing operations.

Various features and embodiments are described in detail above. Disclosed embodiments include, for example, a method that involves communicating, by a first sensing coordinator in a radio access network, a first signal with a second sensing coordinator through an interface link. Examples of first and second sensing coordinators include not only SAF and SensMF, but also other sensing components including those at a UE or other electric device that may be involved in sensing procedures. Multiple sensing coordinators may also or instead be implemented together, as in SMAF embodiments for example.

The first sensing coordinator may implement or include a sensing protocol layer, and communicating the first signal may involve communicating the first signal through the interface link using the sensing protocol. Various examples of sensing protocol stacks including sensing protocol layers that may be involved in communicating a signal between sensing coordinators are provided in FIGS. 22 to 26. FIG. 23 provides a particular example of a sensing protocol layer, in the form of SMFRP layer 2312 in the RAN protocol stack 2310, that may be involved in communicating a signal between a first sensing coordinator in a RAN and a second sensing coordinator SensMF, which may be located in a CN or in another network. Other examples of sensing protocol layers that may be involved in sensing and communicating a signal between sensing coordinators, which may include one or more components at a UE or other device for sensing, are shown in FIGS. 22 to 26.

An interface link may be or include any of various types of links. An air interface link for sensing, for example, can be one between a RAN and a UE, and/or wireless backhaul between SensMF and a RAN, for example. New designs may also or instead be provided for either or both of control planes and user planes between components that are involved in sensing.

For example, an interface link may be or include any one or more of the following: an uu air interface link between the first sensing coordinator and an electric device such as a UE or other device; any air interface link of NR v2x, LTE-M/PC5, IEEE 802.15.4, and 802.11 between the first sensing coordinator and an electric device; a sensing-specific air interface link between the first sensing coordinator and an electric device; an NG interface link or sensing interface link between the first sensing coordinator and a network entity of a core network or a backhaul network including the examples shown in FIGS. 22 to 26; a sensing control link and/or a sensing data link between the first sensing coordinator and a network entity of the core network or a backhaul network, in an example architecture as shown in FIG. 6A, 7A, 8A, 9A, 10A, or 11A in some embodiments; and a sensing control link and/or a sensing data link between the first sensing coordinator and a network entity that is outside of a core network or a backhaul network, in an example architecture as shown in FIG. 6B, 6C, 7B, 7C, 8B, 8C, 9B, 9C, 10B, 10C, 11B, or 11C in some embodiments.

These interface link examples refer to a sensing-specific air interface link. FIG. 24, for example, illustrates an embodiment in which a sensing-specific air interface link involves sensing-specific s-PHY, s-MAC, and s-RLC protocol layers. These sensing-specific protocol layers are different from conventional PHY, MAC, and RLC protocol layers, and any one or more of these sensing-specific protocol layers may be provided in some embodiments.

Various protocol stack embodiments are also disclosed. For example, a sensing coordinator may include any one or more of the following: a control plane stack for the sensing protocol, with higher layers including one or both of s-PDCP and s-RRC as in FIG. 23 for example; a user plane stack for the sensing protocol, with higher layers including one or both of s-PDCP and s-SDAP, as in FIG. 24 for example; and a sensing-specific s-CU or s-DU, such as s-CU-CP, s-CU-UP, and s-DU as shown by way of example in FIGS. 25 and 26.

A first sensing coordinator may communicate a signal with a second sensing coordinator in any of various ways, which may be dependent upon implementation. For example, in some embodiments the first sensing coordinator is, includes, or implements a SAF in the radio access network and communicates a signal with the second sensing coordinator in the form of a SensMF in a core network. This is consistent with embodiments shown in FIGS. 6A, 7A, and 8A, for example.

In another embodiment consistent with FIGS. 6B, 7B, and 8B for example, the first sensing coordinator may be, include, or implement a SAF in the radio access network, and communicates a signal through a core network with the second sensing coordinator in the form of a SensMF that is outside of the core network and the radio access network.

More direct communications are also possible, as in the case of the first sensing coordinator comprising a SAF and directly communicating a signal with a SensMF, outside of the core network and the radio access network, as the second sensing coordinator. Examples are shown in FIGS. 6C, 7C, and 8C.

These examples of communications between sensing coordinators encompass FIGS. 6A to 8C. FIGS. 7A to 8C illustrate CU/DU RAN node architectures. In such architectures, the first sensing coordinator may be, implement, or include a SAF that connects a CU and/or a DU of the RAN. The SAF may communicate a signal through the CU and/or DU with the SensMF in a core network as the second sensing coordinator, as in FIGS. 7A and 8A for example. The SAF may also or instead communicate a signal between the CU and/or DU and a core network with a second sensing coordinator in the form of a SensMF that is outside of the core network and the radio access network, as in FIGS. 7B and 8B for example. Another possible option that may also or instead be provided is the SAF directly communicating a signal through the CU and/or DU with the second sensing coordinator, such as a SensMF that is outside of a core network and the radio access network as shown by way of example in FIGS. 7C and 8C.

Considering the more specific RAN node architecture details in FIGS. 8A to 8C, in these example architectures the first sensing coordinator in the RAN may be, implement, or include a SAF, and the SAF connects a CU-CP, a CU-UP, and/or a DU of the radio access network. In this context, the SAF may communicate a signal through the CU-CP, CU-UP and/or DU with a second sensing coordinator in the form of a SensMF in a core network, as in FIG. 8A. The SAF may also or instead communicate a signal between the CU-CP, CU-UP and/or DU and a core network a second sensing coordinator in the form of a SensMF that is outside of the core network and the radio access network, as in FIG. 8B. FIG. 8C illustrates an embodiment in which the SAF may directly communicate a signal through the CU-CP, CU-UP and/or DU with a second sensing coordinator, again a SensMF in this example, that is outside of a core network and the radio access network.

The communication examples above are consistent with FIGS. 6A to 8C. Other examples consistent with FIGS. 9A to 11C and/or otherwise disclosed herein, relate to embodiments in which the first sensing coordinator is, implements, or includes a SAF and the second sensing coordinator is, implements, or includes a SensMF, and both of the SAF and SensMF are located in the radio access network. In SMAF embodiments for example, sensing coordination is concentrated in a radio access network. Other embodiments in which SAF and SensMF, or features thereof, are implemented in a radio access network, are also possible. Illustrative examples below are described in the context of a SAF and a SensMF located in a RAN. These examples, and others herein, may be applied in SMAF embodiments and/or other embodiments in which sensing coordination is concentrated in a RAN.

In addition to communication of a first signal between a RAN-based SAF and SensMF, one or both of the SAF and the SensMF may communicate a second signal through a core network with an entity in the core network, as in FIG. 9A, 10A, or 11A for example. One or both of the SAF and the SensMF may also or instead communicate a signal through a core network with an entity that is outside of the core network and the radio access network, as in FIG. 9B, 10B, or 11B for example. Consistent with but not limited to the examples in FIGS. 9C, 10C, and 11C, one or both of the SAF and the SensMF in a RAN may directly communicate a signal with an entity that is outside of the core network and the radio access network.

In the context of CU/DU RAN node architectures as shown by way of example in FIGS. 10A to 10C and 11A to 11C, one or both of the SAF and the SensMF may connect a CU and/or a DU of a radio access network. A method may then include, for example, one or both of the SAF and the SensMF communicating a signal: through the CU and/or DU with an entity in a core network (see FIGS. 10A and 11A for example); between the CU and/or DU and a core network with an entity that is outside of the core network and the radio access network (see FIGS. 10B and 11B for example); and/or directly through the CU and/or DU with an entity that is outside of a core network and the radio access network (see FIGS. 10C and 11C for example).

FIG. 11A to 11C illustrate example RAN node architectures in which one or both of a RAN-based SAF and SensMF may connect a CU-CP, a CU-UP, and/or a DU of a radio access network. In this context, a method may include one or both of the SAF and the SensMF communicating a signal: through the CU-CP, CU-UP and/or DU with an entity in a core network, in an architecture as shown in FIG. 11A for example; between the CU-CP, CU-UP and/or DU and a core network with an entity that is outside of the core network and the radio access network, in an architecture as shown in FIG. 11B for example; and/or directly through the CU-CP, CU-UP and/or DU with an entity that is outside of a core network and the radio access network, in an architecture as shown in FIG. 11C for example.

Signals communicated with sensing coordinators may include, for example, any of: an SSR, an SSResp; and other signaling related to sensing.

Consider FIG. 13 as an example. At 1322, a signal is communicated by a first sensing coordinator in a RAN (the SAF at the NG-RAN node 1304) by transmitting an SSR to a second sensing coordinator (SensMF 1308) through the AMF 1306 in a core network.

Another example of communicating a signal by a first sensing coordinator in a RAN is shown at 1332, and involves receiving, by the SAF at the NG-RAN node 1304, an SSResp from the second sensing coordinator (SensMF 1308) through the AMF 1306 in a core network. The SSResp is obtained based on sensing data and the SSR. For example, in FIG. 13 the SSResp is forward by the AMF 1306 from SensMF 1308 at 1332, and the SensMF obtains the SSResp based on the SSR received from the AMF at 1324 and then collecting data at 1326 and/or 1328. This means that the SSResp is a sensing result or output, determined or otherwise obtained based on the SSR and sensing data.

The SSR is a form of an input and may include such input information as a sensing model, parameter, and/or service, and sensing data for an output (SSResp) is collected from the sensing target(s). A sensing output is thus determined or otherwise obtained based on a sensing input, such as an SSR, and sensing data.

Regarding a sensing input, a sensing request such as an SSR, which may be communicated (transmitted and/or received) by one or both of a first sensing coordinator in a RAN and a second coordinator that may or may not be located in the RAN, may include information that is indicative of one or more sensing requirements. Examples of sensing requirements that may be specified in a sensing request include, among others, positioning, mobility, environment temperature, humidity of communication devices in certain areas. As also noted at least above, a sensing request may be triggered by one or more conditions. For example, one or both of a first sensing coordinator in a RAN and a second coordinator that may or may not be located in the RAN may communicate a sensing request such as an SSR triggered according to any one or more of: periodically and upon demand. Triggering upon demand may be related to or in terms of conditions that are configured, semi-statically in some embodiments, based on an application and its sensing data requirements for example.

A sensing output such as an SSR need not necessarily be received by, or only by, the same component or element that transmitted an SSR. For example, as illustrated at 1432 in FIG. 14, communicating a signal by a first sensing coordinator in a RAN (the SAF at the NG-RAN node 1404 in this example) may involve receiving a sensing response from a second sensing coordinator (SensMF 1408) through an AMF 1406, and the sensing response is obtained based on an SSR and sensing data collected at 1424 and/or 1406. In this case the SSR may have been transmitted by the sensing service center 1410 at 1420*a*, generated by the AMF 1406 at 1420*b*, or transmitted by the UE 1402 at 1420*c*, but the SAF at the NG-RAN node 1404 may receive the SSResp at 1432.

Sensing procedures for collection of sensing data from one or more sensing targets are shown by way of example at 1326, 1328 in FIG. 13 and at 1424, 1426 in FIG. 14, and in other drawings as well. These procedures may involve configuration of one or more electric devices for sensing, or configuration may be handled separately. For example, one or both of a first sensing coordinator in a RAN and a second sensing coordinator that may or may not also be located in the RAN may communicate with one or more electric devices in the RAN to configure the one or more electric devices with one or more sensing requirements. Such configuration may be based on a sensing request, for example. Configured electric devices may include, for example, one or more components or elements in a RAN, one or more UEs, and/or one or more sensing devices. Particular examples of electric devices that may be configured with sensing requirements include a sensing device, a UE, a drone, a TRP, and a base station. Other types of electric devices in a radio access network may also or instead be configured with sensing requirements and/or otherwise be involved in sensing.

A method may involve a first sensing coordinator processing a sensing response, which is received from a second sensing coordinator through an AMF and was obtained by sensing data and sensing request. This is shown by way of example as SAF processing at 1334 in FIGS. 13 and 1434 in FIG. 14. Examples of SAF processing are provided elsewhere herein.

Communicating a signal, by a first sensing coordinator in a RAN, may also or instead involve receiving, by the first sensing coordinator, a sensing request directly from the second sensing coordinator. This is shown by way of example in FIG. 16 at 1622, wherein the SAF at the NG-RAN/SAF node 1604 receives an SSR directly from SensMF 1606. The receiving in this example is not through an AMF as in some of the above examples.

Another feature that may be provided in some embodiments is the first sensing coordinator in a RAN initiating a sensing procedure in the RAN in response to receiving a sensing request. With reference again to FIG. 16, this is shown by way of example at 1624, in which UE sensing procedures are initiated by the SAF and the NG-RAN/SAF node 1604 in response to receiving an SSR at 1622.

Communicating a signal may also or instead involve transmitting, by a first sensing coordinator in a RAN, a sensing response directly to a second sensing coordinator in a core network, as shown by way of example in FIG. 16 at 1626, with an SSResp being transmitted by the SAF at the NG-RAN/SAF node 1604 to SensMF 1606.

SMAF embodiments, and/or other embodiments, may concentrate sensing coordination in a RAN. In such embodiments, a SMAF, or more generally one or both of a first sensing coordinator and a second sensing coordinator in a RAN, may provide or support any of various features in the RAN. For example, a method may involve one or both of the first and second sensing coordinators receiving, through an AMF in a core network or directly, a sensing request from an entity that is outside the core network and the radio access network. Receiving a sensing request through an AMF is illustrated by way of example at 1822 in FIG. 18, and receiving a sensing request directly is illustrated by way of example at 2020 and 2120 in FIGS. 10 and 21, respectively.

A method may also or instead involve one or both of a first sensing coordinator and a sensing coordinator initiating a sensing procedure in a RAN in response to receiving a sensing request. Examples are illustrated at 1824 in FIG. 18, at 2022 in FIG. 20, and at 2124 in FIG. 21.

One or both of a first sensing coordinator and a second sensing coordinator may also or instead transmit, through an AMF in a core network or directly, a sensing response to an entity that is outside the core network and the radio access network. This is illustrated by way of example at 1826 for transmitting an SSResp through an AMF, and at 2024 in FIGS. 20 and 2126 in FIG. 21 for directly transmitting an SSResp.

Some embodiments may involve acknowledgement of a sensing request. For example, one or both of a first sensing coordinator and a second sensing coordinator in a RAN may transmit, to an entity that is outside a core network and the radio access network, an acknowledgement of a sensing request received from that entity. FIG. 21 illustrates an example at 2122, but it should be appreciated that such acknowledgement is not limited only to the embodiment shown in FIG. 21. An acknowledgement may be transmitted indirectly, through a core network for example, and/or by an AMF or other component or element in a core network.

In some embodiments, sensing is independent of communication service operation, such as cellular service operation, in a wireless communication network that includes the RAN in which at least a first sensing coordinator is located. Sensing may instead be combined or integrated with communication service operation. Either independent or integrated sensing may provide background sensing, sensing for third-party services, and/or sensing for machine learning or AI, for example. Independent or integrated sensing may be applied to any of various embodiments, including embodiments that involve sensing via direct communications or through a core network by elements or functions such as AMF and/or UPF, sensing via SensMF and SAF, sensing via SMAF, and other disclosed embodiments.

The present disclosure also encompasses a method that involves communicating, by a second sensing coordinator, a first signal with a first sensing coordinator in a radio access network through an interface link. In such an embodiment, the second sensing coordinator may implement or include a sensing protocol layer, and communicating the first signal may involve communicating the first signal through the interface link using the sensing protocol.

Features disclosed herein in the context of other embodiments may also or instead be applied to embodiments that relate to such a second sensing coordinator. This includes, for example, features disclosed above and/or elsewhere herein, with reference to a first sensing coordinator.

Consider the interface link and the sensing protocol through which the second sensing coordinator communicates the first signal with the first sensing coordinator in the radio access network. Sensing protocol examples are provided elsewhere herein and may also or instead be applied in embodiments that focus on the second sensing coordinator.

Interface link examples include the following between the second sensing coordinator and an electric device in the radio access network:

an uu air interface link;

an air interface link of any one of the following types: NR v2x, LTE-M, PC5, IEEE 802.15.4, and IEEE 802.11;

a sensing-specific air interface link that includes one or more of s-PHY, s-MAC, and s-RLC protocol layers, as shown by way of example in FIG. 24.

An interface link may be or include any of various types of links. An air interface link for sensing, for example, can be one between a RAN and a UE, and/or wireless backhaul between SensMF and a RAN, for example. New designs may also or instead be provided for either or both of control planes and user planes between components that are involved in sensing.

Other interface link examples include an NG interface link or sensing interface link between a sensing coordinator and a network entity of a core network or a backhaul network including the examples shown in FIGS. 22 to 26; a sensing control link and/or a sensing data link between a sensing coordinator and a network entity of the core network or a backhaul network, in an example architecture as shown in FIG. 6A, 7A, 8A, 9A, 10A, or 11A in some embodiments; and a sensing control link and/or a sensing data link between a sensing coordinator and a network entity that is outside of a core network or a backhaul network, in an example architecture as shown in FIG. 6B, 6C, 7B, 7C, 8B, 8C, 9B, 9C, 10B, 10C, 11B, or 11C in some embodiments.

Various protocol stack embodiments are also disclosed elsewhere herein, including a control plane stack for the sensing protocol, with higher layers including one or both of s-PDCP and s-RRC as in FIG. 23 for example; a user plane stack for the sensing protocol, with higher layers including one or both of s-PDCP and s-SDAP, as in FIG. 24 for example; and a sensing-specific s-CU or s-DU, such as s-CU-CP, s-CU-UP, and s-DU as shown by way of example in FIGS. 25 and 26.

A sensing coordinator may communicate a signal in any of various ways, which may be dependent upon implementation. SAF and SensMF embodiments related to a first sensing coordinator are disclosed at least above, and similar examples may apply to embodiments from the perspective of a second sensing coordinator, such as the following:

the second sensing coordinator is, includes, or implements SensMF in a core network, and communicates the first signal with the first sensing coordinator in the form of a SAF in the radio access network, consistent with embodiments shown in FIGS. 6A, 7A, and 8A, for example.

the second sensing coordinator is, includes, or implements SensMF outside of a core network and the radio access network, and communicates the first signal through the core network with the first sensing coordinator, in particular a SAF in the radio access network, consistent with FIGS. 6B, 7B, and 8B for example;

the second sensing coordinator may be, include, or implement SensMF outside of a core network and the radio access network, and directly communicate the first signal with the first sensing coordinator in the form of a SAF in the radio access network, as shown by way of example in FIGS. 6C, 7C, and 8C;

the second sensing coordinator may be, include, or implement SensMF in the core network, with a first sensing coordinator in the form of a SAF in the radio access network, connecting a CU and/or a DU of the radio access network, in which case the SensMF communicates the first signal with the SAF through the CU and/or DU as shown by way of example in FIGS. 7A and 8A for example;

consistent with FIGS. 7B and 8B, for example, the second sensing coordinator may be, include, or implement SensMF outside of the core network and the radio access network, with the first sensing coordinator in the form of a SAF in the radio access network connecting a CU and/or a DU of the radio access network, and the SensMF communicating the first signal with the SAF between the CU and/or DU and the core network;

the second sensing coordinator may be, include, or implement SensMF that outside of the core network and the radio access network, with the first sensing coordinator in the form of a SAF in the radio access network connecting a CU and/or a DU of the radio access network and the SensMF directly communicating the first signal with the SAF through the CU and/or DU, as shown by way of example in FIGS. 7C and 8C;

with the second sensing coordinator in the form of SensMF and the first sensing coordinator in the form of a SAF in the radio access network connecting a CU-CP, a CU-UP, and/or a DU of the radio access network, the following further embodiments are possible: SensMF communicating the first signal with the SAF through the CU-CP, CU-UP and/or DU as shown by way of example in FIG. 8A, SensMF communicating the first signal with the SAF between the CU-CP, CU-UP and/or DU and the core network as shown by way of example in FIG. 8B, and SensMF directly communicating the first signal with the SAF through the CU-CP, CU-UP and/or DU as shown by way of example in FIG. 8C

As in other embodiments, signals communicated between sensing coordinators may include, for example, any of: an SSR, an SSResp; and other signaling related to sensing.

Consider FIG. 13 as an example. At 1324, a signal is communicated by a sensing coordinator (SensMF 1308) by receiving an SSR through the AMF 1306 in a core network.

Another example of communicating a signal by a second sensing coordinator is shown at 1330, and involves transmitting, by SensMF 1308, an SSResp through the AMF 1306 in a core network. The SSResp is obtained based on sensing data and the SSR. In FIG. 13 the SSR is forwarded by the AMF 1306 to SensMF 1308 at 1324, and the SensMF obtains the SSResp based on the SSR received from the AMF and then collecting data at 1326 and/or 1328.

FIG. 14 illustrates another example of receiving an SSR through an AMF, initiating a sensing procedure or otherwise obtaining an SSResp, and transmitting the SSResp through an AMF, at 1422, 1424/1426, and 1428.

Communicating a signal may also or instead involve transmitting, by the second sensing coordinator, a sensing request directly to the first sensing coordinator, as shown by way of example in FIG. 16 at 1622, wherein SensMF 1606 transmits an SSR directly to the SAF at the NG-RAN/SAF node 1604.

Another feature that may be provided in some embodiments is the second sensing coordinator initiating a sensing procedure in the RAN in response to receiving a sensing request, as shown by way of example at 1424, 1426 in FIGS. 14 and 1624 in FIG. 16, in which sensing procedures are initiated by SensMF in response to receiving an SSR, through an AMF (FIG. 14) or directly (FIG. 16).

Communicating a signal may also or instead involve receiving a sensing response directly to a sensing coordinator in a RAN, as shown by way of example in FIG. 16 at 1626, with an SSResp being transmitted by the SAF at the NG-RAN/SAF node 1604 and received by SensMF 1606.

A method may involve transmitting a sensing request directly to a sensing coordinator from an entity that is outside a core network and the radio access network as shown by way of example at 2020 in FIGS. 20 and 2120 in FIG. 21, receiving a sensing response to such an entity directly from a sensing coordinator as shown by way of example at 2024 in FIGS. 20 and 2126 in FIG. 21, and/or receiving by such an entity, directly from a sensing coordinator, an acknowledgement of a sensing request that was transmitted by such an entity as shown by way of example 2122 in FIG. 21.

As in other embodiments, a sensing coordinator may communicate a sensing request that includes information indicative of one or more sensing requirements, such as positioning, mobility, environment temperature, and/or humidity of communication devices in certain areas, and a sensing request may be triggered according to one or more of: periodically; and upon demand, related to or in terms of conditions that are configured based on an application and its sensing data requirements.

Another features that may be provided in some embodiments involves a sensing coordinator, which may be located in our outside a RAN, communicating with one or more electric devices in the RAN to configure the one or more electric devices with sensing requirements.

Embodiments related to sensing devices or nodes, such as UEs or other electric devices in a RAN, are also possible.

According to one such embodiment, a method involves: accessing, by an apparatus through a radio access network, an interface link; and communicating, by the apparatus, a first signal with a sensing coordinator that has a sensing protocol layer. The communicating involves communicating the first signal through the interface link using a sensing protocol, and the first signal includes a sensing configuration or sensing data.

At least some interface link examples disclosed elsewhere herein are applicable to sensing device or sensing node embodiments, including at least: an uu air interface link; an air interface link of any one of the following types: NR v2x, LTE-M, PC5, IEEE 802.15.4, and IEEE 802.11; a sensing-specific air interface link that includes one or more of sensing-specific s-PHY, s-MAC, and s-RLC protocol layers; a sensing control link; and a sensing data link. Examples of all of these types of links are provided elsewhere herein.

In a sensing device method, the communicating may involve receiving, from the sensing coordinator, the first signal that includes the sensing configuration. A sensing configuration may be provided in a signal that is communicated with a sensing device during initial access and/or when a sensing procedure is initiated, for example.

A sensing device method may also involve such operations as collecting sensing data based on a sensing configuration, and transmitting the sensing data to the sensing coordinator, during a sensing procedure as illustrated in FIGS. 13, 14, 16, 18, 20, and 21 for example.

In some embodiments, the communicating involves transmitting, to the sensing coordinator, the first signal that includes the sensing data.

A sensing coordinator with which a sensing device communicates a signal may be located in a RAN as shown by way of example as UE sensing procedures in FIGS. 16, 18, 20, and 21, or outside a RAN as shown by way of example as NG-RAN node and UE sensing procedures in FIGS. 13 and 14.

The example methods described above are illustrative of embodiments, and other embodiments are also possible. For example, a method may also or instead involve communicating first signaling with a sensing coordinator that coordinates sensing procedures for an access network, such as a RAN, that provides access to a core network in a wireless communication system. The first signaling being associated with a sensing request for a sensing procedure to be performed in the access network. Such a method may also involve communicating second signaling with the sensing coordinator, the second signaling being associated with a sensing response to provide results of the sensing procedure.

From the perspective of a service requestor, such as the UE 1402, the AMF 1406, or the sensing service center 1410 in FIG. 14, communicating such first signaling may involve transmitting the first signaling to a sensing coordinator, which in this example is transmitting an SSR to SensMF 1408. An example of communicating second signaling associated with a response is also illustrated in FIG. 14, and includes receiving the second signaling (SSResp) from the sensing coordinator (SensMF 1408).

These examples of communicating signaling, and other examples herein, may but need not necessarily involve direct communications. In FIG. 14 for example, communicating signaling may involve "relaying" such signaling by an AMF and/or one or more other intermediate components. For example, a method may involve receiving a sensing request from a requestor, such as receiving an SSR by the AMF 1406 from the sensing service center 1410 or the UE 1402) before transmitting the first signaling to the sensing coordinator, which in this particular example is SensMF 1408. A method may also or instead involve transmitting a sensing response to a requestor, by the AMF 1406 in FIG. 14 for example, after receiving the second signaling from the sensing coordinator, at 1428.

Turning to SensMF 1408 in FIG. 14 as an example, a sensing coordinator may receive a request, coordinate sensing, and return a result. From the perspective of SensMF 1408, communicating first signaling by a sensing coordinator may involve receiving, by the sensing coordinator, the first signaling at 1422, and communicating the second signaling may involve transmitting, by the sensing coordinator, the second signaling at 1428. A method may also include coordinating, by the sensing coordinator, performance of the sensing procedure, at 1424 and/or 1426, in the access network.

From the perspective of a sensing target or device, which may be the UE 1402 and/or the NG-RAN node 1404 in the example shown in FIG. 14, a method may involve performing a sensing procedure. A sensing procedure may include one or both of: an access node sensing procedure as shown by way of example at 1424 and an access terminal sensing procedure as shown by way of example at 1426. Examples of sensing procedures through which sensing data may be collected are provided elsewhere herein.

A sensing procedure as referenced above is to be performed in an access network, but a sensing coordinator such as SensMF may be deployed in the core network to which the access network provides access. A sensing coordinator such as SensMF may instead be deployed outside the core network, and be configured to communicate with the access network through the core network or configured to communicate with the access network through an interface to the access network. Various examples of these types of sensing architectures are disclosed herein.

Disclosed architectures also include examples in which a sensing coordinator is deployed in an access network. Communicating first signaling associated with a sensing request and communicating second signaling associated with a response may then involve communicating with the sensing coordinator through the core network, as in FIG. 18 for example. FIGS. 20 and 21 illustrate direct communications, in which communicating first signaling associated with a sensing request and communicating second signaling associated with a response involve communicating with a sensing coordinator through an interface to the access network.

These examples regarding communicating first and second signaling refer to particular drawings, but features disclosed in these examples may also or instead be implemented in other embodiments.

Several drawings, such as FIGS. 6C, 7C, 8C, 9C, 10C, and 11C illustrate architectures that provide for direct communications with a sensing coordinator in an access network, or at least communications that are more direct than communications through a core network. In the context of such architectures, and possibly others, a method may involve communicating signaling, associated with a sensing procedure to be performed in an access network that provides access to a core network in a wireless communication system, between the access system and a sensing requestor that is outside the core network. In embodiments referred to herein primarily as direct communication embodiments, such communicating may involve communicating the signaling between the access system and the sensing requestor via an access network interface that bypasses the core network.

Features that are disclosed elsewhere herein may be implemented in embodiments that involve communicating via an access network interface that bypasses a core network. For example, signaling may be or include the above-referenced first signaling associated with a sensing request for a sensing procedure and second signaling associated with a sensing response to provide results of the sensing procedure. Communicating such signaling, as in other embodiments, may involve transmitting the first signaling to the access network and/or receiving the second signaling from the access network. A method may also or instead involve communicating such signaling by receiving the first signaling in the access network and/or transmitting the second signaling from the access network.

Additional features that are disclosed in other embodiments and may also or instead be applied to direct communication embodiments include, among others:

performing the sensing procedure in the access network;
the sensing procedure is or includes one or both of: an access node sensing procedure and an access terminal sensing procedure.

The present disclosure encompasses these and other methods.

Embodiments may also or instead be embodied in other forms, including apparatus and non-transitory computer readable storage media, for example.

A non-transitory computer readable storage medium, for example, may store programming for execution by a processor. Such a storage medium may comprise a computer program product, or be implemented in an apparatus that also includes at least one processor coupled to the storage medium.

Examples of processors 210, 260, 276 and storage media in the form of memory 208, 258, 278 are also shown in FIG.

3. Thus, apparatus embodiments may include an ED as shown by way of example at 110 in FIG. 3, a T-TRP as shown by way of example at 170 in FIG. 3, and/or an NT-TRP as shown by way of example at 172 in FIG. 3. In some embodiments, an apparatus may include other components, such as a communication interface to which a processor is coupled. A communication interface may include elements such as those shown at 201/203/204, 252/254/256, and/or 272/274/280 in FIG. 3. These are illustrative examples of apparatus, and other apparatus embodiments are possible.

In an embodiment, programming stored in a computer-readable storage medium, whether implemented as a computer program product or in an apparatus, may include instructions for communicating, by a first sensing coordinator in a radio access network, a first signal with a second sensing coordinator through an interface link. The first sensing coordinator includes or implements a sensing protocol layer, and communicating the first signal involves communicating the first signal through the interface link using the sensing protocol.

Features disclosed elsewhere herein may be implemented in such apparatus and/or computer program product embodiments. These features include, for example, any of the following, alone or in any of various combinations:

the interface link is or includes one or more of the following: an uu air interface link between the first sensing coordinator and an electric device; an air interface link of any one of the following types: NR v2x, LTE-M, PC5, IEEE 802.15.4, and IEEE 802.11, between the first sensing coordinator and an electric device; a sensing-specific air interface link between the first sensing coordinator and an electric device, the sensing-specific air interface link comprising one or more of s-PHY, s-MAC, and s-RLC protocol layers; an NG interface link between the first sensing coordinator and a network entity of a core network or a backhaul network; a sensing control link between the first sensing coordinator and a network entity of a core network or a backhaul network; a sensing data link between the first sensing coordinator and a network entity of a core network or a backhaul network; a sensing control link between the first sensing coordinator and a network entity outside of a core network or a backhaul network; and a sensing data link between the first sensing coordinator and a network entity outside of a core network or a backhaul network;

the first sensing coordinator includes or provides one or more of the following: a control plane stack for the sensing protocol, with higher layers including one or both of an s-PDCP layer and an s-RRC layer; a user plane stack for the sensing protocol, with higher layers including one or both of an s-PDCP layer and an s-SDAP layer; an s-CU-CP for the sensing protocol; a s-CU-UP for the sensing protocol; an s-DU for the sensing protocol;

the first sensing coordinator communicating the first signal with the second sensing coordinator involves one or more of the following: the first sensing coordinator comprises a SAF in the radio access network, and communicates the first signal with the second sensing coordinator, which comprises a SensMF in a core network; the first sensing coordinator comprises a SAF in the radio access network, and communicates the first signal through a core network with the second sensing coordinator, which comprises a SensMF that is outside of a core network and the radio access network; the first sensing coordinator comprises a SAF in the radio access network, and directly communicates the first signal with the second sensing coordinator, which comprises a SensMF that is outside of a core network and the radio access network; the first sensing coordinator comprises a SAF in the radio access network, wherein the SAF connects a CU and/or a DU of the radio access network, and the SAF communicates the first signal through the CU and/or DU with the second sensing coordinator, which comprises a SensMF in the core network; the first sensing coordinator comprises a SAF in the radio access network, wherein the SAF connects a CU and/or a DU of the radio access network, and the SAF communicates the first signal between the CU and/or DU and a core network with the second sensing coordinator, which comprises a SensMF that is outside of the core network and the radio access network; the first sensing coordinator comprises a SAF in the radio access network, wherein the SAF connects a CU and/or a DU of the radio access network, and the SAF directly communicates the first signal through the CU and/or DU with the second sensing coordinator, which comprises a SensMF that is outside of the core network and the radio access network; the first sensing coordinator comprises a SAF in the radio access network, wherein the SAF connects a CU-CP, a CU-UP, and/or a DU of the radio access network, and the SAF communicates the first signal through the CU-CP, CU-UP and/or DU with the second sensing coordinator, which comprises a SensMF in a core network; the first sensing coordinator comprises a SAF in the radio access network, wherein the SAF connects a CU-CP, a CU-UP, and/or a DU of the radio access network, and the SAF communicates the first signal between the CU-CP, CU-UP and/or DU and a core network with the second sensing coordinator, which comprises a SensMF that is outside of the core network and the radio access network; the first sensing coordinator comprises a SAF in the radio access network, wherein the SAF connects a CU-CP, a CU-UP, and/or a DU of the radio access network, and the SAF directly communicates the first signal through the CU-CP, CU-UP and/or DU with the second sensing coordinator, which comprises a SensMF that is outside of the core network and the radio access network.

the first sensing coordinator comprises a SAF and the second sensing coordinator comprises a SensMF, both of the SAF and SensMF located in the radio access network, the programming further comprising instructions for any one or more of: one or both of the SAF and the SensMF communicating a second signal through a core network with an entity in the core network; one or both of the SAF and the SensMF communicating the second signal through a core network with an entity that is outside of the core network and the radio access network; one or both of the SAF and the SensMF directly communicating the second signal with an entity that is outside of a core network and the radio access network; one or both of the SAF and the SensMF connecting a CU and/or a (DU) of the radio access network, and communicating the second signal through the CU and/or DU with an entity in a core network; one or both of the SAF and the SensMF connecting a CU and/or a DU of the radio access network, and communicating the second signal between the CU and/or DU and a core network with an entity that is outside of the core network and the radio access network; one or both of the SAF and the SensMF connecting a CU and/or a DU of the radio access network, and directly communicating the second signal through the CU and/or DU with an entity that is outside of a core network and the radio access network; one or both of the SAF and the SensMF connecting a CU-CP, a CU-UP, and/or a DU of the radio access network, and communicating the second signal through the CU-CP, CU-UP and/or DU with an entity in a core network; one or both of the SAF and the SensMF connecting a CU-CP, a CU-UP, and/or a DU of the radio access network, and communicating the second signal between the CU-CP, CU-UP and/or DU and a core network with an entity that is outside of the core network and the radio access network; one or both of the SAF and the SensMF connecting a CU-CP, a CU-UP, and/or a DU of the radio access network, and directly communicating the second signal through the CU-CP, CU-UP and/or DU with an entity that is outside of a core network and the radio access network;

the programming further comprises instructions for at least one of the following: the communicating comprises transmitting, by the first sensing coordinator, an SSR to the second sensing coordinator through an AMF in a core network; the communicating comprises receiving, by the first sensing coordinator, an SSResp from the second sensing coordinator through an AMF in a core network, wherein the SSResp is obtained based on sensing data and an SSR; the first sensing coordinator processing an SSResp received from the second sensing coordinator through an AMF, wherein the SSResp is obtained based on sensing data and a sensing request; the communicating comprises receiving, by the first sensing coordinator, an SSR directly from the second sensing coordinator; the first sensing coordinator initiating a sensing procedure in the radio access network in response to receiving an SSR; the communicating comprises transmitting, by the first sensing coordinator, an SSResp directly to the second sensing coordinator in a core network; one or both of the first sensing coordinator and the second sensing coordinator receiving, through an AMF in a core network or directly, an SSR from an entity that is outside the core network and the radio access network; one or both of the first sensing coordinator and the sensing coordinator initiating a sensing procedure in the radio access network in response to receiving an SSR; one or both of the first sensing coordinator and the second sensing coordinator transmitting, through an AMF in a core network or directly, an SSResp to an entity that is outside the core network and the radio access network; one or both of the first sensing coordinator and the second sensing coordinator transmitting, to an entity that is outside a core network and the radio access network, an acknowledgement of an SSR received from the entity;

sensing is independent of communication service operation in a wireless communication network that comprises the radio access network;

sensing is integrated with communication service operation in a wireless communication network that comprises the radio access network;

the programming comprising instructions for: one or both of the first sensing coordinator and the second sensing coordinator communicating a sensing request that comprises information that is indicative of one or more of the following sensing requirements: positioning, mobility, environment temperature, and humidity of
communication devices in certain areas;

the programming comprising instructions for: one or both
of the first sensing coordinator and the second sensing
coordinator communicating a sensing request triggered
according to one or more of the following: periodically;
and upon demand, related to or in terms of conditions
that are configured based on an application and its
sensing data requirements;

the programming comprising instructions for: one or both
of the first sensing coordinator and the second sensing
coordinator communicating with one or more electric
devices in the radio access network to configure the one
or more electric devices with sensing requirements;

the one or more electric devices comprise a sensing
device, a UE, a drone, a TRP, a base station, or another
electric device in the radio access network;

the apparatus comprises a network device, in the radio
access network, that is configured to control one or
more other network devices in the radio access
network.

In another embodiment, programming stored in a com-
puter-readable storage medium may include instructions for
communicating, by a second sensing coordinator, a first
signal with a first sensing coordinator in a radio access
network through an interface link. The second sensing
coordinator includes or implements a sensing protocol layer,
and communicating the first signal involves communicating
the first signal through the interface link using the sensing
protocol.

Features disclosed elsewhere herein may be implemented
in such apparatus and/or computer program product embodi-
ments. These features include, for example, any of the
following, alone or in any of various combinations:

the interface link comprises one or more of the following:
an uu air interface link between the second sensing
coordinator and an electric device; an air interface link
of any one of the following types: NR v2x, LTE-M,
PC5, IEEE 802.15.4, and IEEE 802.11, between the
second sensing coordinator and an electric device; a
sensing-specific air interface link between the second
sensing coordinator and an electric device or UE, the
sensing-specific air interface link comprising one or
more of s-PHY, s-MAC, and s-RLC protocol layers; an
NG interface link between the second sensing coordi-
nator and a network entity of a core network or a
backhaul network; a sensing control link between the
second sensing coordinator and a network entity of a
core network or a backhaul network; a sensing data link
between the second sensing coordinator and a network
entity of a core network or a backhaul network; a
sensing control link between the second sensing coor-
dinator and a network entity outside of a core network
or a backhaul network; a sensing data link between the
second sensing coordinator and a network entity out-
side of a core network or a backhaul network;

the second sensing coordinator comprises one or more of
the following: a control plane stack for the sensing
protocol, with higher layers comprising one or both of
an s-PDCP layer and an s-RRC layer; a user plane stack
for the sensing protocol, with higher layers comprising
one or both of an s-PDCP layer and an s-SDAP layer;
an s-CU-CP for the sensing protocol; an s-CU-UP for
the sensing protocol; an s-DU for the sensing protocol;

the second sensing coordinator communicating the first
signal with the first sensing coordinator comprises one
or more of the following: the second sensing coordinator comprises a SensMF in a core network, and
communicates the first signal with the first sensing
coordinator, which comprises a SAF in the radio access
network; the second sensing coordinator comprises a
SensMF that is outside of a core network and the radio
access network, and communicates the first signal
through the core network with the first sensing coor-
dinator, which comprises a SAF in the radio access
network; the second sensing coordinator comprises a
SensMF that is outside of a core network and the radio
access network, and directly communicates the first
signal with the first sensing coordinator, which com-
prises a SAF in the radio access network; the second
sensing coordinator comprises a SensMF in the core
network, the first sensing coordinator comprises a SAF
in the radio access network, the SAF connects a CU
and/or a DU of the radio access network, and the
SensMF communicates the first signal with the SAF
through the CU and/or DU; the second sensing coor-
dinator comprises a SensMF that is outside of the core
network and the radio access network, the first sensing
coordinator comprises a SAF in the radio access net-
work, the SAF connects a CU and/or a DU of the radio
access network, and the SensMF communicates the
first signal with the SAF between the CU and/or DU
and the core network; the second sensing coordinator
comprises a SensMF that is outside of the core network
and the radio access network, the first sensing coordi-
nator comprises a SAF in the radio access network, the
SAF connects a CU and/or a DU of the radio access
network, and the SensMF directly communicates the
first signal with the SAF through the CU and/or DU; the
second sensing coordinator comprises a SensMF in a
core network, the first sensing coordinator comprises a
SAF in the radio access network, the SAF connects a
CU-CP, a CU-UP, and/or a DU of the radio access
network, and the SensMF communicates the first signal
with the SAF through the CU-CP, CU-UP and/or DU;
the second sensing coordinator comprises a SensMF
that is outside of a core network and the radio access
network, the first sensing coordinator comprises a SAF
in the radio access network, the SAF connects a CU-
CP, a CU-UP, and/or a DU of the radio access network,
and the SensMF communicates the first signal with the
SAF between the CU-CP, CU-UP and/or DU and the
core network; the second sensing coordinator com-
prises a SensMF that is outside of a core network and
the radio access network, the first sensing coordinator
comprises a SAF in the radio access network, the SAF
connects a CU-CP, a CU-UP, and/or a DU of the radio
access network, and the SensMF directly communi-
cates the first signal with the SAF through the CU-CP,
CU-UP and/or DU;

the programming further comprises instructions for at
least one of the following: the communicating com-
prises receiving, by the second sensing coordinator, an
SSR from the first sensing coordinator through an AMF
in a core network; the communicating comprises trans-
mitting, by the second sensing coordinator, an SSResp
to the first sensing coordinator through an AMF in a
core network, wherein the SSResp is obtained based on
sensing data and an SSR; the second sensing coordi-
nator obtaining an SSResp based on sensing data and a
sensing request; the communicating comprises trans-
mitting, by the second sensing coordinator, an SSR
directly to the first sensing coordinator; the second
sensing coordinator initiating a sensing procedure in the radio access network in response to receiving an SSR; the communicating comprises receiving, by the second sensing coordinator, an SSResp directly from the first sensing coordinator; transmitting, directly to one or both of the first sensing coordinator and the second sensing coordinator, an SSR from an entity that is outside a core network and the radio access network; receiving, directly from one or both of the first sensing coordinator and the second sensing coordinator, an SSResp to an entity that is outside a core network and the radio access network; receiving, directly from one or both of the first sensing coordinator and the second sensing coordinator, by an entity that is outside a core network and the radio access network, an acknowledgement of an SSR that was transmitted by the entity;

sensing is independent of communication service operation in a wireless communication network that comprises the radio access network;

sensing is integrated with communication service operation in a wireless communication network that comprises the radio access network;

the programming comprising instructions for: the second sensing coordinator communicating a sensing request that comprises information that is indicative of any one or more of the following sensing requirements: positioning, mobility, environment temperature, and humidity of communication devices in certain areas;

the programming comprising instructions for: the second sensing coordinator communicating a sensing request triggered according to one or more of the following: periodically; and upon demand, related to or in terms of conditions that are configured based on an application and its sensing data requirements;

the programming comprising instructions for: the second sensing coordinator communicating with one or more electric devices in the radio access network to configure the one or more electric devices with sensing requirements;

In another embodiment, programming stored in a computer-readable storage medium may include instructions for: accessing, by the apparatus through a radio access network, an interface link; and communicating, by the apparatus, a first signal with a sensing coordinator that has a sensing protocol layer. The communicating involves communicating the first signal through the interface link using a sensing protocol, and the first signal includes a sensing configuration or sensing data.

Features disclosed elsewhere herein may be implemented in such apparatus and/or computer program product embodiments. These features include, for example, the following, alone or in any of various combinations:

the interface link is or includes any one or more of the following: an uu air interface link; an air interface link of any one of the following types: NR v2x, LTE-M, PC5, IEEE 802.15.4, and IEEE 802.11; a sensing-specific air interface link comprising one or more of s-PHY, s-MAC, and s-RLC protocol layers; a sensing control link; a sensing data link;

the communicating comprises receiving, from the sensing coordinator, the first signal comprising the sensing configuration;

the programming further comprising instructions for: collecting the sensing data based on the sensing configuration; and transmitting the sensing data to the sensing coordinator;

the communicating comprises transmitting, to the sensing coordinator, the first signal comprising the sensing data;

the sensing coordinator is located in the radio access network;

the sensing coordinator is located outside the radio access network;

the sensing coordinator comprises a SAF, a SensMF, or both in a SMAF for example;

sensing is independent of communication service operation of the apparatus in the radio access network;

sensing is integrated with communication service operation of the apparatus in the radio access network.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

The invention claimed is:

1. A method comprising:

communicating, by a first sensing coordinator in a radio access network, a first signal with a second sensing coordinator through an interface link;

wherein the first sensing coordinator comprises a sensing protocol layer, and communicating the first signal comprises communicating the first signal through the interface link using the sensing protocol.

2. The method of claim 1, wherein the interface link comprises one or more of the following:

an uu air interface link between the first sensing coordinator and an electric device;

an air interface link of any one of the following types: new radio vehicle-to-anything (NR v2x), long term evolution machine type communication (LTE-M), Power Class 5 (PC5), Institute of Electrical and Electronics Engineers (IEEE) 802.15.4, and IEEE 802.11, between the first sensing coordinator and an electric device;

a sensing-specific air interface link between the first sensing coordinator and an electric device, the sensing-specific air interface link comprising one or more of sensing-specific physical (s-PHY), sensing-specific medium access control (s-MAC) and sensing-specific radio link control (s-RLC) protocol layers;

a next generation (NG) interface link between the first sensing coordinator and a network entity of a core network or a backhaul network;

a sensing control link between the first sensing coordinator and a network entity of a core network or a backhaul network;

a sensing data link between the first sensing coordinator and a network entity of a core network or a backhaul network;

a sensing control link between the first sensing coordinator and a network entity outside of a core network or a backhaul network;

a sensing data link between the first sensing coordinator and a network entity outside of a core network or a backhaul network.

3. The method of claim 1, wherein the first sensing coordinator comprises one or more of the following:

a control plane stack for the sensing protocol, with higher layers comprising one or both of a sensing-specific packet data convergence protocol (s-PDCP) layer and a sensing-specific radio resource control (s-RRC) layer;

a user plane stack for the sensing protocol, with higher layers comprising one or both of an s-PDCP layer and a sensing-specific service data adaptation protocol (s-SDAP) layer;

a sensing-specific central unit control plane (s-CU-CP) for the sensing protocol;

a sensing-specific CU user plane (s-CU-UP) for the sensing protocol;

a sensing-specific distributed unit (s-DU) for the sensing protocol.

4. The method of claim 1, wherein the first sensing coordinator communicating the first signal with the second sensing coordinator comprises one or more of the following:

the first sensing coordinator comprises a sensing agent function (SAF) in the radio access network, and communicates the first signal with the second sensing coordinator, which comprises a sensing management function (SensMF) in a core network;

the first sensing coordinator comprises a sensing agent function (SAF) in the radio access network, and communicates the first signal through a core network with the second sensing coordinator, which comprises a sensing management function (SensMF) that is outside of a core network and the radio access network;

the first sensing coordinator comprises a sensing agent function (SAF) in the radio access network, and directly communicates the first signal with the second sensing coordinator, which comprises a sensing management function (SensMF) that is outside of a core network and the radio access network;

the first sensing coordinator comprises a sensing agent function (SAF) in the radio access network, wherein the SAF connects at least one of a central unit (CU) or a distributed unit (DU) of the radio access network, and the SAF communicates the first signal through at least one of the CU or the DU with the second sensing coordinator, which comprises a sensing management function (SensMF) in the core network;

the first sensing coordinator comprises a sensing agent function (SAF) in the radio access network, wherein the SAF connects at least one of a central unit (CU) or a distributed unit (DU) of the radio access network, and the SAF communicates the first signal between at least one of the CU or the DU and a core network with the second sensing coordinator, which comprises a sensing management function (SensMF) that is outside of the core network and the radio access network;

the first sensing coordinator comprises a sensing agent function (SAF) in the radio access network, wherein the SAF connects at least one of a central unit (CU) or a distributed unit (DU) of the radio access network, and the SAF directly communicates the first signal through at least one of the CU or the DU with the second sensing coordinator, which comprises a sensing management function (SensMF) that is outside of the core network and the radio access network;

the first sensing coordinator comprises a sensing agent function (SAF) in the radio access network, wherein the SAF connects at least one of a CU control plane (CU-CP), a CU user plane (CU-UP), or a distributed unit (DU) of the radio access network, and the SAF communicates the first signal through at least one of the CU-CP, the CU-UP or the DU with the second sensing coordinator, which comprises a sensing management function (SensMF) in a core network;

the first sensing coordinator comprises a sensing agent function (SAF) in the radio access network, wherein the SAF connects at least one of a CU-CP, a CU-UP, or a distributed unit (DU) of the radio access network, and the SAF communicates the first signal between at least one of the CU-CP, the CU-UP or the DU and a core network with the second sensing coordinator, which comprises a sensing management function (SensMF) that is outside of the core network and the radio access network;

the first sensing coordinator comprises a sensing agent function (SAF) in the radio access network, wherein the SAF connects at least one of a CU-CP, a CU-UP, or a distributed unit (DU) of the radio access network, and the SAF directly communicates the first signal through at least one of the CU-CP, the CU-UP or the DU with the second sensing coordinator, which comprises a sensing management function (SensMF) that is outside of the core network and the radio access network.

5. The method of claim 1, wherein the first sensing coordinator comprises a sensing agent function (SAF) and the second sensing coordinator comprises a sensing management function (SensMF), both of the SAF and SensMF located in the radio access network, the method further comprising one or more of:

one or both of the SAF and the SensMF communicating a second signal through a core network with an entity in the core network;

one or both of the SAF and the SensMF communicating the second signal through a core network with an entity that is outside of the core network and the radio access network;

one or both of the SAF and the SensMF directly communicating the second signal with an entity that is outside of a core network and the radio access network;

one or both of the SAF and the SensMF connecting at least one of a central unit (CU) or a distributed unit (DU) of the radio access network, and communicating the second signal through at least one of the CU or the DU with an entity in a core network;

one or both of the SAF and the SensMF connecting at least one of a central unit (CU) and a distributed unit (DU) of the radio access network, and communicating the second signal between at least one of the CU or the DU and a core network with an entity that is outside of the core network and the radio access network;

one or both of the SAF and the SensMF connecting at least one of a central unit (CU) or a distributed unit (DU) of the radio access network, and directly communicating the second signal through at least one of the CU or the DU with an entity that is outside of a core network and the radio access network;

one or both of the SAF and the SensMF connecting at least one of a CU-CP, a CU-UP, or a distributed unit (DU) of the radio access network, and communicating the second signal through at least one of the CU-CP, the CU-UP or the DU with an entity in a core network;

one or both of the SAF and the SensMF connecting at least one of a CU-CP, a CU-UP, or a distributed unit (DU) of the radio access network, and communicating the second signal between at least one of the CU-CP, the CU-UP or the DU and a core network with an entity that is outside of the core network and the radio access network;

one or both of the SAF and the SensMF connecting at least one of a CU-CP, a CU-UP, or a distributed unit (DU) of the radio access network, and directly communicating the second signal through at least one of the CU-CP, the CU-UP or the DU with an entity that is outside of a core network and the radio access network.

6. The method of claim 1, wherein the method further comprises at least one of the following:

the communicating comprises transmitting, by the first sensing coordinator, a sensing request (SSR) to the second sensing coordinator through an access and mobility management function (AMF) in a core network;

the communicating comprises receiving, by the first sensing coordinator, a sensing response (SSResp) from the second sensing coordinator through an AMF in a core network, wherein the sensing response (SSResp) is obtained based on sensing data and an SSR;

the first sensing coordinator processing a sensing response (SSResp) received from the second sensing coordinator through an AMF, wherein the sensing response (SSResp) is obtained based on sensing data and a sensing request;

the communicating comprises receiving, by the first sensing coordinator, a sensing request (SSR) directly from the second sensing coordinator;

the first sensing coordinator initiating a sensing procedure in the radio access network in response to receiving a sensing request (SSR);

the communicating comprises transmitting, by the first sensing coordinator, a sensing response (SSResp) directly to the second sensing coordinator in a core network;

one or both of the first sensing coordinator and the second sensing coordinator receiving, through an AMF in a core network or directly, a sensing request (SSR) from an entity that is outside the core network and the radio access network;

one or both of the first sensing coordinator and the sensing coordinator initiating a sensing procedure in the radio access network in response to receiving a sensing request (SSR);

one or both of the first sensing coordinator and the second sensing coordinator transmitting, through an AMF in a core network or directly, a sensing response (SSResp) to an entity that is outside the core network and the radio access network;

one or both of the first sensing coordinator and the second sensing coordinator transmitting, to an entity that is outside a core network and the radio access network, an acknowledgement of a sensing request (SSR) received from the entity.

7. The method of claim 1, wherein sensing is independent of communication service operation in a wireless communication network that comprises the radio access network.

8. The method of claim 1, wherein sensing is integrated with communication service operation in a wireless communication network that comprises the radio access network.

9. The method of claim 1, comprising:

one or both of the first sensing coordinator and the second sensing coordinator communicating a sensing request that comprises information that is indicative of one or more of the following sensing requirements:

positioning, mobility, environment temperature, and humidity of communication devices in certain areas.

10. An apparatus in a radio access network, comprising:
at least one processor coupled with a non-transitory computer readable storage medium storing programming for execution by the at least one processor, the programming including instructions for communicating a first signal with a second sensing coordinator through an interface link,
wherein the apparatus comprises a sensing protocol layer, and communicating the first signal comprises communicating the first signal through the interface link using the sensing protocol.

11. The apparatus of claim 10, wherein the interface link comprises one or more of the following:
an uu air interface link between the apparatus and an electric device;
an air interface link of any one of the following types: new radio vehicle-to-anything (NR v2x), long term evolution machine type communication (LTE-M), Power Class 5 (PC5), Institute of Electrical and Electronics Engineers (IEEE) 802.15.4, and IEEE 802.11, between the apparatus and an electric device;
a sensing-specific air interface link between the apparatus and an electric device, the sensing-specific air interface link comprising one or more of sensing-specific physical (s-PHY), sensing-specific medium access control (s-MAC) and sensing-specific radio link control (s-RLC) protocol layers;
a next generation (NG) interface link between the apparatus and a network entity of a core network or a backhaul network;
a sensing control link between the apparatus and a network entity of a core network or a backhaul network;
a sensing data link between the apparatus and a network entity of a core network or a backhaul network;
a sensing control link between the apparatus and a network entity outside of a core network or a backhaul network;
a sensing data link between the apparatus and a network entity outside of a core network or a backhaul network.

12. The apparatus of claim 10, wherein the apparatus comprises one or more of the following:
a control plane stack for the sensing protocol, with higher layers comprising one or both of a sensing-specific packet data convergence protocol (s-PDCP) layer and a sensing-specific radio resource control (s-RRC) layer;
a user plane stack for the sensing protocol, with higher layers comprising one or both of an s-PDCP layer and a sensing-specific service data adaptation protocol (s-SDAP) layer;
a sensing-specific central unit control plane (s-CU-CP) for the sensing protocol;
a sensing-specific CU user plane (s-CU-UP) for the sensing protocol;
a sensing-specific distributed unit (s-DU) for the sensing protocol.

13. The apparatus of claim 10, wherein the apparatus in the radio access network communicating the first signal with the second sensing coordinator comprises one or more of the following:
the apparatus comprises a sensing agent function (SAF) in the radio access network, and communicates the first signal with the second sensing coordinator, which comprises a sensing management function (SensMF) in a core network;

the apparatus comprises a sensing agent function (SAF) in the radio access network, and communicates the first signal through a core network with the second sensing coordinator, which comprises a sensing management function (SensMF) that is outside of a core network and the radio access network;
the apparatus comprises a sensing agent function (SAF) in the radio access network, and directly communicates the first signal with the second sensing coordinator, which comprises a sensing management function (SensMF) that is outside of a core network and the radio access network;
the apparatus comprises a sensing agent function (SAF) in the radio access network, wherein the SAF connects at least one of a central unit (CU) or a distributed unit (DU) of the radio access network, and the SAF communicates the first signal through at least one of the CU or the DU with the second sensing coordinator, which comprises a sensing management function (SensMF) in the core network;
the apparatus comprises a sensing agent function (SAF) in the radio access network, wherein the SAF connects at least one of a central unit (CU) or a distributed unit (DU) of the radio access network, and the SAF communicates the first signal between at least one of the CU or the DU and a core network with the second sensing coordinator, which comprises a sensing management function (SensMF) that is outside of the core network and the radio access network;
the apparatus comprises a sensing agent function (SAF) in the radio access network, wherein the SAF connects at least one of a central unit (CU) or a distributed unit (DU) of the radio access network, and the SAF directly communicates the first signal through at least one of the CU or the DU with the second sensing coordinator, which comprises a sensing management function (SensMF) that is outside of the core network and the radio access network;
the apparatus comprises a sensing agent function (SAF) in the radio access network, wherein the SAF connects at least one of a CU-control plane (CP), a CU-user plane (UP), or a distributed unit (DU) of the radio access network, and the SAF communicates the first signal through at least one of the CU-CP, the CU-UP or the DU with the second sensing coordinator, which comprises a sensing management function (SensMF) in a core network;
the apparatus comprises a sensing agent function (SAF) in the radio access network, wherein the SAF connects at least one of a CU-CP, a CU-UP, or a distributed unit (DU) of the radio access network, and the SAF communicates the first signal between at least one of the CU-CP, CU-UP or DU and a core network with the second sensing coordinator, which comprises a sensing management function (SensMF) that is outside of the core network and the radio access network;
the apparatus comprises a sensing agent function (SAF) in the radio access network, wherein the SAF connects at least one of a CU-CP, a CU-UP, or a distributed unit (DU) of the radio access network, and the SAF directly communicates the first signal through at least one of the CU-CP, the CU-UP or the DU with the second sensing coordinator, which comprises a sensing management function (SensMF) that is outside of the core network and the radio access network.

14. The apparatus of claim 10, wherein the apparatus comprises a sensing agent function (SAF) and the second sensing coordinator comprises a sensing management function (SensMF), both of the SAF and SensMF located in the radio access network, the programming further comprising instructions for any one or more of:

one or both of the SAF and the SensMF communicating a second signal through a core network with an entity in the core network;

one or both of the SAF and the SensMF communicating the second signal through a core network with an entity that is outside of the core network and the radio access network;

one or both of the SAF and the SensMF directly communicating the second signal with an entity that is outside of a core network and the radio access network;

one or both of the SAF and the SensMF connecting at least one of a central unit (CU) or a distributed unit (DU) of the radio access network, and communicating the second signal through at least one of the CU or the DU with an entity in a core network;

one or both of the SAF and the SensMF connecting at least one of a central unit (CU) or a distributed unit (DU) of the radio access network, and communicating the second signal between at least one of the CU or the DU and a core network with an entity that is outside of the core network and the radio access network;

one or both of the SAF and the SensMF connecting at least one of a central unit (CU) or a distributed unit (DU) of the radio access network, and directly communicating the second signal through at least one of the CU or the DU with an entity that is outside of a core network and the radio access network;

one or both of the SAF and the SensMF connecting at least one of a CU-CP, a CU-UP, or a distributed unit (DU) of the radio access network, and communicating the second signal through at least one of the CU-CP, the CU-UP or the DU with an entity in a core network;

one or both of the SAF and the SensMF connecting at least one of a CU-CP, a CU-UP, or a distributed unit (DU) of the radio access network, and communicating the second signal between at least one of the CU-CP, the CU-UP or the DU and a core network with an entity that is outside of the core network and the radio access network;

one or both of the SAF and the SensMF connecting at least one of a CU-CP, a CU-UP, or a distributed unit (DU) of the radio access network, and directly communicating the second signal through at least one of the CU-CP, the CU-UP or the DU with an entity that is outside of a core network and the radio access network.

15. The apparatus of claim 10, wherein the programming further comprises instructions for at least one of the following:

the communicating comprises transmitting a sensing request (SSR) to the second sensing coordinator through an access and mobility management function (AMF) in a core network;

the communicating comprises receiving a sensing response (SSResp) from the second sensing coordinator through an AMF in a core network, wherein the sensing response (SSResp) is obtained based on sensing data and an SSR;

the apparatus processing a sensing response (SSResp) received from the second sensing coordinator through an AMF, wherein the sensing response (SSResp) is obtained based on sensing data and a sensing request;

the communicating comprises receiving a sensing request (SSR) directly from the second sensing coordinator;

the apparatus initiating a sensing procedure in the radio access network in response to receiving a sensing request (SSR);

the communicating comprises transmitting a sensing response (SSResp) directly to the second sensing coordinator in a core network;

one or both of the apparatus and the second sensing coordinator receiving, through an AMF in a core network or directly, a sensing request (SSR) from an entity that is outside the core network and the radio access network;

one or both of the apparatus and the sensing coordinator initiating a sensing procedure in the radio access network in response to receiving a sensing request (SSR);

one or both of the apparatus and the second sensing coordinator transmitting, through an AMF in a core network or directly, a sensing response (SSResp) to an entity that is outside the core network and the radio access network;

one or both of the apparatus and the second sensing coordinator transmitting, to an entity that is outside a core network and the radio access network, an acknowledgement of a sensing request (SSR) received from the entity.

16. The apparatus of claim 10, wherein sensing is independent of communication service operation in a wireless communication network that comprises the radio access network.

17. The apparatus of claim 10, wherein sensing is integrated with communication service operation in a wireless communication network that comprises the radio access network.

18. An apparatus comprising:

at least one processor coupled with a non-transitory computer readable storage medium storing programming for execution by the at least one processor, the programming including instructions for communicating a first signal with a first sensing coordinator in a radio access network through an interface link;

wherein the apparatus comprises a sensing protocol layer, and communicating the first signal comprises communicating the first signal through the interface link using the sensing protocol.

19. The apparatus of claim 18, wherein the interface link comprises one or more of the following:

an uu air interface link between the apparatus and an electric device;

an air interface link of any one of the following types: new radio vehicle-to-anything (NR v2x), long term evolution machine type communication (LTE-M), Power Class 5 (PC5), Institute of Electrical and Electronics Engineers (IEEE) 802.15.4, and IEEE 802.11, between the apparatus and an electric device;

a sensing-specific air interface link between the apparatus and an electric device or UE, the sensing-specific air interface link comprising one or more of sensing-specific physical (s-PHY), sensing-specific medium access control (s-MAC) and sensing-specific radio link control (s-RLC) protocol layers;

a next generation (NG) interface link between the apparatus and a network entity of a core network or a backhaul network;

a sensing control link between the apparatus and a network entity of a core network or a backhaul network;

a sensing data link between the apparatus and a network entity of a core network or a backhaul network;

a sensing control link between the apparatus and a network entity outside of a core network or a backhaul network;

a sensing data link between the apparatus and a network entity outside of a core network or a backhaul network.

20. The apparatus of claim 18, wherein the apparatus comprises one or more of the following:

a control plane stack for the sensing protocol, with higher layers comprising one or both of a sensing-specific packet data convergence protocol (s-PDCP) layer and a sensing-specific radio resource control (s-RRC) layer;

a user plane stack for the sensing protocol, with higher layers comprising one or both of an s-PDCP layer and a sensing-specific service data adaptation protocol (s-SDAP) layer;

a sensing-specific central unit control plane (s-CU-CP) for the sensing protocol;

a sensing-specific CU user plane (s-CU-UP) for the sensing protocol;

a sensing-specific distributed unit (s-DU) for the sensing protocol.

\* \* \* \* \*